(12) United States Patent
Panaccione et al.

(10) Patent No.: US 12,251,657 B2
(45) Date of Patent: Mar. 18, 2025

(54) CARBON DIOXIDE CAPTURE SYSTEM AND METHOD WITH MASS TRANSFER CONTACTOR

(71) Applicant: ION Clean Energy, Inc., Boulder, CO (US)

(72) Inventors: Charles Panaccione, Boulder, CO (US); Erik Everhardus Bernardus Meuleman, Boulder, CO (US); Gregory Allan Staab, Arvada, CO (US); Nathan R. Brown, Oslo (NO)

(73) Assignee: ION Clean Energy, Inc., Boulder, CO (US)

( * ) Notice: Subject to any disclaimer, the term of this patent is extended or adjusted under 35 U.S.C. 154(b) by 599 days.

(21) Appl. No.: 17/494,205

(22) Filed: Oct. 5, 2021

(65) Prior Publication Data

US 2022/0023794 A1    Jan. 27, 2022

Related U.S. Application Data

(63) Continuation of application No. 16/478,356, filed as application No. PCT/US2018/014259 on Jan. 18, 2018, now Pat. No. 11,167,236.

(Continued)

(51) Int. Cl.
*B01D 47/14* (2006.01)
*B01D 53/14* (2006.01)
(Continued)

(52) U.S. Cl.
CPC ......... *B01D 47/14* (2013.01); *B01D 53/1475* (2013.01); *B01D 53/18* (2013.01);
(Continued)

(58) Field of Classification Search
CPC ........ B01D 47/14; B01D 53/14; B01D 53/75; B01D 53/18; B01D 53/62; B01D 53/78;
(Continued)

(56) References Cited

U.S. PATENT DOCUMENTS 6,241,793 B1 * 6/2001 Lee .................. B01D 8/00
55/DIG. 15
8,500,854 B1   8/2013 Pennline et al.
(Continued)

FOREIGN PATENT DOCUMENTS

CA         2225293 A1 *  6/1999 .............. B01J 19/32
KR       101798770 B1 * 12/2017
WO   WO-2011122559 A1 * 10/2011 ......... B01D 53/1425

OTHER PUBLICATIONS

Rajiv Mukherjee, Effectively Design Shell-and-Tube Heat Exchanger, Feb. 1998, Chemical Engineering Progress, 1997, 1-17 ( Year: 1998).*

*Primary Examiner* — Robert A Hopkins
(74) *Attorney, Agent, or Firm* — Pierce Atwood LLP; Christopher A. Baxter

(57) ABSTRACT

A carbon dioxide capture system, fluid contactor and method are disclosed. In embodiments, a gas-liquid contactor unit is disposed along a process fluid flow axis and includes a contactor of network flow diversions barriers with flow voids for movement of process fluids therebetween. A plurality of heat exchange channels are provided in the flow diversion barriers to transport a heat exchange fluid through the contactor network. A heat exchange feed channel is provided to deliver feed of the heat exchange fluid to the heat exchange channels at multiple feed locations spaced along the flow axis. At least one heat exchange bypass channel may extend beyond the multiple feed locations to deliver a portion of the feed of the heat exchange fluid to (Continued)

additional heat exchange channels located downstream from the multiple feed locations for the heat exchange channels.

18 Claims, 11 Drawing Sheets

Related U.S. Application Data

(60) Provisional application No. 62/462,230, filed on Feb. 22, 2017, provisional application No. 62/447,798, filed on Jan. 18, 2017.

(51) Int. Cl.
    *B01D 53/18*     (2006.01)
    *B01D 53/62*     (2006.01)
    *B01D 53/78*     (2006.01)

(52) U.S. Cl.
    CPC .............. *B01D 53/62* (2013.01); *B01D 53/78* (2013.01); *B01D 2252/204* (2013.01); *B01D 2257/504* (2013.01)

(58) Field of Classification Search
CPC ......... B01D 2252/204; B01D 2257/504; B01J 8/22; Y02E 20/30; Y02E 10/44; F28D 1/0472; F28D 1/047; F28D 21/0015; F28D 7/024; F28D 9/00; F28D 1/0246; F28D 7/08; F28D 20/021; F28D 20/023; F28D 2020/0013; F28D 2020/0017; F28F 1/128; F28F 3/027; F28F 9/182; F28F 2215/00; F28F 2009/0292; F28F 1/325; F28F 1/022; G03C 1/49845; G03C 1/061; G03C 1/49863; G03C 1/04; G03C 1/067; G03C 1/34; G03C 1/49809; G03C 1/49827; G03C 1/49836; G03C 1/49872; G03C 1/49881; G03C 2200/33; G03C 2200/36; G03C 2200/42
USPC .................................................. 95/149–240
See application file for complete search history.

(56) References Cited

U.S. PATENT DOCUMENTS

| | | | |
|---|---|---|---|
| 2006/0014876 A1* | 1/2006 | Bushelman | C09K 19/52 524/439 |
| 2014/0178279 A1 | 6/2014 | Svendsen et al. | |
| 2015/0078977 A1 | 3/2015 | Fischer et al. | |
| 2016/0199774 A1 | 7/2016 | Grave et al. | |
| 2018/0015409 A1 | 1/2018 | Cruz et al. | |
| 2018/0209729 A1* | 7/2018 | Baxter | B01D 53/002 |

* cited by examiner

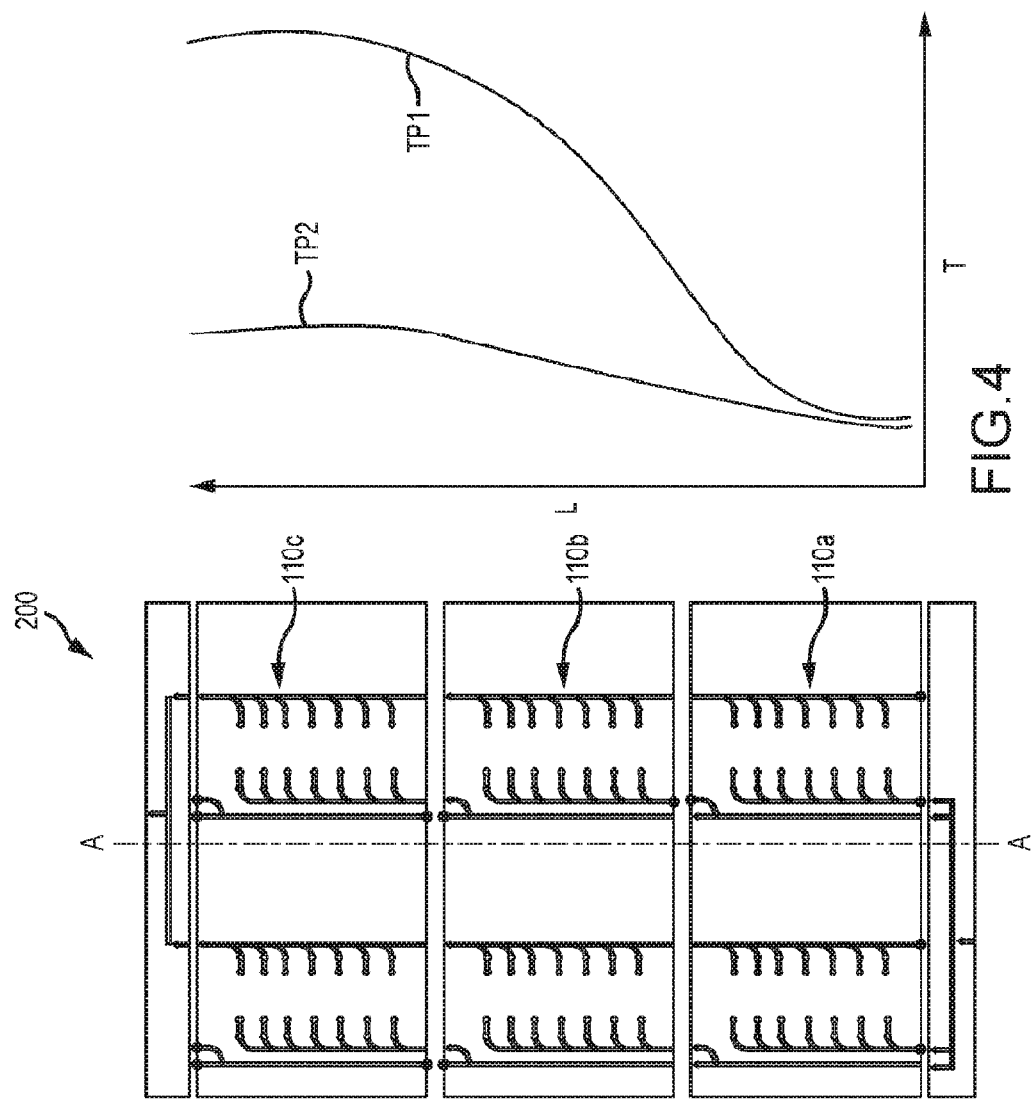

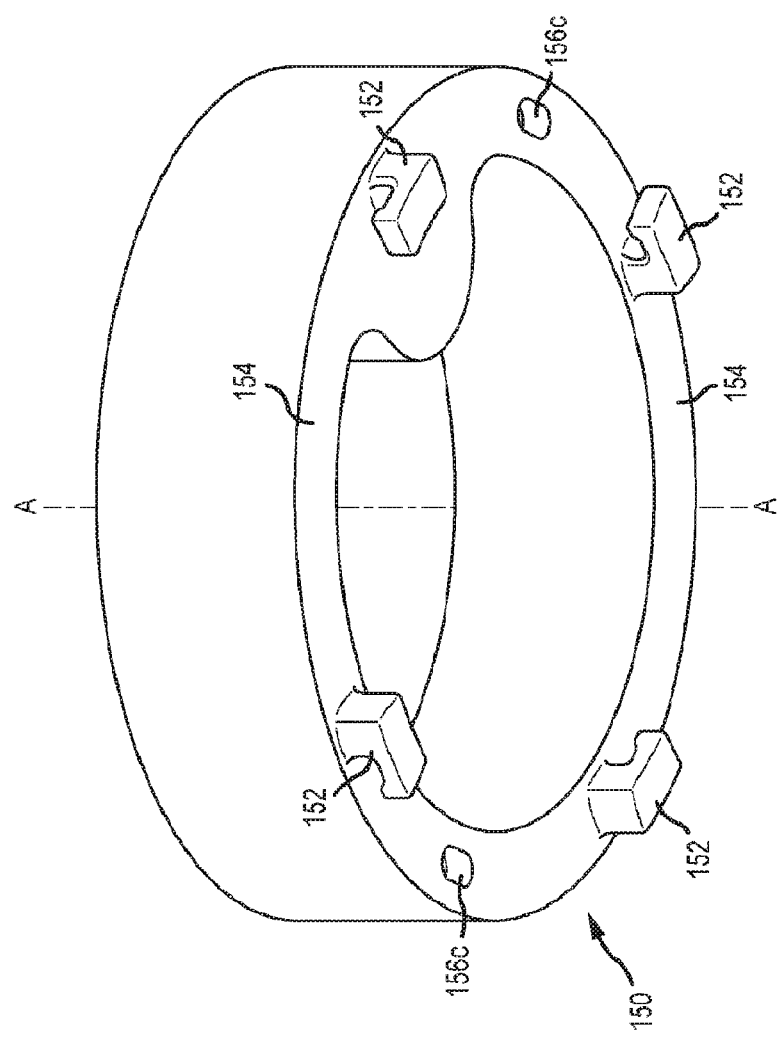

ns in their scrubbing operation. Regeneration involves subjecting the scrubbing solution to conditions (e.g., temperature and pressure) different than conditions during the scrubbing operation at which the scrubbing solution has a reduced capacity for carbon dioxide loading. Maximum temperatures to which the scrubbing solution is subjected during the regeneration operation tend to be higher than maximum temperatures in the scrubbing operation. To improve overall thermal efficiency, heat may be exchanged between hot lean scrubbing solution from the regeneration operation and the cooler rich scrubbing solution from the scrubbing operation to preheat the rich scrubbing solution prior to introduction into the regeneration operation and to precool the lean scrubbing solution prior to introduction into the scrubbing operation.

CARBON DIOXIDE CAPTURE SYSTEM AND METHOD WITH MASS TRANSFER CONTACTOR

RELATED APPLICATIONS

This application is a continuation of and claims benefit of priority of U.S. patent application Ser. No. 16/478,356 entitled "CARBON DIOXIDE CAPTURE SYSTEM AND METHOD WITH MASS TRANSFER CONTACTOR" filed Jul. 17, 2019, which is a National Stage Entry of Patent Cooperation Treaty Application No. PCT/US2018/014259 entitled "CARBON DIOXIDE CAPTURE SYSTEM AND METHOD WITH MASS TRANSFER CONTACTOR" filed Jan. 18, 2018, which claims benefit of priority to U.S. Provisional Patent Application No. 62/447,798 entitled "CARBON DIOXIDE CAPTURE SYSTEM, FLUID CONTACTOR AND METHOD" filed Jan. 18, 2017 as well as U.S. Provisional Patent Application No. 62/462,230 entitled "CARBON DIOXIDE CAPTURE SYSTEM, FLUID CONTACTOR AND METHOD" filed Feb. 22, 2017, which applications are incorporated herein by reference in their entirety.

STATEMENT ON FEDERALLY SPONSORED RESEARCH OR DEVELOPMENT

This invention was made with government support under award no. DE-SC0012056 awarded by the U.S. Department of Energy. The government has certain rights in the invention.

BACKGROUND

Carbon dioxide scrubbing with amine-based scrubbing solutions has been used widely for removing carbon dioxide from natural gas and petroleum gas streams as part of gas sweetening operations. These scrubbing operations tend to be at high pressure. More recently, amine-based scrubbing systems have been used for removing carbon dioxide from power plant and industrial flue gas streams in lower-pressure systems, such as for carbon dioxide capture for sequestration. The scrubbing solutions may contain one or more amine compounds active for carbon dioxide capture in solution and are often prepared as aqueous solutions with the amine compounds dissolved in water, although a variety of non-aqueous amine-based scrubbing solutions have also been described for use in amine-based scrubbing of carbon dioxide. In addition to one or more amine compounds active for carbon dioxide capture, such scrubbing solutions may optionally include other components (typically also dissolved in water in aqueous scrubbing solutions), for example one or more promoters to promote more rapid absorption of carbon dioxide into the scrubbing solution (carbon dioxide absorption kinetics), to promote more rapid transfer of carbon dioxide within scrubbing solution to the amine compound for capture and/or to promote increased solubility of carbon dioxide in the scrubbing solution.

A common carbon dioxide capture system includes an exothermic scrubbing operation in which the scrubbing solution is contacted with a carbon dioxide-containing gas mixture (e.g., natural gas for gas sweetening or flue gas for carbon dioxide sequestration) to remove carbon dioxide from the gas mixture. Resulting rich scrubbing solution loaded with captured carbon dioxide is then processed through an endothermic regeneration operation in which carbon dioxide is removed from the scrubbing solution to regenerate a lean scrubbing solution for further use for carbon dioxide capture in the scrubbing operation. Regeneration involves subjecting the scrubbing solution to conditions (e.g., temperature and pressure) different than conditions during the scrubbing operation at which the scrubbing solution has a reduced capacity for carbon dioxide loading. Maximum temperatures to which the scrubbing solution is subjected during the regeneration operation tend to be higher than maximum temperatures in the scrubbing operation. To improve overall thermal efficiency, heat may be exchanged between hot lean scrubbing solution from the regeneration operation and the cooler rich scrubbing solution from the scrubbing operation to preheat the rich scrubbing solution prior to introduction into the regeneration operation and to precool the lean scrubbing solution prior to introduction into the scrubbing operation.

Carbon dioxide scrubbing is often performed in a vertically-oriented processing vessel, or column, with gas feed introduced into a lower portion of the vessel and with liquid scrubbing solution feed introduced into an upper portion of the vessel, to provide a counter-current processing operation in which gas moves upward through the vessel and absorption liquid moves downward through the vessel. Treated gas with reduced carbon dioxide concentration may be removed from a top portion of the vessel and rich absorption liquid loaded with captured carbon dioxide may be removed from a bottom portion of the vessel. Mass transfer contactor packing is typically disposed in the vessel between the gas and liquid feed inlets to enhance intermixing and contact between the gas and liquid phases moving through the vessel and to promote transfer of carbon dioxide from the gas phase into the liquid phase of the absorption liquid to be captured within the absorption liquid. Such mass transfer contactor packing may, for example, be in the form of structured and/or random packing.

One important variable for control of the scrubbing operation is the L/G ratio, which is a ratio of the quantity of liquid scrubbing solution feed to the absorption vessel to the quantity of carbon-dioxide gas feed to absorption vessel. Operating at a low L/G ratio may be desirable to achieve a high loading of captured carbon dioxide in the scrubbing solution, but is balanced against thermal considerations. The scrubbing solution provides a heat sink for heat generated during the scrubbing operation, and operating at a very low L/G ratio may result in higher than desired temperatures in the scrubbing vessel. Accordingly, the L/G ratio tends to be an important control variable in relation to vessel temperature. Another technique for controlling temperature in the scrubbing vessel is to provide for interstage cooling of liquid scrubbing solution. For example, a portion of the process fluid may be removed from the absorption vessel at an intermediate height location such as between stages of packing, subjected to external cooling and then the cooled fluid may be returned to the absorption vessel.

Amine-based scrubbing operations are complex systems, and many of the basic systems and operational practices for carbon dioxide scrubbing were developed within the context of gas sweetening, and were then adapted with modification for use in scrubbing flue gas streams. Although gas sweetening and flue gas scrubbing using amine-based scrubbing solutions are similar processes in many respects, there are significant differences. One difference is that scrubbing carbon dioxide for gas sweetening tends to be a high-pressure operation in which the scrubbing solution acts mostly as a physical absorption medium, whereas flue gas scrubbing tends to be conducted at much lower pressures at which the scrubbing solution acts more as a chemical absorption medium. Another difference is that gas feeds for gas sweetening and flue gas scrubbing tend to be very different types of gas compositions, and therefore present different reactive environments. As a result of these differences, current carbon dioxide capture systems and methods designed for use primarily for gas sweetening applications may not be readily adapted for efficient use with flue gas scrubbing applications, and vice versa, even though each may use an amine-based scrubbing solution. There continues to be a significant need for improved amine-based carbon dioxide capture system and method designs that are better adapted to the requirements of flue gas scrubbing applications and that are more flexible in being better adaptable for different feed gas compositions and for use in both gas sweetening and flue gas scrubbing applications.

SUMMARY

The present disclosure includes an embodiment of a carbon dioxide capture system for capturing carbon dioxide from a carbon dioxide-containing gas mixture involving contact of the gas mixture with an amine-based scrubbing solution, the system comprising a packed scrubbing vessel that includes a gas inlet, a gas outlet, a liquid inlet and a liquid outlet. More particularly, the gas inlet may be provided to receive a feed stream of the gas mixture to the scrubbing vessel with carbon dioxide for removal in an internal volume of the scrubbing vessel, and the gas outlet may be provided to output a treated stream of the gas mixture from the internal volume of the scrubbing vessel having a lower carbon dioxide concentration than the feed stream of the gas mixture to the scrubbing unit. Further, the liquid inlet may be provided to receive a feed stream of the scrubbing solution for processing in the internal volume of the scrubbing vessel to contact the gas mixture to remove carbon dioxide from the gas mixture for capture in the scrubbing solution, and the liquid outlet may be provided to output an effluent stream of rich scrubbing solution from the internal volume of the scrubbing vessel, the rich scrubbing solution having captured carbon dioxide removed from the gas mixture.

The scrubbing vessel may be provided to have a flow axis extending in a direction along the scrubbing vessel from a location corresponding with the gas inlet to a distant location corresponding with the gas outlet. The scrubbing vessel may further include a gas-liquid contactor unit disposed along the flow axis between the gas inlet and the gas outlet and between the liquid inlet and the liquid outlet. The contactor unit may include a contactor network of flow diversion barriers with flow voids for movement of process fluids including the gas mixture and the scrubbing solution between the flow diversion barriers.

The contactor unit, also referred to herein as a fluid mass transfer contactor unit, may comprise a plurality of heat exchange channels in the flow diversion barriers to transport heat exchange cooling fluid through the contactor network to cool the process fluids moving through the flow voids during a carbon dioxide scrubbing operation, and at least one heat exchange feed channel to deliver feed of the heat exchange cooling fluid to the heat exchange channels. In that regard, the heat exchange feed channel may extend in a direction of the flow axis and may be fluidly connected with the plurality of heat exchange channels at multiple feed locations spaced along the flow axis to input the feed of the heat exchange cooling fluid into multiple different locations in the contactor network along the flow axis. As may be appreciated, the provision of at least one heat exchange feed channel that connects with a plurality of heat exchange channels at multiple feed locations spaced along the flow axis advantageously facilitates the cooling heat exchange with the process fluids along the flow axis.

The description of the carbon dioxide capture system is presented herein primarily in the context of cooling, as amine-based scrubbing of carbon dioxide tends to be exothermic and the heat exchange fluid may be a heat exchange cooling fluid to cool the process fluids to remove heat generated by the exothermic process. The gas-liquid contactor may be used, however, for heating applications as well. A heat exchange heating fluid may be used for example during start-up operations to warm a process vessel to an elevated temperature to commence carbon dioxide capture. Other than the different context of heating rather than cooling, description herein in relation to cooling applications applies equally to heating applications as well.

In some embodiments, the contactor unit may further comprise at least one heat exchange collection channel to collect effluent of the heat exchange cooling fluid from the plurality of heat exchange channels. Further, the heat exchange collection channel may be provided to extend in a direction of the flow axis and may be fluidly connected with the plurality of heat exchange channels at multiple collection locations spaced along the flow axis to receive effluent of the heat exchange cooling fluid from multiple different locations in the contactor network along the flow axis.

In some arrangements, the multiple feed locations may be first feed locations of a first said heat exchange feed channel and may be located in a first portion of the network disposed along a first longitudinal portion of the flow axis to input a first feed of the heat exchange fluid into the first portion of the network. In some embodiments, the contactor unit may comprise at least one heat exchange bypass channel extending in a heat exchange fluid flow direction along the flow axis past the first longitudinal portion of the flow axis to provide a second feed of the heat exchange fluid to heat exchange channels located in a second portion of the contactor network located along a second longitudinal portion of the flow axis downstream of the first longitudinal portion. In other embodiments, the first heat exchange feed channel may be provided to provide a second feed of the heat exchange fluid to heat exchange channels located in a second portion of the contactor network located along a second longitudinal portion of the flow axis downstream of the first longitudinal portion of the flow axis.

In some implementations, at least a portion of the heat exchange channels having corresponding first feed locations in the first portion of the contactor network may be fluidly cross-connected downstream of the corresponding first feed locations. As may be appreciated, such cross-connections may provide for enhanced distributed flow of the first feed of the heat exchange fluid within the first portion of the contactor network.

In contemplated embodiments that include at least one heat exchange bypass channel, the contactor unit may further comprise a second said heat exchange feed channel to deliver the second feed of the heat exchange fluid from a first portion of the heat exchange bypass channel to the heat exchange channels in the second portion of the contactor network. In that regard, the second heat exchange feed channel may extend in a direction of the flow axis and may be fluidly interconnected with the heat exchange channels in the second portion of the contactor network at multiple second feed locations spaced along the flow axis to input the second feed of the heat exchange fluid from the first portion of the heat exchange bypass channel into multiple different locations in the second portion of the contactor network along the flow axis. In some implementations, at least a portion of the heat exchange channels having corresponding second feed locations located in the second portion of the contactor network may be fluidly cross-connected downstream of the corresponding second feed locations, thereby providing enhanced distributed flow of the second feed of the heat exchange fluid within the second portion of the contactor network. In contemplated arrangements, the heat exchange channels having corresponding first feed locations in the first portion of the contactor network and the heat exchange channels having corresponding second feed locations in the second portion of the contactor network may be provided so they are not fluidly cross-connected in the contactor network, thereby facilitating the provision of "fresh" feed of the heat exchange fluid into both the first and second portions of the contactor network. References herein to heat exchange channels not being fluidly cross-connected within the contactor network are to an absence of direct fluid connection between the heat exchange channels between corresponding feed locations and corresponding collection locations for the heat exchange channels. In that sense, the heat exchange channels that are not fluidly cross-connected in the contactor network are part of different heat exchange flow paths through the contactor network. Different portions of the contactor network, such as in different longitudinal portions of the contactor network (which may be provided in different contact modules) may be in the absence of such fluid cross connection between the heat exchange channels in those different portions so that the different portions may provide separate heat exchange flow paths that may deliver such "fresh" feed of the heat exchange fluid to different longitudinal portions of the contactor network along the flow axis.

In some implementations, the multiple collection locations may be first collection locations of a first effluent of the heat exchange cooling fluid received from multiple different locations in the first portion of the contactor network into a first portion of the heat exchange collection channel. In conjunction with such implementations, a second portion of the heat exchange collection channel may be located downstream in the heat exchange cooling fluid direction along the flow axis from the first portion of the heat exchange collection channel. The second portion of the heat exchange collection channel may be fluidly interconnected with heat exchange channels having corresponding second feed locations in the second portion of the contactor network at multiple second locations spaced along the flow axis to receive a second effluent of the heat exchange cooling fluid from multiple different locations in the second portion of the contactor network along the flow axis.

In some arrangements, the contactor unit may include at least one input manifold to supply the feed of heat exchange fluid to the at least one heat exchange feed channel, and to the at least one heat exchange bypass channel if so provided. Further, the contactor unit may include at least one output manifold to receive effluent of the heat exchange fluid from the at least one heat exchange collection channel for removal from the contactor unit. In contemplated embodiments, the at least one input manifold and the at least one output manifold may be configured to facilitate the flow of process fluids through the flow voids of the contactor network. In one approach, the at least one input manifold and at least one output manifold may be located at opposing ends of at least a portion of the contactor unit, and may each be configured to extend at least partially about corresponding open areas through which process fluids may flow. For example, the at least one input manifold and/or the at least one output manifold may be of a ring-like, or annular, configuration. In some implementations, a plurality of different pairs of input manifolds and output manifolds may be provided to supply and remove heat exchange fluid to/from corresponding different portions of the contactor unit along the flow axis thereof.

In some embodiments, the contactor unit may be of a modular configuration. For example, the first heat exchange feed channel, the first portion of the contactor network, the first feed locations, and the first portion of the heat exchange collection channel may be provided in a first contact module of the contactor unit, and the second heat exchange feed channel, the second portion of the contactor network, the second feed locations, and the second portion of the heat exchange collection channel may be provided in a second contact module of the contactor unit. In turn, the first contact module and second contact module may be fluidly interconnectable and disconnectable through interfacing ends thereof to obtain the desired delivery of the feed of the heat exchange fluid and collection of effluent of the heat exchange fluid in the contactor unit. In some arrangements, the first contact module may be provided so as to further include the first portion of the heat exchange bypass channel. The different modules may represent different longitudinal portions of the contactor unit along the flow axis and the different features presented in such different longitudinal portions of the contactor unit. In alternative contemplated implementations, features associated with a module may be combined in a larger unitary structure (e.g., larger module structure or non-modular structure) and provided in corresponding different longitudinal portions of the contactor unit provided in the larger unitary structure.

In contemplated implementations, the interfacing ends of the first contact module and second contact module may be adapted to, or the contactor unit may further comprise at least one intermediate flow control member interposed between the interfacing ends of the first and second contact modules and configured to:

permit or block the flow of the second feed of the heat exchange fluid from the first portion of the heat exchange bypass channel to the second said heat exchange feed channel; and, permit the flow of the first effluent from the first portion of the heat exchange collection channel to the second portion of the heat exchange collection channel.

As may be appreciated, the adaptation of interfacing ends of the first and second contact modules to permit and/or block heat exchange fluid flow, or the configuration of a first said intermediate flow control member interposed therebetween to permit and/or block heat exchange fluid flow, facilitates customization of the contactor unit (e.g. customization to realize the same and/or differing amounts of heat exchange capacity along different portions of the contactor network in different contact modules).

In some embodiments, the contactor unit may include a third said heat exchange feed channel to deliver a third feed of the heat exchange fluid from a second portion of the heat exchange bypass channel to the heat exchange channels in a third portion of the contactor network located along a third longitudinal portion of the flow axis downstream of the second longitudinal portion of the flow axis relative to the heat exchange fluid flow direction. The third said heat exchange feed channel may extend in a direction of the flow axis and may be fluidly interconnected with the heat exchange channels in the third portion of the contactor network at multiple third feed locations spaced along the flow axis to input the third feed of the heat exchange fluid from the second portion of the heat exchange bypass channel into multiple different locations in the third portion of the contact network along the flow axis. In such arrangements, the second portion of the heat exchange bypass channel may be provided in the second contact module. In turn, the interfacing ends of the first contact module and second contact module may be further adapted to, or a first said intermediate flow control member may be configured to:

permit or block the flow of the third feed of the heat exchange fluid from the first portion of the heat exchange bypass channel to the second portion of the heat exchange bypass channel.

In some arrangements, the first portion of the heat exchange bypass channel may include an inlet port to receive the second feed of the heat exchange fluid, a first outlet port to deliver the second feed of the heat exchange fluid to an inlet port of the second said heat exchange feed channel, and a second outlet port to deliver the third feed of the heat exchange fluid to an inlet port of the second portion of the heat exchange bypass channel. Further, the first portion of the heat exchange collection channel may include an outlet port to deliver the first effluent to an inlet port of the second portion of the heat exchange collection channel.

In conjunction with such embodiments, the first outlet port of the first portion of the heat exchange bypass channel, the second outlet port of the first portion of the heat exchange bypass channel, and the outlet port of the first portion of the heat exchange collection channel may each be located at an outlet interfacing end of the first contact module. In turn, the inlet port of the second portion of the heat exchange bypass channel, the inlet port of the second said heat exchange feed channel, and the inlet port of the second portion of the heat exchange collection channel may each be located at an inlet interfacing end of the second contact module.

To facilitate placement and retention of the first contact module and second contact module in a predetermined orientation (e.g. a predetermined orientation in which corresponding inlet and outlet ports are aligned for desired heat exchange fluid flow), one of the outlet interfacing end of the first contact module and the inlet interfacing end of the second contact module may comprise a plurality of male members and the other may comprise a complementary plurality of female members for receiving the plurality of male members. In one approach, the male members may comprise tapered projections and the female members may comprise tapered recesses sized to receive in the male members. For example, when the first contact module and second contact module are positioned in stacked relation to one another, the plurality of male members may be provided at the inlet interfacing end of the second contact module for positioning downward and into the complementary plurality of female members provided at the outlet interfacing end of the first contact module.

In one approach for fluidly interconnecting the first contact module and second contact module, the plurality of male members and the complementary plurality of female members may be configured to:

permit or block the flow of the second feed of the heat exchange fluid therethrough from the first outlet port of the first portion of the heat exchange bypass channel to the inlet port of said second said heat exchange feed channel;

permit or block the flow of the third feed of the heat exchange fluid therethrough from the second outlet port of the first portion of the heat exchange bypass portion to the inlet port of the second portion of the heat exchange bypass channel; and, permit the flow of the first effluent therethrough from the outlet port of the first portion of the heat exchange collection channel to the inlet port of the second portion of the heat exchange collection channel.

As may be appreciated, such approach facilitates placement and retained positioning of the first and second contact modules in a predetermined orientation, as well as desired fluid interconnections therebetween. Further, in such arrangements, the male and complementary, female members may be configured (e.g. tapered) to yield a compression-fit fluid seal therebetween.

In another approach for fluidly interconnecting the first contact module and second contact module, a first contactor unit may include a first intermediate flow control member as noted above, wherein the first intermediate flow control member may be configured to permit and/or block the flow of heat exchange fluid between ports of the outlet interfacing end of the first contact module and ports of the inlet interfacing end of the second contact module. More particularly, the first said intermediate flow control member may be configured to:

permit or block the flow of the second feed of the heat exchange fluid therethrough from the first outlet port of the first portion of the heat exchange bypass channel to the inlet port of said second said heat exchange feed channel;

permit or block the flow of the third feed of the heat exchange fluid therethrough from the second outlet port of the first portion of the heat exchange bypass portion to the inlet port of the second portion of the heat exchange bypass channel; and, permit the flow of the first effluent therethrough from the outlet port of the first portion of the heat exchange collection channel to the inlet port of the second portion of the heat exchange collection channel.

In conjunction with such approach, a plurality of male members and/or a plurality of complementary female members may be provided at interfacing ends of the first intermediate flow control member and first and second contact members, thereby facilitating placement and retention of the first intermediate flow control member and first and second contact modules in predetermined desired orientations, as well as predetermined desired heat exchange fluid flow therebetween.

In conjunction with further embodiments, the third heat exchange feed channel, the third portion of the contactor network, the third feed locations, and the third portion of the heat exchange collection channel (e.g. to collect effluent of the third feed of the heat exchange fluid) may be provided in a third contact module of the contactor unit. In turn, the second contact module and third contact module may be fluidly interconnectable through interfacing ends thereof to obtain the desired delivery of the feed of the heat exchange fluid and collection of effluent of the heat exchange fluid in the contactor unit.

In contemplated implementations, the interfacing ends of the second contact module and third contact module may be adapted to, or the contactor unit may further comprise a second intermediate flow control member interposed between the interfacing ends of the second and third contact modules and configured to:

permit or block the flow of the third feed of the heat exchange fluid from the second portion of the heat exchange bypass channel to the third said heat exchange feed channel; and, permit the flow of the second effluent from the second portion of the heat exchange collection channel to the third portion of the heat exchange collection channel.

As may be appreciated, the adaptation of interfacing ends of the second and third contact modules to permit and/or to block heat exchange fluid flow, or the configuration of a second said intermediate flow control member interposed to permit and/or block heat exchange fluid flow, further facilitates customization of the contactor unit (e.g. customization to realize the same and/or differing amounts of heat exchange capacity along different portions of the contactor network in different contact modules). As may be appreciated, the contactor unit in a modular configuration may include more than three modules, each including a different position of the contactor network.

In some embodiments, a contactor unit may be provided wherein the at least one heat exchange feed channel is located in an outer region of the contactor unit, and the plurality of heat exchange channels are located in an inner region of the contactor unit. In some arrangements, the outer region may extend about and along the inner region. Additionally, the at least one heat exchange channel and/or the at least heat exchange bypass channel may be located in the outer region. In some arrangements, the at least one heat exchange feed channel may extend about and along at least a portion of the inner region of the contactor unit (e.g. the at least one heat exchange feed channel may spiral about and along at least a portion of the inner region), thereby facilitating the delivery of the heat exchange fluid at multiple feed locations radially offset about and longitudinally offset along the inner region. Further, the at least one heat exchange collection channel may be provided to extend about and along at least a portion of the inner region, (e.g. the at least one heat exchange collection channel may spiral about and along at least a portion of the inner region), thereby facilitating the collection of effluent of heat exchange fluid at multiple collection locations radially offset and longitudinally offset along the inner region. Further, the at least one heat exchange bypass channel may be configured to extend linearly or nearly linearly along the inner region within the outer region of the contactor unit.

Relatedly, in some embodiments, the output ports of an input manifold, the inlet and outlet ports of a first and/or multiple contact modules, and the outlet ports of an output manifold, may all be located in the outer region of the contactor unit. In that regard, the input manifold and output manifold may be located within the outer region of the contactor unit, thereby facilitating the flow of process fluids through the voids of the contactor network and opposing ends of the contactor unit.

The carbon dioxide capture system and associated carbon dioxide capture method of the present disclosure are particularly beneficial for applications involving scrubbing carbon dioxide from combustion flue gas streams and other similar industrial by-product streams. Unlike typical gas feed streams for gas sweetening operations, flue gas feed for carbon dioxide scrubbing tend to contain significant concentrations of oxygen gas not consumed during the combustion operation. Gas feed for flue gas scrubbing applications may often be a dehumidified flue gas stream, in which the gas stream has been cooled following combustion to condense primarily water, and other condensable components, from the gas stream. As may be appreciated, even though most water from combustion has been condensed out with temperature reduction of a flue gas stream to prepare a dehumidified gas stream, such a dehumidified gas stream will still typically be saturated with water vapor, and may be saturated with water vapor as fed to a carbon dioxide scrubbing vessel. Such a dehumidified gas stream feed to the carbon dioxide scrubbing vessel may contain a significant concentration of oxygen gas ($O_2$), for example at least 0.5 volume percent, at least 2 volume percent, at least 4 volume percent or even at least 6 volume percent, although such oxygen gas concentration may often be no larger than 18 volume percent, 14 volume percent, 10 volume percent or even 8 volume percent. Flue gas feed to carbon dioxide scrubbing from combustion of coal tends to have a lower oxygen gas concentration, often in a range of 3-8 volume percent (on a dry basis as fed to a scrubbing vessel), whereas flue gas feed to carbon dioxide scrubbing from combustion of natural gas tends to have a higher oxygen gas concentration, often as high as 16-17 volume percent (also on a dry basis). The presence of the oxygen gas leads to oxidative degradation of organic components of the amine-based scrubbing solution, including the active amine compounds. The presence of oxygen gas in gas feed to an amine-based carbon dioxide scrubbing operation is a significant problem with flue gas scrubbing operations in particular. Oxidative degradation products in the scrubbing vessel represent both a loss of scrubbing solution and potential environmental emission control complications. Oxidative degradation reactions have faster kinetics at higher temperatures, and even relatively small excesses in the temperature or excess temperature spikes of even relatively short duration during a scrubbing operation relative to what may be desired for efficient carbon dioxide capture may have a significant detrimental impact on the rate at which such degradation products are generated. Combustion flue gas from combustion of natural gas tends to have a much higher concentration of oxygen gas than flue gas from combustion of coal, for example in electrical power generation operations. As such, problems associated with presence of oxygen gas in a feed stream to carbon dioxide scrubbing may be particularly heightened for flue gas feed from combustion of natural gas or methane. These problems are generally not an issue with gas sweetening applications, for which feed gas streams tend to contain no or minimal amounts of oxygen gas. With the carbon dioxide capture system and carbon dioxide capture method of the present disclosure, and in particular with incorporation of the mass transfer contactor unit, heat removal may be targeted to high gas-liquid mass transfer zones within the scrubbing vessel where exothermic heat generation may be at a maximum, and where even a relatively brief spike in temperature may significantly detrimentally increase oxidative degradation of organic components of the scrubbing solution. This may be particularly advantageous when operating at a low L/G ratio, where maximum temperatures in the scrubbing vessel may otherwise tend to be higher and may otherwise occur at a bulge in the temperature profile in a top portion of a vertically-oriented scrubbing vessel operated in counter-current flow adjacent to the introduction of lean scrubbing solution. Positioning of the mass transfer contactor unit to provide active heat exchange within the scrubbing vessel in areas of highest mass transfer rates, and highest exothermic heat generation, provides significant flexibility to control temperature and temperature profile within the scrubbing vessel, and to avoid detrimental temperature spikes. In that regard, the carbon dioxide capture system and method of this disclosure is particularly advantageous for use in low pressure carbon dioxide scrubbing applications, such as is the case with flue gas scrubbing. Such a low pressure application may be operated with a maximum pressure in the scrubbing vessel, and the gas feed stream may be introduced into the scrubbing vessel, at a pressure of no higher than 5 bars, preferably no higher than 3 bars, and even more preferably no higher than 2 bars. Flue gas scrubbing applications are often operated near atmospheric pressure. Scrubbing in such low pressure applications is particularly prone to development of temperature spikes, or temperature bulge profiles, which may be problematic, for example in relation to oxidative degradation of scrubbing solution components. In contrast, gas sweetening applications are often operated at vessel pressures of 30 bars or more, and may even be at a level of 100 bars or more, tend to have no oxygen gas and tend to be operated at higher L/G ratios at which temperature spikes and bulges are generally not a problem. However, even though the carbon dioxide capture system is disclosed primarily as designed for and is particularly advantageous for use in low pressure applications such as for flue gas scrubbing operations, the design provides significant flexibility, and may be used for gas sweetening or other applications as well. The mass transfer contactor unit also permits more flexible adaptation to processing gas sweetening feed streams having varying levels of carbon dioxide, with better adaptation to carbon dioxide absorption rates and heat generation with different levels of carbon dioxide in feed gas streams.

Although the description provided herein may be primarily in reference to an application aspect for use of the contactor unit, or module, in systems and methods for carbon dioxide capture using amine-based scrubbing solutions, the contactor unit may be employed in other applications involving fluid treating systems and fluid treatment methods more generally, and for other particular applications. In that regard, an aspect of the present disclosure provides a fluid treating system, and method for fluid treatment, for mass transfer between fluid phases in process fluids in a process vessel including a fluid mass transfer contactor unit, whether or not for carbon dioxide capture. In various embodiments of a fluid treating system, the process vessel may include:

- a fluid inlet to receive a feed stream of a first process fluid to the vessel, the feed stream of the first process fluid including at least a first fluid phase with material to be transferred to a second fluid phase in an internal volume of the vessel;
- a fluid outlet to output a process effluent stream including the second fluid phase having transferred material from the first process fluid;
- a flow axis extending in a longitudinal direction along the vessel away from a location corresponding with the fluid inlet;
- a fluid mass transfer contactor unit disposed in the internal volume along the flow axis to contact the process fluids moving through the internal volume to facilitate mass transfer of the material from the first fluid phase to the second fluid phase, the contactor unit including a contactor network of flow diversion barriers with flow voids for movement of the process fluids between the flow diversion barriers, the contactor unit further comprising:
- a plurality of heat exchange channels in the flow diversion barriers to transport heat exchange fluid through the contactor network to heat or cool the process fluids moving through the flow voids during a fluid treating operation;
- at least one heat exchange feed channel to deliver feed of the heat exchange fluid to the heat exchange channels, wherein the heat exchange feed channel extends in a direction of the flow axis and is fluidly connected with the heat exchange channels at multiple feed locations spaced along the flow axis to input the feed of the heat exchange fluid into multiple different locations in the contactor network along the flow axis. The features and various embodiments summarized above in relation to the contactor unit apply equally to applications other than carbon dioxide capture from a gas mixture with an amine-based scrubbing solution.

As may be appreciated, various applications may involve vessels of various designs and may include vessels that extend longitudinally in a vertical, horizontal or inclined orientation. The flow axis for each such vessel may extend in the same longitudinal direction as the longitudinal extension of the process vessel. For example the flow axis may extend vertically in a vertically-extending vessel, the flow axis may extend horizontally in a horizontally-extending vessel and may extend at an inclination other than vertical in a vessel that extends at an inclination other than vertical. The flow axis may extend in a direction of process fluid movement through the process vessel. In a case of counter-current flow of different fluids through a process vessel, the direction of fluid movement through the process vessel may be in opposite directions along the flow axis. In the description provided herein, processing is shown and described with each process fluid input stream being introduced into the process vessel only at a single feed location along the flow axis and each process fluid output stream being removed from the process vessel only at a single withdrawal location along the flow axis. As may be appreciated, fluid treating systems and fluid treatment methods described herein may include multiple fluid feed locations along a flow axis for introduction of a process fluid input into the process vessel and/or multiple fluid withdrawal locations along a flow axis for removal of a process fluid output from the process vessel.

The contactor unit may have a longitudinally extending flow axis that aligns with the flow axis of the process vessel. The flow axis of the contactor unit may extend in a direction of flow of process fluids through the contactor network (direction of progression of process fluids through the flow voids of the contactor network) from a process fluid inlet side to a process fluid outlet side of the contactor network. As with the process vessel, in the case of counter-current processing, an inlet side of a contactor network for one process fluid may be an outlet side for another process fluid that is moving in an opposite direction along the flow axis.

The process fluids in the process vessel are the fluids to be treated for mass transfer between fluid phases in the process vessel, and that move through the flow voids between the flow diversion barriers of the contactor unit to assist or promote such mass transfer. Flow of such process fluids contacts an exterior of the flow diversion barriers, whereas the heat exchange channels that may carry heat exchange fluid are internal to the flow diversion barriers, and heat exchange through the wall of the flow diversion barriers between the process fluids moving through in the flow voids and heat exchange fluid flowing through the heat exchange channels may heat or cool the process fluids, depending on whether the heat exchange fluid is hotter or colder than the process fluids. The process fluids in the process vessel may involve two or more than two fluid phases, with material of at least one fluid phase (first fluid phase) being transferred to at least one other fluid phase (second fluid phase). The material being transferred may or may not be present in the same form following mass transfer to the second fluid phase as it had in the first fluid phase prior to or during transfer. For example, a component leaving a first fluid phase may be involved in a chemical reaction or series of chemical reactions during or following mass transfer into the second material phase, and only a portion of an original component exiting the first fluid phase may be present or retained in the second fluid phase or may be present in a different form as a result of such a reaction or reactions. Also, mass transfer from a first fluid phase to a second fluid phase may involve an intermediate transfer through a third fluid phase and/or an intermediate retention on a catalytic or other surface intermediary, which surface may be provided for example at a surface of the flow diversion barriers exposed in the flow voids of the contactor network.

In some embodiments the first fluid phase may be fed to the process vessel in a feed stream, which may be a single phase stream or a multi-phase stream. In other embodiments, the first fluid phase may form in the process vessel during processing. Similarly, the second fluid phase may be fed to the process vessel in a feed stream, which may be single phase stream or a multi-phase stream, while in other embodiments the second phase may be formed in the process vessel. This may be the case for example in the case of regeneration processing to regenerate carbon dioxide scrubbing solution, where the second fluid phase may be a carbon dioxide gas formed in the process vessel from carbon dioxide released in the process vessel from rich scrubbing solution.

One example application for such a fluid treating system is for a regeneration operation to regenerate lean amine-based scrubbing solution for carbon dioxide capture. Incorporating the mass transfer contactor unit in the regeneration vessel permits thermal input to drive off carbon dioxide to be more specifically targeted to reduce the likelihood of generating a higher temperature than desired within the regeneration vessel. This may be a more significant issue for flue gas scrubbing operations than gas sweetening operations, because the higher pressures during carbon dioxide scrubbing permit the use of a significant pressure drop in pressure to contribute to driving force for liberation of carbon dioxide from the scrubbing solution during regeneration. Thus, regeneration processing for gas sweetening applications may be conducted with lower temperatures than might be used during regeneration for flue gas treatment operations, and the need for targeted control of temperature and temperature profile within the regeneration vessel for flue gas scrubbing applications is of heightened concern.

Numerous additional features and advantages of the present disclosure will become apparent to those skilled in the art upon consideration of the embodiment descriptions provided hereinbelow.

BRIEF DESCRIPTION OF THE DRAWINGS

FIG. 4 illustrates the contactor unit embodiment of FIG. 3 together with temperature profiles reflecting temperature adjustment of process fluids by the contactor unit embodiment.

FIG. 6B illustrates an embodiment of an output manifold employable in the contactor unit embodiment of FIG. 2 and/or the contactor unit embodiment of FIG. 3.

DETAILED DESCRIPTION

Figure 1:
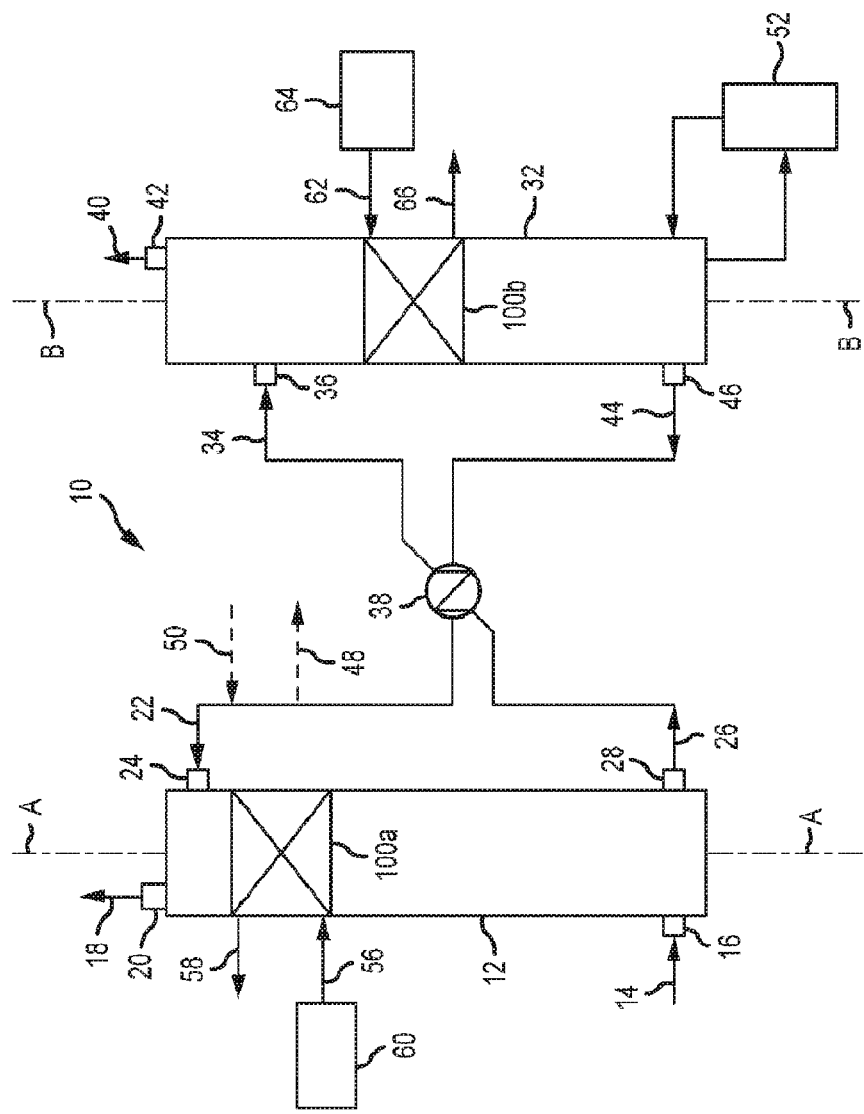
FIG. 1 illustrates an embodiment of a carbon dioxide capture system for capturing carbon dioxide from a carbon dioxide-containing gas mixture.

FIG. 1 generally illustrates some features of an example carbon dioxide capture system 10 including a scrubbing operation in which a carbon dioxide-containing gas mixture is contacted with lean amine-based scrubbing solution to remove carbon dioxide from the gas mixture and including a regeneration operation in which carbon dioxide is released from rich scrubbing solution to regenerate lean scrubbing solution that may be used for further carbon dioxide capture in the scrubbing operation.

FIG. 1 illustrates an example scrubbing operation performed in a packed scrubbing vessel 12, illustrated in the form of a packed column, having an internal volume in which a carbon dioxide-containing gas mixture is contacted with an amine-based scrubbing solution to remove carbon dioxide from the gas mixture for capture in the scrubbing solution. As shown in the example of FIG. 1, a carbon dioxide-containing gas feed stream 14 is introduced into the interior volume of the scrubbing vessel 12 through a gas inlet 16 and a treated gas stream 18 with reduced carbon dioxide content is removed from of the interior volume of the scrubbing vessel 12 through a gas outlet 20. A scrubbing solution feed stream 22 with lean scrubbing solution is introduced into the interior volume of the scrubbing vessel 12 through a liquid inlet 24 and a scrubbing solution effluent stream 26 with rich scrubbing solution containing captured carbon dioxide is removed from the interior of the scrubbing vessel 12 through a liquid outlet 28. FIG. 1 shows a flow axis AA for the column extending in a direction of flow through the scrubbing vessel 12 between the fluid inlets and outlets. In the example shown in FIG. 1, contacting between the gas mixture being treated and the scrubbing solution is in a counter-current flow arrangement, with the gas mixture having an upward flow direction through the scrubbing vessel 12 along the flow axis AA from the gas inlet 14 toward the gas outlet 18 and with the scrubbing solution having a downward flow direction through the scrubbing vessel 12 along the flow axis AA from the liquid inlet 22 toward the liquid outlet 26.

FIG. 1 illustrates an example regeneration operation performed in a regeneration vessel 32 shown in the form of a stripping vessel, such as a stripping column. Regenerator feed 34 including rich scrubbing solution from the scrubbing solution effluent 26 is introduced into the regeneration vessel 32 through a feed inlet 36 after being preheated in a heat exchanger 38. In the regeneration vessel 32 carbon dioxide is released from the scrubbing solution and a purified carbon dioxide gas stream 40 made up predominantly of carbon dioxide is removed from the regeneration vessel 32 through a gas outlet 42. Lean scrubbing solution 44 with reduced carbon dioxide content is removed from the regeneration vessel 32 through an outlet 46 and after being cooled in the heat exchanger 38 is recycled for use to prepare the scrubbing solution feed 22 to the scrubbing vessel 12. As shown in FIG. 1, a portion of the lean scrubbing solution 44 may be removed from the system in a bleed stream 48 as needed, and additional fresh scrubbing solution 50 may be added as needed. Other or alternative bleed and make-up streams may be included as convenient.

The scrubbing vessel 12 is typically operated at a lower temperature than the regeneration vessel 32. Temperatures in the scrubbing vessel 12 for example may often be in a range of from about 25° C. to 70° C. and temperatures in the regeneration vessel 12 may for example often reach 100° C. or higher. Supplemental heating and/or cooling may be provided at various points in the system as needed or desired. In the example of FIG. 1, supplemental heat is supplied to the regeneration vessel 32 by a reboiler 52 that heats and returns to the regeneration vessel 32 at least a portion of column bottoms. The heat exchanger 38 is used to improve thermal efficiency by recovering heat from the regeneration vessel to preheat rich scrubbing solution for feed to the regeneration vessel and to correspondingly pre-cool lean scrubbing solution for feed to the scrubbing vessel 12.

As shown in FIG. 1, the scrubbing vessel 12 and the regeneration vessel 32 each includes a fluid contactor unit 100 (identified as 100a and 100b, respectively) to promote effective contact between different fluid phases for enhanced mass transfer between the different fluid phases. Turning first to the scrubbing vessel 12, the scrubbing vessel 12 includes the fluid contactor unit 100a to promote gas-liquid contact in the scrubbing vessel 12. The contactor unit 100a is disposed in the flow path along the flow axis AA between the gas inlet 16 and the gas outlet 20 and between the liquid inlet 24 and the liquid outlet 28. The contactor unit 100a provides packing to enhance gas-liquid contact and mass transfer between the gas and liquid phases moving through the contactor unit 100a. The contactor unit 100a includes an active heat exchange aspect in which heat exchange fluid may be passed through the contactor unit to heat or cool process fluids (e.g., carbon dioxide-containing gas mixture and scrubbing solution) moving through the contactor unit 100a during a carbon dioxide scrubbing operation. FIG. 1 illustrates heat exchange fluid feed 56 from a heat exchange fluid source 60 being introduced into the scrubbing vessel 12 to feed the contactor unit 100a and heat exchange fluid effluent 58 from the contactor unit 100a being removed from the scrubbing vessel 12. The heat exchange fluid may for example be any gas or liquid composition for a desired heat exchange condition, with liquid heat exchange fluids, and particularly water, having higher heat capacities being beneficial for use in many heat exchange situations. The heat exchange fluid source 60 may include a pump or compressor to supply the heat exchange fluid feed 56 at a desired pressure and feed rate to the contactor unit 100a. The contactor unit 100a may be used in a heating mode to heat process fluids passing through the contactor unit 100a (in which case the heat exchange fluid effluent 58 will be cooler than heat exchange fluid feed 56) or in a cooling mode to cool process fluids passing through the contactor unit 100a (in which case the heat exchange fluid effluent 58 will be hotter than the heat exchange fluid feed 56).

Similarly, the regeneration vessel 32 includes the fluid contactor unit 100b to promote fluid contact in the regeneration vessel 32. The contactor unit 100b is disposed in the flow path along the flow axis BB extending longitudinally through though the regeneration vessel 32, and extending away along the regeneration vessel away from the feed inlet 36. The contactor unit 100b provides packing to enhance fluid contact of process fluids moving through the regeneration vessel 32 to enhance and mass transfer of carbon dioxide out of the liquid phase of the scrubbing solution and into a carbon dioxide gas phase as carbon dioxide is released from the rich scrubbing solution fed to the regeneration vessel 32. The contactor unit 100b includes an active heat exchange aspect in which heat exchange fluid may be passed through the contactor unit to heat or cool process fluids (e.g., scrubbing solution and carbon dioxide gas phase) moving through the contactor unit 100b during a scrubbing solvent regeneration operation. FIG. 1 illustrates heat exchange fluid feed 62 from a heat exchange fluid source 64 being introduced into the regeneration vessel 32 to feed the contactor unit 100b and heat exchange fluid effluent 66 from the contactor unit 100b being removed from the regeneration vessel 32. The heat exchange fluid may for example be any gas or liquid composition for a desired heat exchange condition, with liquid heat exchange fluids, and particularly water, having higher heat capacities being beneficial for use in many heat exchange situations. The heat exchange fluid source 64 may include a pump or compressor to supply the heat exchange fluid feed 62 at a desired pressure and feed rate to the contactor unit 100b. The contactor unit 100b may be used in a heating mode to heat process fluids passing through the contactor unit 100b (in which case the heat exchange fluid effluent 66 will be cooler than heat exchange fluid feed 62) or in a cooling mode to cool process fluids passing through the contactor unit 100b (in which case the heat exchange fluid effluent 66 will be hotter than the heat exchange fluid feed 62).

Amine-based scrubbing of carbon dioxide is a known technique, and the amine-based scrubbing solution used in the processing of FIG. 1 may be any composition including amine compounds for carbon dioxide capture. The scrubbing solution may often be in the form of an aqueous liquid (water present at highest molar concentration) containing one or a mixture of more than one dissolved amine compounds contributing to carbon dioxide capture. Other carbon dioxide capture agents in addition to amine compounds may also be present in the scrubbing solution. A variety of carbon capture mechanisms may be involved in the scrubbing solution, including for example through formation of carbonates or carbamates or through high solubility of carbon dioxide in the scrubbing solution. A variety of non-aqueous amine-based scrubbing solutions have also been described for use in amine-based scrubbing of carbon dioxide. A variety of amine compounds and formulations of amine compounds are known for use in carbon dioxide capture formulations and additional amine compounds continue to be identified for use. Some example amine compounds that may be included in a scrubbing solution include primary, secondary and tertiary amines. Some specific example amine compounds include monoethanolamine, diethanolamine, N-methylethanolamine, diisopropanolamine, aminoethoxy ethanol (diglycolamine), 2-amino-2-methylpropanol, benzylamine, methyl diethanolamine, a substituted benzylamine and piperazine. In addition to one or more amine or other compounds active for carbon dioxide capture, such scrubbing solutions may optionally include other components (typically also dissolved in water in aqueous scrubbing solutions), for example to promote more rapid absorption of carbon dioxide (carbon dioxide absorption kinetics) into the liquid phase and/or to increase solubility of carbon dioxide in the liquid phase.

Capture of carbon dioxide into amine-based scrubbing solutions may be a highly exothermic process, providing potential for generation of higher temperatures in the scrubbing vessel 12 than may be desired. In the case of processing combustion flue gases, the gas feed stream may include significant quantities of oxygen gas, which may react with amine components or other organic components in the scrubbing solution to generate oxidation degradation products, which represent a loss of scrubbing solution and potential environmental emission complications. Oxidation degradation reactions will have faster kinetics at higher temperatures, and even relatively small excesses in the temperature in the scrubbing vessel 12 relative to what is desired for carbon dioxide scrubbing may have a significant detrimental impact on the rate at which such degradation products are generated. Excessive temperatures in the scrubbing vessel 12 may also result in a higher level of thermal degradation products. Occurrence of an undesirably high temperature in a top portion of the scrubbing vessel 12 near the gas outlet 20 may increase the presence of volatile emissions in the treated gas stream 18.

In one implementation, as illustrated in FIG. 1, such a contactor unit 100a may be located in an upper portion of the scrubbing vessel 12 and operated in a cooling mode to lower the temperature of the scrubbing solution in the upper portion of the scrubbing vessel 12. When operating the scrubbing vessel 12 at a low liquid:gas ratio to efficiently use carbon dioxide capture capacity of the scrubbing solution, there may be a susceptibility for significant exothermic heat generation with a corresponding temperature bulge (bulge in the temperature profile) in the upper portion of the scrubbing vessel 12. In some preferred implementations, such a contactor unit 100a may be located to cool process fluids in a region of maximum exothermic heat generation in the scrubbing vessel 12.

In contrast to carbon dioxide scrubbing, regeneration of amine-based scrubbing solution to release captured carbon dioxide is typically an endothermic process, and heat is typically provided to the process fluids to provide the heat for the endothermic process. Therefore, in the regeneration processing in the regeneration vessel 32 of FIG. 1, the contactor unit 100b may often be operated in a heating mode with a feed of heat exchange heating fluid being provided to the contactor unit 100b in the heat exchange fluid feed 62. The heat exchange fluid feed 62 may, for example, be in the form of steam that may condense in the contactor unit 100b and may be removed as condensed water in the heat exchange fluid effluent 66. In the illustration of FIG. 1, the regeneration vessel 32 is shown including only a single contactor unit 100b. However in alternative implementations the regeneration vessel 32 may include multiple such contactor units 100b with different ones of such contactor units 100b located at different locations along the fluid axis where heating or cooling is desired. In addition to such a contactor unit 100b, other portions of the regeneration vessel 32 may contain other types of packing, for example structured packing or random packing not including an active heat exchange aspect.

In the illustration of FIG. 1, the scrubbing vessel 12 is shown including only a single contactor unit. However in alternative implementations the scrubbing vessel may include multiple such contactor units 100a with different ones of such contactor units 100a located at different locations along the fluid axis where heating or cooling is desired. In addition to such a contactor unit 100a, other portions of the scrubbing vessel 12 may contain other types of packing, for example structured packing or random packing not including an active heat exchange aspect.

FIG. 1 is of a general nature to illustrate some particular processing features. FIG. 1 shows the carbon dioxide capture system 10 as including only a single scrubbing vessel 12 and only a single regeneration vessel 32. In alternative implementations, the carbon dioxide capture system 10 may include multiple carbon dioxide scrubbing vessels 12 and/or multiple regeneration vessels 32, which may for example be arranged for parallel operation. Various implementations of the carbon capture system 10 illustrated in FIG. 1 may include processing equipment/and or processing unit operations in addition to those illustrated in FIG. 1. For example additional equipment or operations may be included upstream of the scrubbing vessel 12 to dry, pre-cool or otherwise prepare or condition a gas mixture to provide the gas feed stream 14, may be included in connection with operation of the scrubbing vessel 12, may be included in connection with operation of the regeneration vessel 32, may be included between the scrubbing vessel 12 and the regeneration vessel 32, may be included to further treat the treated gas stream 18, may be included to further treat the purified carbon dioxide gas stream 40 and/or may be included to provide the heat exchange fluid feed 56 or the heat exchange fluid feed 62 or to further process or treat the heat exchange fluid effluent 58 or the heat exchange fluid effluent 66. In some alternative examples, the scrubbing vessel 12 may include multiple feeds of carbon dioxide containing gas mixture for scrubbing in the scrubbing vessel 12, for example with different gas feed streams 14 introduced at different elevations in the scrubbing vessel.

Figure 2:
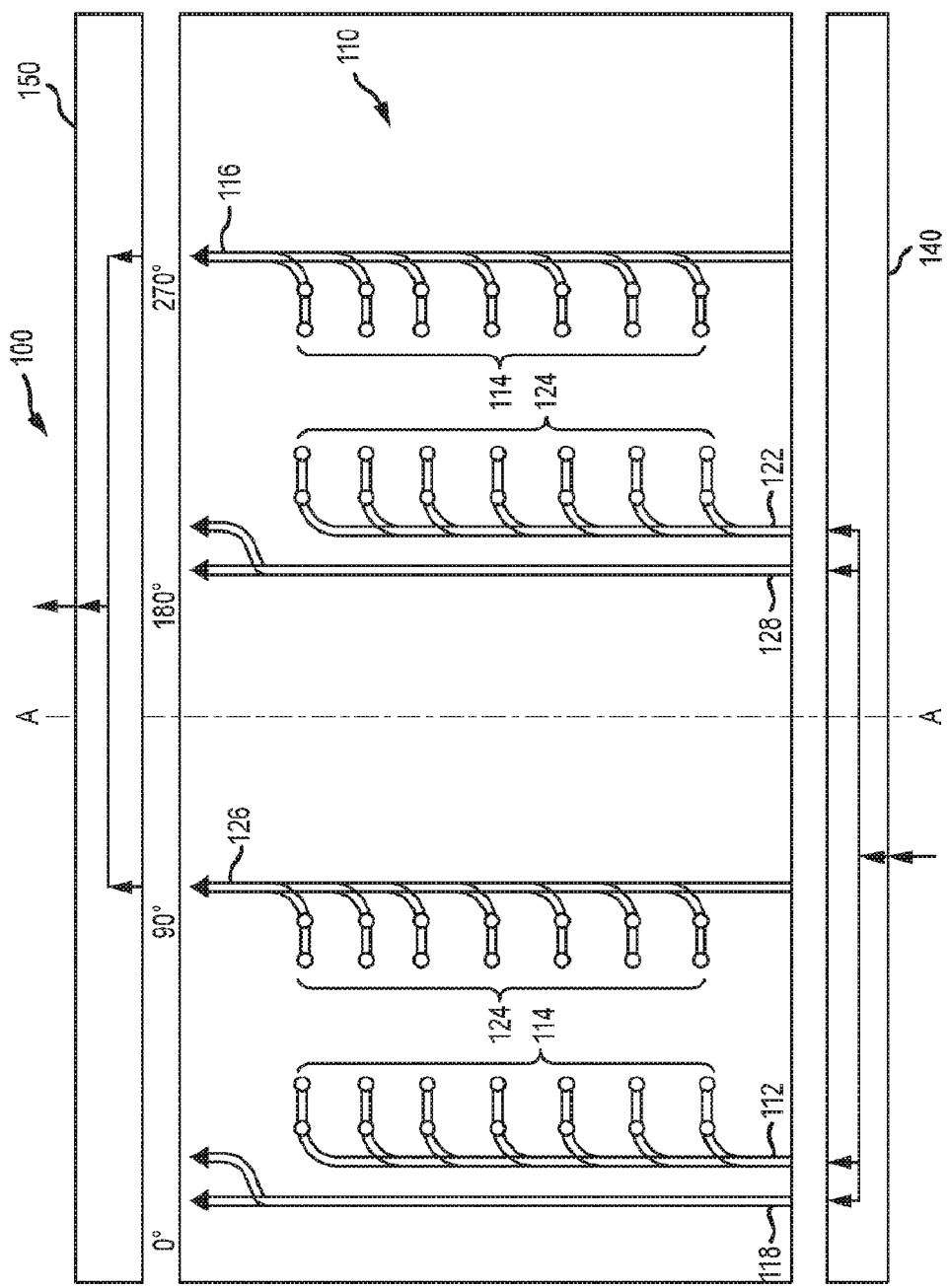
FIG. 2 illustrates an embodiment of a contactor unit employable in the system embodiment of FIG. 1.

Reference is now made to FIG. 2 which illustrates an embodiment of contactor unit 100. Contactor unit 100 may include at least a first contact module 110, an input manifold 140 for providing a feed of heat exchange fluid to the contact module 110 (e.g. a heat exchange cooling or heating fluid), and an output manifold 150 for receiving the heat exchange fluid from the first contact module 110. As will be further described, the first contact module 110, and optional additional fluidly interconnectable contact modules, may be disposed along a flow axis AA that extends in direction along the scrubbing vessel described above in relation to FIG. 1, e.g. from a location corresponding with the gas inlet to a distant location corresponding with the gas outlet described in relation to FIG. 1.

First contact module 110 may include at least a first heat exchange feed channel 112 that is provided to deliver the feed of the heat exchange fluid to a first plurality of heat exchange channels 114, wherein the first heat exchange feed channel 112 extends in a direction of the flow axis AA, and is fluidly interconnected with the first plurality of heat exchange channels 114. The first plurality of heat exchange channels 114 may be provided in corresponding flow diversion barriers that comprise a contactor network of flow diversion barriers with flow voids for movement of process fluids (e.g. the gas mixture and scrubbing solution described above in relation to FIG. 1) between the flow diversion barriers. The first heat exchange feed channel 112 may be fluidly interconnected to the heat exchange channels 114 at multiple feed locations spaced along a first portion of the contactor network disposed along a first longitudinal portion of the flow axis AA to input the feed of the heat exchange fluid into a multiple different locations along the flow axis AA.

The contactor network of flow diversion barriers may be provided to divert the flow of process fluids, thereby facilitating increased contact between different constituents of the process fluids (e.g. between the gas mixture and the scrubbing solution described above in relation to FIG. 1). In turn, the heat exchange fluid may be flowed through the heat exchange channels 114 for thermal exchange with the process fluids, as may be desirable. For example, a heat exchange cooling fluid may be flowed through the heat exchange channels 114 to cool process fluids, e.g. to reduce undesirable degradation of scrubbing solution constituents, or heat exchange heating fluid may be flowed through the heat exchange channels to heat process fluids.

First contact module 110 may further comprise at least a first heat exchange collection channel 116 to collect effluent of the heat exchange fluid from the first plurality of heat exchange channels 114 for passage to the output manifold 150 or to an additional contact module disposed between the first contact module 110 and output manifold 150. As shown in FIG. 2, the first heat exchange collection channel 116 may extend in a direction of the flow axis AA and may be fluidly connected with the first plurality of heat exchange channels 114 at multiple collection locations spaced along the flow axis AA so as to receive the effluent of the heat exchange fluid at multiple different locations along the flow axis AA.

In contemplated implementations, at least a portion or all of the first plurality of heat exchange channels 114 and corresponding diversion barriers may branch-out and cross-connect, both physically and fluidly, to define a web-like contactor network extending across the flow path of process fluids through a process vessel. In that regard, at least a portion or all of the first plurality of heat exchange channels 114 may extend non-linearly along the flow axis AA. For example, the first plurality of heat exchange channels 114 may extend in a spiral-like manner along the flow axis AA. In one arrangement, the first plurality of heat exchange channels 114 may extend along the flow axis AA according to a common, predetermined function (e.g. a gyroid configuration, a helical configuration, etc.) or parametrically repeating pattern.

Figure 3:
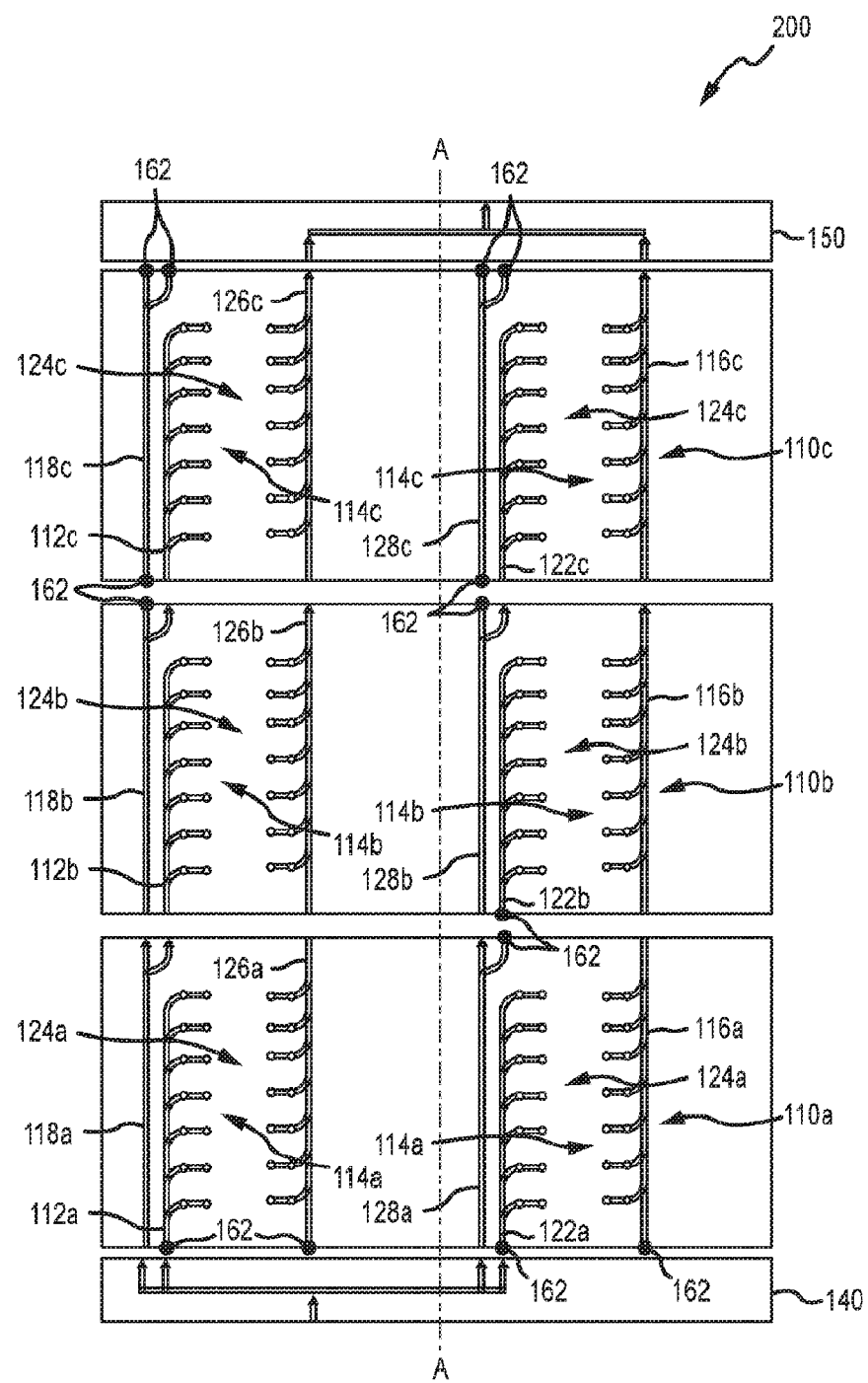
FIG. 3 illustrates another embodiment of a contactor unit comprising a plurality of interconnectable contact modules.
Figure 7:
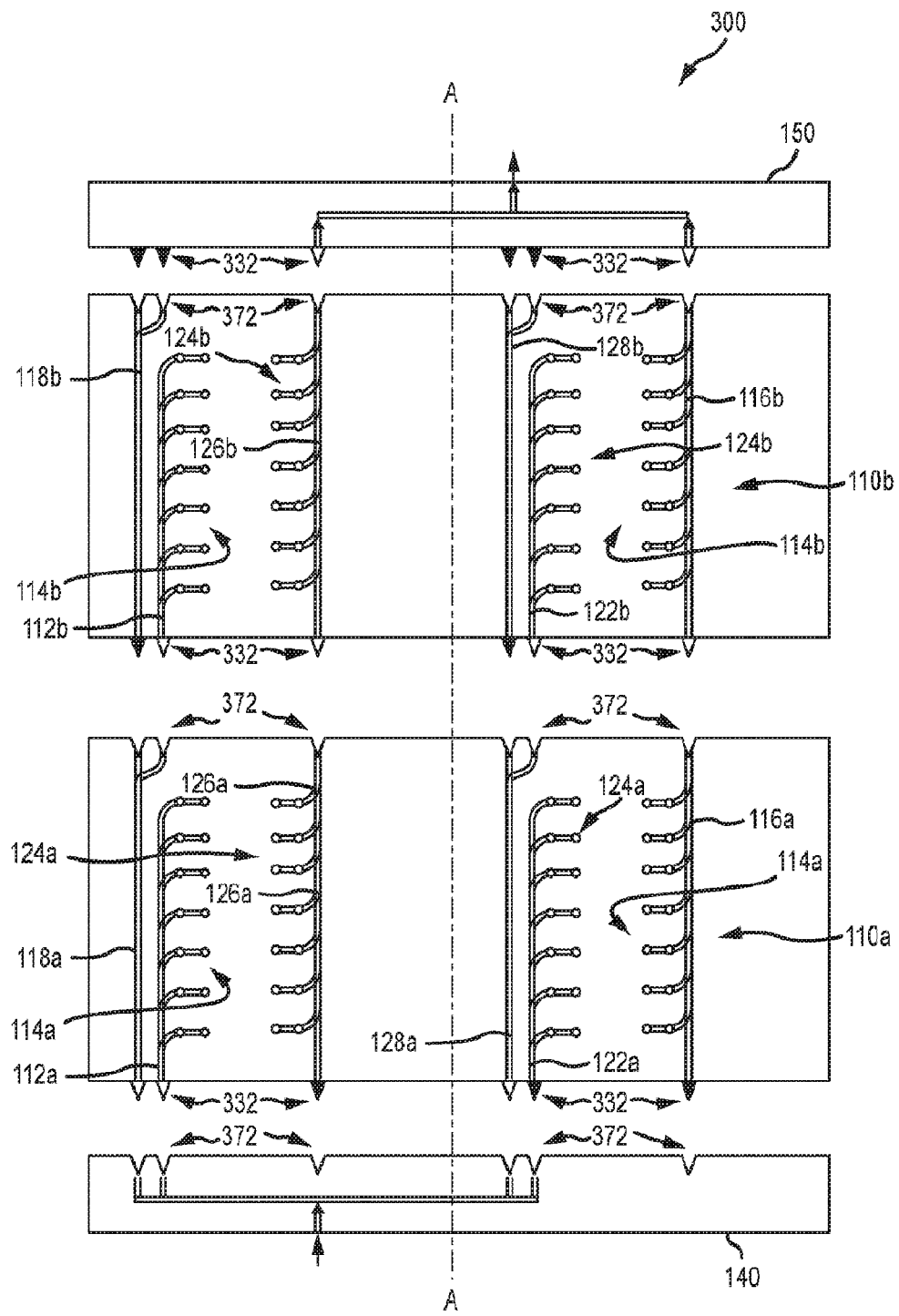
FIG. 7 illustrates another embodiment of a contactor unit comprising a plurality of interconnectable contact modules.
Figure 8:
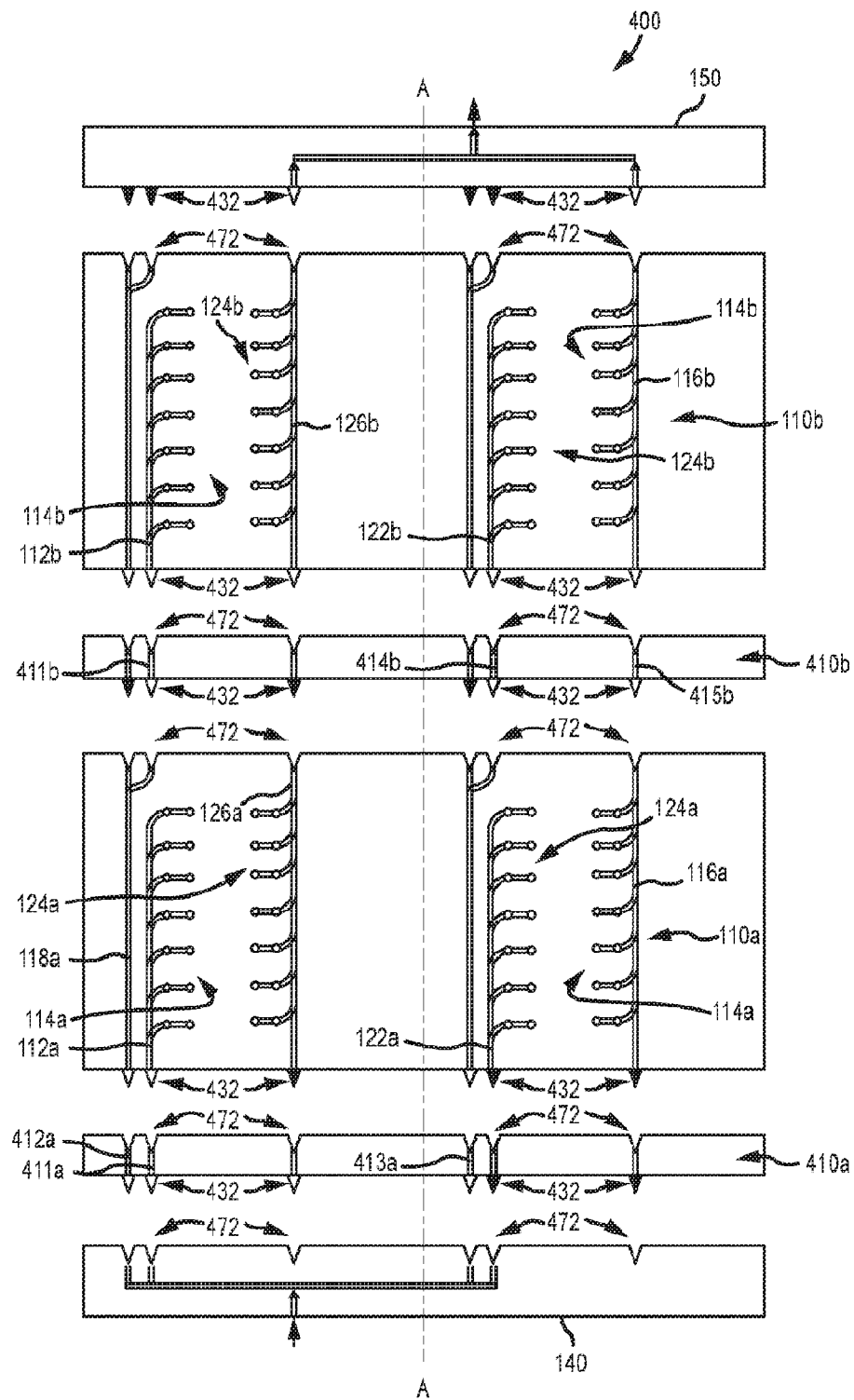
FIG. 8 illustrates another embodiment of a contactor unit comprising a plurality of contact modules fluidly interconnectable through one or more intermediate flow control members.

As further shown in FIG. 2, the first contact module 110 may optionally comprise at least a first heat exchange bypass channel 118 extending in a heat exchange fluid flow direction along the flow axis AA beyond the first longitudinal portion of the flow axis AA within which the multiple feed locations of first exchange feed channel 112 are provided. In that regard, the first heat exchange bypass channel 118 may be provided without fluid communication with the first plurality of heat exchange channels 114 in the contact module 110. Rather, the first heat exchange bypass channel 118 may be provided to optionally deliver a portion of the feed of the heat exchange fluid to additional heat exchange channels that may optionally be located along one or more additional, longitudinal portions of the flow axis AA, downstream, in a heat exchange fluid flow direction, of the first longitudinal portion (e.g., as illustrated in FIGS. 3, 7 and 8). In other embodiments, the first heat exchange feed channel 112 may be extended to deliver a portion of the feed of the heat exchange fluid to additional heat exchange channels located along one or more additional, longitudinal portions of the flow axis AA, downstream of the first longitudinal portion.

With further reference to FIG. 2, the first contact module 110 may include a second heat exchange feed channel 122 to deliver the feed of the heat exchange fluid to a second plurality of heat exchange channels 124, wherein the second heat exchange feed channel 122 extends in a direction of the flow axis AA and is fluidly interconnected with the second plurality of heat exchange channels 124 at multiple feed locations spaced along the flow axis AA to input the feed of the heat exchange fluid into multiple different locations along the flow axis AA. The second plurality of heat exchange channels 124 may be provided in corresponding flow diversion barriers comprising the contactor network of flow diversion barriers. The first contact module 110 may further include a second heat exchange collection channel 126 to collect effluent of the heat exchange fluid from the second plurality of heat exchange channels 124, wherein the second heat exchange collection channel 126 extends in a direction of the flow axis AA and is fluidly interconnected with the second plurality of heat exchange channels 124 at multiple collection locations spaced along the flow axis AA to receive the effluent of the heat exchange cooling fluid from multiple different locations in the contactor network along the flow axis AA. As shown in FIG. 2, the multiple feed locations of the second heat exchange feed channel 122 may be located in the first portion of the contactor network disposed along the first longitudinal portion of the flow axis AA.

The first plurality of heat exchange channels 114 may represent a first heat exchange fluid path through the first contact module 110 and the second plurality of heat exchange channels 124 may represent a second heat exchange fluid path through the first contact module 110. In some arrangements, at least a portion of the first plurality of heat exchange channels 114 and at least a portion of the second plurality of heat exchange channels 124 may be interdigitated. In that regard, portions of the first plurality and second plurality of heat exchange channels 114, 124 may be physically interconnected or interpenetrating, while being free from fluid interconnection between the first plurality and second plurality heat exchange channels 114, 124. In this regard, the first and second plurality of heat exchange channels 114, 124 thus represent separate and independent heat exchange paths that may be individually used or not used for heat exchange to help control the amount of heat exchange provided to the interdigitated region. For example, a higher rate of heat exchange in the region may be provided by supplying heat exchange fluid both through the first heat exchange feed channel 112 to the first plurality of heat exchange channels 114 and through the second heat exchange feed channel 122 to the second plurality of heat exchange channels 124. A lower rate of heat exchange in the region may be provided by blocking feed to either the first heat exchange feed channel 112 or the second heat exchange feed channel while leaving the other open, and no heat exchange to the region may be provided by blocking feed to both the first and second heat exchange feed channels 112, 122 in situations when no heat exchange is desired in that portion of the contactor network.

In contemplated implementations, at least a portion or all of the second plurality of heat exchange channels 124 and corresponding diversion barriers may branch out and cross-connect, both physically and fluidly, to define a web-like contactor network. In that regard, at least a portion or all of the second plurality of heat exchange channels 124 may extend non-linearly along the flow axis AA. For example, the second plurality of heat exchange channels 124 may extend in a spiral-like manner along the flow axis AA. In one arrangement, the second plurality of heat exchange channels 124 may extend along the flow axis AA according to a common, predetermined function (e.g. a gyroid configuration, a helical configuration, etc.) or parametrically repeating pattern.

The contact module 110 may optionally include a second heat exchange bypass channel 128 extending in the heat exchange fluid flow direction along the flow axis AA beyond the first longitudinal portion of the flow axis AA, without fluid communication with the first plurality of heat exchange channels 114 or the second plurality of heat exchange channels 124 in the first portion of the contactor network, so as to provide a portion of the feed of the heat exchange fluid to additional heat exchange channels that may optionally be located in one or more additional, longitudinal portions of the flow axis AA located downstream, in a heat exchange fluid flow direction, of the first longitudinal portion. In other embodiments, the second heat exchange feed channel 122 may be extended to deliver a portion of the feed of the heat exchange fluid to additional heat exchange channels located along one or more additional, longitudinal portions of the flow axis AA, downstream of the first longitudinal portion, and the second heat exchange bypass channel 128 may optionally be eliminated.

As noted, the optional first heat exchange bypass channel 118 and/or the optimal second heat exchange bypass channel 128, or the first heat exchange feed channel 112 and/or second heat exchange feed channel 122, may be provided to flow corresponding portions of the feed of the heat exchange fluid along the flow axis AA beyond the first longitudinal portion of the flow axis AA. In that regard, additional downstream heat exchange channels may be provided in the first contact module 110. Additionally or alternatively, such additional downstream heat exchange channels, and corresponding flow diversion barriers, may be provided in one or more additional contact modules, wherein a plurality of contact modules may be fluidly interconnected in end-to-end relation through interfacing ends thereof (e.g, as illustrated in FIGS. 3, 7 and 8).

In one approach, one or more heat exchange bypass channel portion of a first contact module may be fluidly interconnected with a corresponding one or more heat exchange feed channel of a downstream second contact module and/or fluidly interconnected with a corresponding one or more heat exchange bypass channel portion of a downstream second contact module, and one or more heat exchange collection channel portion of the first contact module may be fluidly interconnected with a corresponding one or more heat exchange collection channel portion of the downstream second contact module. In another approach, one or more heat exchange feed channel portion of a first contact module may be fluidly interconnected with a corresponding one or more heat exchange feed channel portion of a downstream second contact module, and one or more heat exchange collection channel portion of the first contact module may be fluidly interconnected with a corresponding one or more heat exchange collection channel portion of the downstream second contact module. As will be appreciated, in either approach additional contact modules may be fluidly interconnected in like fashion to deliver different portions of the feed of the heat exchange fluid to heat exchange channels having corresponding feed locations located in different ones of the contact modules located along the length of the flow axis AA, wherein the effluent of the different portions of the feed of the heat exchange fluid may be collected for removal in fluidly interconnectable portions of at least one heat exchange collection channel (e.g. collected for removal via a common collection channel).

By way of example, reference is now made to FIG. 3 which illustrates an embodiment of a contactor unit 200 having an input manifold 140, an output manifold 150 and three contact modules 110a, 110b and 110c, wherein a first amount of heat exchange is provided in a second contact module 110b, and a greater, second amount of heat exchange is provided in a third contact module 110c. More particularly, a first contact module 110a may comprise a first portion of a first heat exchange bypass channel 118a and a first portion of a second heat exchange bypass channel 128a, each of which extends beyond a first longitudinal portion of the flow axis AA in the first contact module 110a.

In that regard, while blocked-off with a plug member 162 and not utilized in the configuration of FIG. 3, the first contact module 110a may include at least a first heat exchange feed channel 112a to optionally deliver feed of the heat exchange fluid to a first plurality of heat exchange channels 114a, wherein the first heat exchange feed channel 112a extends in a direction of the flow axis AA, and is fluidly interconnected with the first plurality of heat exchange channels 114a at multiple feed locations spaced along a first longitudinal portion of the flow axis AA, to input the feed of the heat exchange fluid into multiple different locations along the flow axis AA. The first plurality of heat exchange channels 114a may be provided in corresponding flow diversion barriers that comprise a contactor network of flow diversion barriers with flow voids between the flow diversion barriers for movement of process fluids therebetween. In contemplated implementations, at least a portion or all of the first plurality of heat exchange channels 114a and corresponding diversion barriers may branch-out and cross-connect, both physical and fluidly, to define a web-like contactor network. In that regard, at least a portion or all of the first plurality of heat exchange channels 114a may extend non-linearly along the flow axis AA. For example, the first plurality of heat exchange channels 114a may extend in a spiral-like manner along the flow axis AA. In one arrangement, the first plurality of heat exchange channels 114a may extend along the flow axis AA according to a common, predetermined function (e.g. a gyroid configuration, a helical configuration, etc.) or parametrically repeating pattern.

While not utilized in the configuration of FIG. 3, the first contact module 110a may further comprise at least a first portion of a first heat exchange collection channel 116a to collect effluent of the heat exchange fluid from the first plurality of heat exchange channels 114a. The first portion of the heat exchange collection channel 116a may extend in a direction of the flow axis AA and may be fluidly connected with the first plurality of heat exchange channels 114a at multiple collection locations spaced along the flow axis AA so as to receive the effluent of the heat exchange fluid at multiple different locations along the flow axis AA in the first contact module 110a.

In similar manner to first heat exchange feed channel 112a, second heat exchange feed channel 122b of contact module 110a is also blocked-off with a plug member 162 and not utilized in the configuration of FIG. 3. In that regard there is no active heat exchange provided in contact module 110a through either the first plurality of heat exchange channels 114a or the second plurality of heat exchange channels 124a. In the configuration illustrated in FIG. 3, the contact module 110a provides for mass transfer between fluid phases of processing fluids moving through flow voids between the flow diversion barriers including the first and second pluralities of heat exchange channels 114a and 124a, but without active heat exchange.

The first portion of the first heat exchange bypass channel 118a of the first contact module 110a may be fluidly interconnected to a second portion of the first heat exchange bypass channel 118b of the second contact module 110b and to a first heat exchange feed channel 112b of the second contact module 110b. Further, the first portion of the second heat exchange bypass channel 128a of the first contact module 110a may be fluidly interconnected to a second portion of the second heat exchange bypass channel 128b of the second contact module 110b.

The first heat exchange feed channel 112b of the second contact module 110b may deliver the feed of the heat exchange fluid to a first plurality of heat exchange channels 114b of the second contact module 110b, wherein the first heat exchange feed channel 112b of the second contact module 110b extends in a direction of the flow axis AA, and is fluidly interconnected with the first plurality of heat exchange channels 114b at multiple feed locations spaced along a second longitudinal portion of the flow axis AA, downstream of the first longitudinal portion of the flow axis AA, to input the feed of the heat exchange fluid into multiple different locations along the flow axis AA in the second contact module 110b. The first plurality of heat exchange channels 114b may be provided in corresponding flow diversion barriers of the second contact module 110b that comprise a contactor network of flow diversion barriers with flow voids for movement of process fluids therebetween through the second contact module 110b. In contemplated implementations, at least a portion or all of the first plurality of heat exchange channels 114b and corresponding flow diversion barriers in the second contact module 110b may branch-out and cross-connect, both physically and fluidly, to define a web-like contactor network. In that regard, at least a portion or all of the first plurality of heat exchange channels 114b may extend non-linearly along the flow axis AA. For example, the first plurality of heat exchange channels 114b may extend in a spiral-like manner along the flow axis AA. In one arrangement, the first plurality of heat exchange channels 114b may extend along the flow axis AA according to a common, predetermined function (e.g. a gyroid configuration, a helical configuration, etc.) or parametrically repeating pattern.

The second contact module 110b may further comprise at least a second portion of first heat exchange collection channel 116b, fluidly connected to the first portion of first heat exchange collection channel 116a, to collect effluent of the heat exchange fluid from the first plurality of heat exchange channels 114b. The second portion of first heat exchange collection channel 116b may extend in a direction of the flow axis AA and may be fluidly connected with the first plurality of heat exchange channels 114b at multiple collection locations spaced along the flow axis AA so as to receive the effluent of the heat exchange fluid at multiple different locations along the flow axis AA in the second contact module 110b.

In the configuration illustrated in FIG. 3, the second feed channel 122b in second contact module 110b is blocked-off by a plug member 162 and is not utilized. In that regard, active heat exchange in the second contact module 110b is only through the first plurality of heat exchange channels 114b and not through the second plurality of heat exchange channels 124b. In the third contact module 110c both the first and second heat exchange feed channels 112c, 122c are open to provide delivery of heat exchange fluid to both the first plurality and the second plurality of heat exchange channels 114c, 124c, respectively, for active heat exchange through both of those heat exchange paths in third contact module 110c.

As shown in FIG. 3, the second portion of the first heat exchange bypass channel 118b of the second contact module 110b may be fluidly interconnected to a first heat exchange feed channel 112c of the third contact module 110c, and the second portion of the second heat exchange bypass channel 128b of the second contact module 110b may be fluidly interconnected to a second heat exchange feed channel 122c of the third contact module 110c. In turn, the first heat exchange feed channel 112c of the third contact module 110c may be fluidly interconnected with a first plurality of heat exchange channels 114c at multiple feed locations spaced along a third longitudinal portion of the first flow axis AA in the third contact module 110c, downstream of the first longitudinal portion and second longitudinal portion of the flow axis AA, to input the feed of the heat exchange fluid into multiple different locations along the flow axis AA in the third contact module 110c. The first plurality of heat exchange channels 114c may be provided in corresponding flow diversion barriers that comprise the contactor network flow of the third contact module 110c. In contemplated implementations, at least a portion or all of the first plurality of heat exchange channels 114c and corresponding diversion barriers may branch-out and cross-connect, both physically and fluidly, to define a web-like contactor network of the third contact module 110c. In that regard, at least a portion or all of the first plurality of heat exchange channels 114c may extend non-linearly along the flow axis AA. For example, the first plurality of heat exchange channels 114c may extend in a spiral-like manner along the flow axis AA. In one arrangement, the first plurality of heat exchange channels 114c may extend along the flow axis AA according to a common, predetermined function (e.g. a gyroid configuration, a helical configuration, etc.) or parametrically repeating pattern.

Similarly, the second heat exchange feed channel 122c of the third contact module 110c may be provided to deliver the feed of the heat exchange fluid to a second plurality of heat exchange channels 124c of the third contact module 110c, wherein the second heat exchange feed channel 122c extends in a direction of the flow axis AA, and is fluidly interconnected with the second plurality of heat exchange channels 124c at multiple feed locations spaced along the third longitudinal portion of the flow axis AA to input the feed of the heat exchange fluid into multiple different locations along the flow axis AA in the third contact module 110c. The second plurality of heat exchange channels 124c may be provided in corresponding flow diversion barriers that comprise the contactor network of the third contact module 110c. In contemplated implementations, at least a portion or all of the second plurality of heat exchange channels 124c and corresponding diversion barriers may branch-out and cross-connect, both physically and fluidly, to define a web-like contactor network of the third contact module 110c. In that regard, at least a portion or all of the second plurality of heat exchange channels 124c may extend non-linearly along the flow axis AA. For example, the second plurality of heat exchange channels 124c may extend in a spiral-like manner along the flow axis AA. In one arrangement, the second plurality of heat exchange channels 124c may extend along the flow axis AA according to a common, predetermined function (e.g. a gyroid configuration, a helical configuration, etc.) or parametrically repeating pattern.

As shown in FIG. 3, the third contact module 110c may comprise a third portion of first heat exchange collection channel 116c that is fluidly connected to the second portion of the first heat exchange collection channel 116b, and that extends in the direction of the flow axis AA and is fluidly interconnected with the first plurality of heat exchange plant channels 114c at multiple locations spaced along the flow axis AA to receive the effluent of the heat exchange fluid from multiple different locations in the contactor network of the third contact module 110c along the flow axis AA.

Similarly, the third contact module 110c may comprise third portion of the second heat exchange collection channel 126c that extends in the direction of the flow axis AA and is fluidly interconnected with the second plurality of heat exchange plant channels 124c at multiple locations spaced along the flow axis AA to receive the effluent of the heat exchange fluid from multiple different locations in the contactor network of the third contact module 110c along the flow axis AA.

Reference is now made to FIG. 4 which illustrates the contactor unit 200 of FIG. 3 in side-by-side relation to a first temperature profile TP1 and a second temperature profile TP2 along a length L of contactor unit 200 corresponding with the flow axis AA. The first temperature profile TP1 may correspond with a temperature of process fluids flowing through contactor unit 200 without the delivery of a cooling heat exchange fluid to the contactor unit 200. In contrast, the second temperature profile TP2 may correspond with a temperature of process fluids flowing through contactor unit 200 with the delivery of a cooling heat exchange fluid to the contactor unit 200. As may be appreciated, realization of the second temperature profile TP2 may be desirable from the standpoint of reducing temperatures in an upper region of a carbon dioxide scrubbing vessel, corresponding with the position of the second contact module 110b and third contact module 110c, e.g. thereby reducing degradation of process fluid constituents.

Figure 5A:
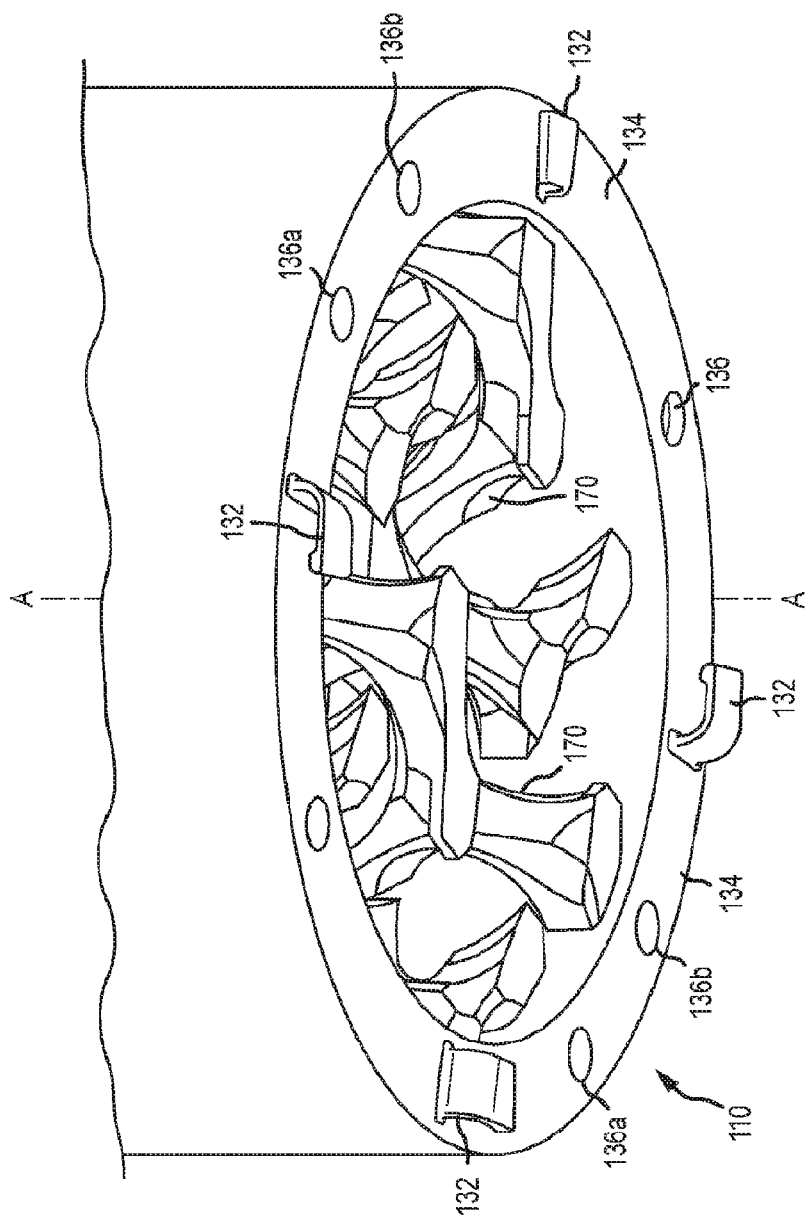
FIG. 5A illustrates a first end section of a contact module comprising the contactor unit of FIG. 2.
Figure 5B:
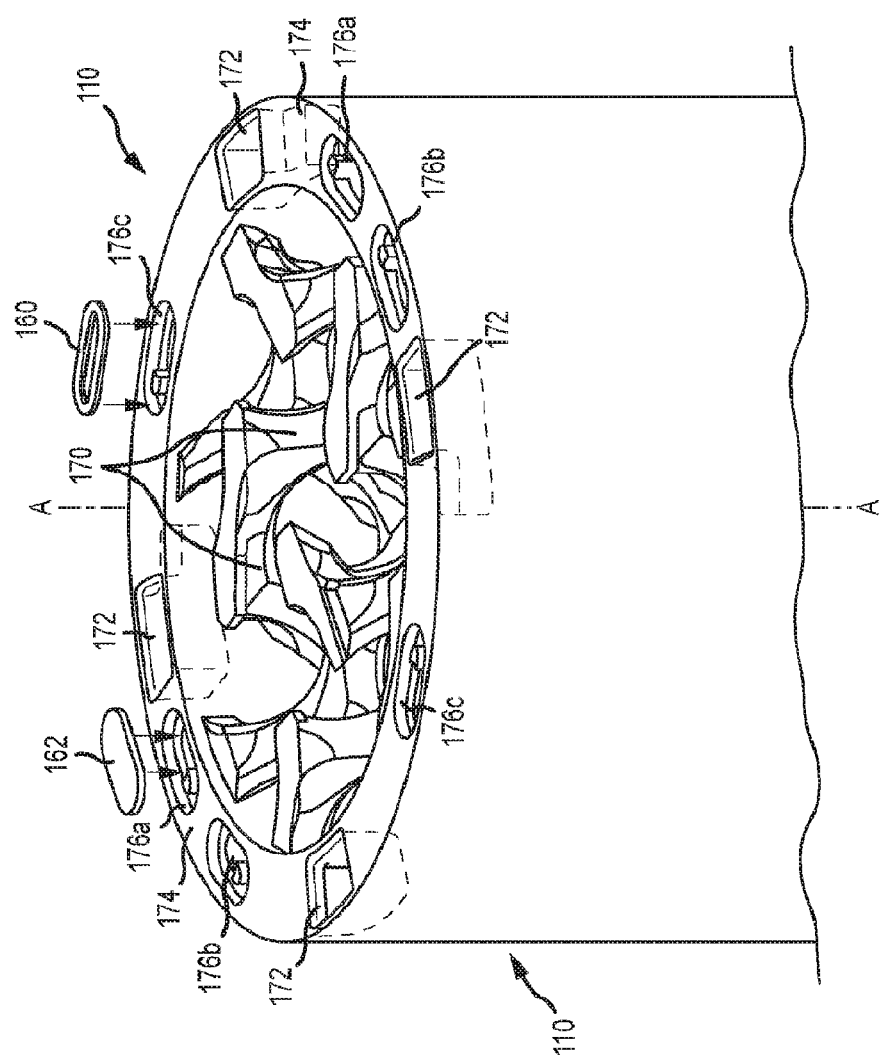
FIG. 5B illustrates a second end portion of the contact module comprising the contactor unit embodiment of FIG. 2.
Figure 6A:
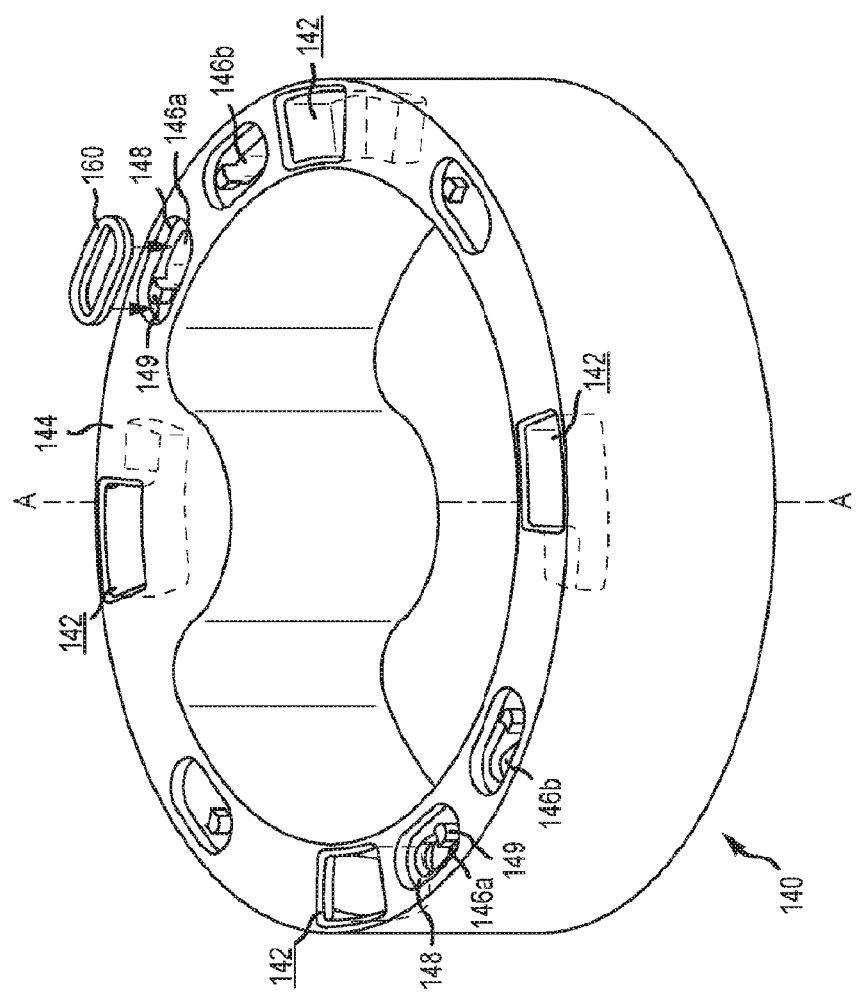
FIG. 6A illustrates an embodiment of an input manifold employable in the contactor unit embodiment of FIG. 2 and/or the contactor unit embodiment of FIG. 3.

Reference is now made to FIGS. 5A and 5B which illustrate opposite, interfacing ends of an embodiment of a contact module 110, and to FIGS. 6A and 6B which illustrate embodiments of an input manifold 140 and output manifold 150, respectively. In particular, FIG. 5A illustrates a bottom interfacing end portion of contact module 110 adapted for interconnection with an interfacing end of the input manifold 140 shown in FIG. 6A. In that regard, the bottom interfacing end portion of contact module 110 and interfacing end of input manifold 140 may comprise complementary male and female components for selective interconnection and disconnection of the contact module 110 and input manifold 140. As shown, the bottom interfacing end portion of the contact module 110 may include one or a plurality of male members 132 configured for receipt by one or a plurality of female recesses 142 comprising the interfacing end of input manifold 140. More particularly, the male members 132 may extend from an annular end face 134 of the contact module 110 and may be of an L-shaped configuration. In turn, the female recesses 142 may extend into an annular end face 144 of the input manifold 140 in a complementary L-shaped configuration, wherein upon relative advancement of the contact module 110 and input manifold 140, and relative rotation of the contact member 110 and input manifold 140, the male members 132 may be secured within the female recesses 142.

With further reference to FIGS. 5A and 6A, the annular end face 134 of the interfacing end of contact module 110 and the annular end face 144 of the interfacing end of input manifold 140 may each present a plurality of corresponding fluid ports for fluid interconnection upon physical interconnection of the contact module 110 and input manifold 140. In particular, and with reference to FIG. 5A, the annular end face 134 of contact module 110 may present input ports 136a fluidly interconnected to input ends of the first heat exchange feed channel 112 and second heat exchange feed channel 122 described above in relation to FIG. 2, and input ports 136b fluidly interconnected to input ends of the first heat exchange bypass channel 118 and second heat exchange bypass channel 128 described above in relation to FIG. 2. In turn, and with reference to FIG. 6A, the annular end face 144 of the interfacing end of input manifold 140 may present ports 146a for fluid interconnection with ports 136a of the contact module 110 for delivery of the feed of the heat exchange fluid to the first heat exchange feed channel 112 and second heat exchange feed channel 122, respectively, and ports 146b for fluid interconnection to ports 136b of the contact module 110 for delivery of the feed of the heat exchange fluid to the first heat exchange bypass channel 118 and second heat exchange bypass channel 128. To facilitate such fluid interconnections, a seal member 160 may be provided at each of the fluid ports 146a, 146b of the input manifold 140. In the illustrated approach, seal member 160 may comprise an elongated O-ring configured for positioning within a correspondingly-configured recess 148 that extends about each of the fluid ports 146a, 146b. Further in that regard, each of the fluid ports 146a, 146b may include a projecting member 149 located for positioning through a portion of the corresponding seal member 160, so as to maintain positioning of seal member 160 during rotative interconnection of the contact module 110 and input manifold 140.

As illustrated in FIGS. 6A and 6B, the input manifold 140 and output manifold 150 are each provided in the form of an annular member around an internal flow path for flow of process fluids moving through the contactor unit (e.g., contactor unit 100 of FIG. 2 or contactor unit 200 of FIG. 3) toward or away from a contactor network that may be disposed between the input manifold 140 and the output manifold 150. Each of the input manifold 140 and output manifold 150 includes a manifold void inside the respective annular member to receive a combined input stream of heat exchange fluid and deliver different feeds of heat exchange fluid internally within the contactor unit or to accumulate heat change effluents of the contactor unit for output as a combined output stream of heat exchange fluid from the contactor unit.

Reference is now made to FIGS. 5B and 6B. In particular, FIG. 5B illustrates a top interfacing end portion of contact module 110 adapted for interconnection with an interfacing end of the output manifold 150 shown in FIG. 6B. In that regard, the top interfacing end portion of contact module 110 and the interfacing end of output manifold 150 may comprise complementary male and female components for selective interconnection and disconnection of the contact module 110 and output manifold 150. As shown, the top interfacing end portion of the contact module 110 may include one or a plurality of female recess 172 configured to receive one or a plurality of male members 152 comprising the interfacing end of output manifold 150. More particularly, the male members 152 may extend from the annular end face 154 of the output manifold 150 and may be of an L-shaped configuration. In turn, the female recesses 172 of the contact module 110 may extend into an annular end face 174 of the interfacing end of contact module 110 with a complementary L-shaped configuration, wherein upon relative advancement of the contact module 110 and output manifold 150, and relative rotation of the contact module 110 and output manifold 150 the male members 152 may be secured within the female recesses 172.

With further reference to FIGS. 5B and 6B, the annular end face 174 of the interfacing top end portion of contact module 110 and the annular end face 154 of the interfacing end of output manifold 150 may each present one or a plurality of corresponding fluid ports for fluid interconnection upon physical interconnection of the contact module 110 and output manifold 150. In particular, and with reference to FIG. 5B, ports 176c may be fluidly interconnected to the outlet ends of the first heat exchange collection channel 116 and second heat exchange collection channel 126 described above in relation to FIG. 2. In turn, with reference to FIG. 6B, ports 156c of the output manifold 150 may be provided for fluid interconnection with the fluid ports 176c of the contact module 110 for receipt of the effluent of the feed of the heat exchange fluid from the first heat exchange collection channel 116 and second heat exchange collection channel 126. As shown in FIG. 6B, seal members 160 may be provided at ports 176c in a manner analogous to that shown in FIG. 6A.

With reference to FIGS. 5A and 5B, flow diversion barriers 170 corresponding with portions of the first plurality of heat exchange channels 114 and second plurality of heat exchange channels 124 are illustrated. As shown, the flow diversion barriers 170 and corresponding heat exchange channels 114, 124 may be physically and fluidly interconnected to define a web-like contactor network that extends along the flow axis AA. In one approach, the flow diversion barriers 170 and corresponding heat exchange channels 114, 124 may be provided via three-dimensional printing techniques (e.g. additive manufacturing techniques). In conjunction with the utilization of such techniques, the flow diversion barriers 170 and corresponding heat exchange channels 114, 124 may be configured to optimize the desired mass transfer and heat exchange properties of the contact module 110 in relation to the obtainment of a desired temperature profile along flow axis AA. For example, the outer surface configuration of the flow diversion barriers 170 may or may not be established to vary along the flow axis AA, and the cross-sectional areas of the corresponding heat exchange channels 114, 124 may or may not be configured to vary along the flow axis AA. Open spaces within the interior of the contact module 110 provide flow voids for movement of process fluids through the contact module 110 and to contact the flow diversion barriers for mass transfer between fluid phases of such process fluids.

Component features for a contactor unit may be made by appropriate additive manufacture techniques. The entire structure of contactor unit may be fabricated by additive manufacturing, either as a unitary manufactured piece or in separate assemblable pieces (e.g. assemblable modules). Any additive manufacture technique may be used appropriate for the geometries and fineness of features desired. Some example additive manufacture techniques include sintering techniques to bind granular precursor particles. For example fabrication using metallic materials of construction may involve laser sintering or melting techniques. As another example, fabrication using polymeric materials may involve photopolymerization techniques using photopolymers. For filled polymer compositions, for example, photopolymerization may bind filler particles in the cured polymeric matrix. High aspect ratio filler particles (e.g., needles, fibers, whiskers) may or may not be oriented. For example, orientation of such high aspect ratio filler particles across a thickness of the fabricated feature (e.g., for Z-direction thermal conductivity) may involve orientation in a magnetic or electrical field. If desired, such fabricated features may be coated with thin chemical resistant coating, for example on outside contactor surfaces that may contact reactive process fluids during fluid treating operations.

Further, the materials utilized to provide the flow diversion barriers 170 and corresponding heat exchange channels 114, 124 may be selected to provide the desired heat exchange profile along the flow axis AA. For example, materials of construction for flow diversion barriers 170 may be high thermal conductivity metallic materials (e.g. steal or titanium compositions), lower thermal conductivity plastic materials (e.g. engineering plastics) or material of intermediate thermal conductivity (e.g. plastic materials filled with metal powder to improve thermal conductivity). Materials of construction may be varied along the fluid path of the heat exchange channels 114 or 124 to provide different heat exchange coefficients at different locations along the heat exchange fluid path, to vary heat exchange flux across the flow diversion barriers 170.

In some embodiments a plurality of commonly-configured contact modules may be provided to facilitate modularized production, and simplified and customizable installation for many different applications. For example, the same contact module 110 shown in FIGS. 5A and 5B may be utilized for each of the first contact module 110a, second contact module 110b and third contact module 110c shown in FIG. 3, wherein interfacing ends of the first contact module 110a, second contact module 110b and/or third contact module 110c may be adapted to provide for the desired flow of heat exchange fluid therebetween. In that regard, a bottom end portion of the second contact module 110b may be provided as shown in FIG. 5A for physical and fluid interconnection to a top end portion of the first contact module 110a as shown in FIG. 5B. Similarly, a bottom end portion of the third contact module 110c may be provided as shown in FIG. 5A for physical and fluid interconnection to a top end portion of the second contact module 110b as shown in FIG. 5B. In conjunction with such interconnections, plug members such as the plug member 162 shown in FIG. 5B may be utilized to block different ones of fluid ports 176a (e.g. each fluidly interconnected to one of a first heat exchange bypass channel 118 or second heat exchange bypass channel 128 portion of first contact module 110a and otherwise employable in conjunction with a seal member 160 for fluid-interconnection with one of a first heat exchange bypass channel 118 or second heat exchange bypass channel 128 portion of second contact module 110b), and/or different ones of fluid ports 176a (e.g. each fluidly interconnected to one of a first heat exchange bypass channel 118 or second fluid bypass channel 128 portion of first contact module 110a and otherwise employable in conjunction with a seal member 160 for fluid-interconnection with one of a first heat exchange feed channel 112a or second heat exchange feed channel 122a of second contact module 110b) at the interconnecting annular end face 174 between the first contact module 110a and second contact module 110b. Plug members 162 may also be employed in analogous fashion at the interfacing ends (e.g. annular end faces 154 and/or 174) between the second contact module 110b and third contact module 110c. The utilization of plug members 162 to adapt the various interfacing ends is illustrated in FIG. 3.

Reference is now made to FIG. 7 which illustrates another embodiment of a contactor unit 300 that includes an input manifold 140, a first contact module 110a, a second contact module 110b and an output manifold 150, each optionally having interfacing ends configured to yield the desired physical engagement therebetween and fluid interconnections therethrough. In that regard, each of the interfacing ends may be configured to include a plurality of male members 332 (e.g. tapered projections) and/or a plurality of complementary female members 372 (e.g. tapered recesses) to receive the plurality of male members 332. The plurality of male members 332 and the plurality of female members 372 may be located to provide physical, end-to-end engagement between interfacing ends of the input manifold 140, first contact module 110a, second contact module 110b, and output manifold 150 in predetermined relative orientations (e.g. to align interfacing outlet and inlet ports) so as to provide for the desired flow of heat exchange fluid therebetween. Further, at least a portion of the plurality of male members 332 and/or complementary plurality of female members 372 may be configured to permit or block the flow of heat exchange fluid therethrough, thereby providing dual functionality.

As shown in the arrangement of FIG. 7, the first contact module 110a may include at least a first heat exchange feed channel 112a to deliver a feed of heat exchange fluid to a first plurality of heat exchange channels 114a at multiple feed locations spaced along a first longitudinal portion of the flow axis AA, a first portion of a heat exchange collection channel 116a to collect effluent of the feed of heat exchange fluid from the first plurality of heat exchange channels 114a, and a first portion of first heat exchange bypass channel 118a which extends beyond the first longitudinal portion of the first flow axis AA to provide feed of the heat exchange fluid to the second contact module 110b. Further, the first contact module 110a may further include a first portion of second heat exchange bypass channel 128a which extends beyond the first longitudinal portion of the flow axis AA to provide feed of the heat exchange fluid to the second contact module 110b. The first contact module 110a may also include at least a first portion of a first heat exchange collection channel 116a to collect effluent of the heat exchange fluid from the first plurality of heat exchange channels 114a.

Second contact module 110b may include a first heat exchange feed channel 112b fluidly interconnected to the first portion of first heat exchange bypass channel 118a to deliver feed of the heat exchange fluid to a first plurality of heat exchange channels 114b at multiple feed locations spaced along a second longitudinal portion of the flow axis AA, downstream of the first longitudinal portion of the flow axis AA, and a second heat exchange feed channel 122b fluidly interconnected to the first portion of the second heat exchange bypass channel 128a to deliver feed of the heat exchange fluid to a second plurality of heat exchange channels 124b at multiple feed locations spaced along the second longitudinal portion of the flow axis AA. The second contact module 110b may also include at least a second portion of the first heat exchange collection channel 116b to collect effluent of the heat exchange fluid from the first plurality of heat exchange channels 114b, and at least a second portion of a second heat exchange collection channel 126b to collect effluent of the heat exchange fluid from the second plurality of heat exchange channels 124b.

As shown in FIG. 7, an inlet port to the first heat exchange feed channel 112b of the second contact module 110b may be provided with a tapered male member 332 at an inlet interfacing end of the second contact module 110b, and an aligned, complementary, tapered female member 372 may be provided at a first outlet port of the first portion of the first heat exchange bypass channel 118a at an outlet interfacing end of the first contact module 110a, wherein such tapered male member 332 and tapered female member 372 may be configured to engage and permit the flow of feed of the heat exchange fluid therethrough. Similarly, an inlet port of the second feed channel 122b of the second contact module 110b may be provided with a tapered male member 332 at an inlet interfacing end of the second contact module 110b, and an aligned, complementary, tapered female member 372 may be provided at a first outlet port of the first portion of the second heat exchange bypass channel 128a at the outlet interfacing end of the first contact module 110a, wherein such tapered male member 332 and tapered female member 372 may be configured to engage and permit the flow of feed of the heat exchange fluid therethrough from the first contact module 110a to the second contact module 110b. Further, an inlet port of the second portion of the first heat exchange collection channel 116b of the second contact module 110b may be provided with a tapered male member 332 at the inlet interfacing end of the second contact module 110b, and an aligned, complementary, tapered female member 372 may be provided at an outlet port of the first portion of the first heat exchange collection channel 116a at the outlet interfacing end of the first contact module 110a, wherein such tapered male member 332 and female member 372 may be configured to permit the flow of effluent of the heat exchange fluid therethrough from the first contact module 110a to the second contact module 110b. In conjunction with the noted dual physical and fluid interconnections between tapered male members 332 and complementary tapered female members 372, a compression-fit fluid seal may be realized therebetween, including arrangements in which the first and second contact modules 110a, 110b, respectively, are positioned in stacked relation as shown in FIG. 7.

As further illustrated in FIG. 7, additional physical engagement and fluid interconnections may be provided by additional aligned pairs of the male members 332 and female members 372 at an outlet interfacing end of the input manifold 140 and inlet interfacing end of the first contact module 110a, and at an outlet interfacing end of the second contact module 110b and inlet interfacing end of the output manifold 150. As may be appreciated, a compression-fit fluid seal may be provided where such fluid interconnections are established.

Reference is now made to FIG. 8 which illustrates another embodiment of a contactor unit 400 that an includes an input manifold 140, a first intermediate flow control member 410a, a first contact module 110a, a second intermediate flow control member 410b, a second contact module 110b and an output manifold 150, each optionally having interfacing ends configured to yield the desired physical engagement therebetween and fluid interconnections therethrough. In that regard, each of the interfacing ends may be configured to include a plurality of male members 432 (e.g. tapered projections) and/or a plurality of complementary female members 472 (e.g. tapered recesses) to receive the plurality of male members 432. The plurality of male members 432 and plurality of female members 472 may be located to provide physical end-to-end engagement between interfacing ends of the input manifold 140, first intermediate flow control member 410a, first contact module 110a, second intermediate flow control member 410b, second contact module 110b and output manifold 150 in predetermined relative orientations (e.g. to align interfacing outlet and inlet ports) so as to provide for the desired flow of heat exchange fluid therebetween. Further, at least a portion of the plurality of male members 432 and/or complementary plurality of female members 472 may be configured to permit and/or block the flow of heat exchange fluid therethrough, thereby providing dual functionality. In the illustrated embodiment, the first intermediate flow control member 410a and second intermediate flow control member 410b may be provided with the male members 432 and/or female members 472 that are configured to permit and/or block the flow of heat exchange fluid through at least partially different ones of a common plurality of fluid flow channels of the first intermediate flow control member 410a and second intermediate flow control member 410b, thereby facilitating the use of first and second contact modules 110a, 100b having a common configuration.

In particular, an inlet port to a first flow channel 411a of the first intermediate flow control member 410a may be provided with a tapered male member 432 at an inlet interfacing end of the first intermediate flow control member 410a, and an aligned, complementary, tapered female member 472 may be provided at a first outlet port of the input manifold 140 at an outlet interfacing end thereof, wherein such tapered male member 432 and tapered female member 472 may be configured to engage and permit the flow of feed of the heat exchange fluid therethrough, and wherein such feed of heat exchange fluid may flow to and through the first flow channel 411a, a female member 472 provided at an outlet port of the first flow channel 411a at the outlet interfacing end of the first intermediate flow control member 410a, and an aligned, complementary, male member 432 provided at an inlet port of a first heat exchange feed channel 112a of the first contact module 110a at an inlet interfacing end thereof. In turn, such feed of heat exchange fluid may be delivered to heat exchange channels 114a as otherwise described in relation to other embodiments above. Further, an inlet port of a second flow channel 412a of the first intermediate flow control member 410a may be provided with a tapered male member 432 at the inlet interfacing end of the first intermediate flow control member 410a, and an aligned, complementary, tapered female member 472 may be provided at a second outlet port of the input manifold 140 at the outlet interfacing end thereof, wherein such tapered male member 432 and tapered female member 472 may be configured to engage and permit the flow of feed of the heat exchange fluid therethrough, and wherein such feed of heat exchange fluid may flow to and through the second flow channel 412a, a female member 472 provided at an outlet port of the second flow channel 412a at the outlet interfacing end of the first intermediate flow control member 410a, and an aligned, complementary male member 432 provided at an inlet port of a first portion of a first portion of a first heat exchange bypass channel 118a of the first contact module 110a at the inlet interfacing end thereof. Similarly, a third fluid flow channel 413a of the first intermediate flow control member 410a may be provided with a tapered male member 432 at the inlet interfacing end of the first intermediate flow control member 410a, and an aligned, complementary, tapered female member 472 may be provided at a third outlet port of the input manifold 140 at the outlet interfacing end thereof, wherein such tapered male member 432 and tapered female member 472 may be configured to engage and permit the flow of feed of the heat exchange fluid therethrough, wherein such feed of heat exchange fluid may flow to and through the third flow channel 413a, a female member 472 provided at an outlet port of the third flow channel 413a at the outlet interfacing end of the first intermediate flow control member 410a, and an aligned, complementary male member 432 provided at an inlet port of a first portion of a first portion of second heat exchange bypass channel 128a of the first contact module 110a at the inlet interfacing end thereof. In conjunction with the noted physical and fluid interconnections between the tapered male members 432 and complementary tapered female members 472 of inlet manifold 140, first intermediate flow control member 410a and first contact module 110a, a compression-fit fluid seal may be provided therebetween.

Further, an inlet port to a first channel 411b of the second intermediate flow control member 410b may be provided with a tapered male member 432 at an inlet interfacing end of the second intermediate flow control member 410b, and an aligned, complementary, tapered female member 472 may be provided at a first outlet port of the first portion of the first heat exchange bypass channel 118a of the first contact module 110a at an outlet interfacing end thereof, wherein such tapered male member 432 and tapered female member 472 may be configured to engage and permit the flow of feed of the heat exchange fluid therethrough, and wherein such feed of the heat exchange fluid may flow to and through the first flow channel 411b, a female member 472 provided at an outlet port of the first channel 411b at an outlet interfacing end of the second intermediate flow control member 410b, and an aligned, complementary male member 432 provided at an inlet port of a first heat exchange feed channel 112b of the second contact module 110b at an inlet interfacing end thereof. In turn, such feed of heat exchange fluid may be delivered to heat exchange channels 114b as otherwise described in relation to other embodiments above. Additionally, an inlet port of another flow channel 414b of the second intermediate flow control member 410b may be provided with a tapered male member 432 at the inlet interfacing end of the second intermediate flow control member 410b, and an aligned, complementary, tapered female member 472 may be provided at an outlet port of a first portion of the second heat exchange bypass channel 128a of the first contact module 110a at the outlet interfacing end thereof, wherein such tapered male member 432 and tapered female member 472 may be configured to engage and permit the flow of feed of the heat exchange fluid therethrough, and wherein such feed of heat exchange fluid may flow to and through the other flow channel 414b, a female member 472 provided at an outlet port of the other flow channel 414b at the outlet interfacing end of the second intermediate flow control member 410b, and an aligned, complementary male member 432 provided at an inlet port of a second heat exchange feed channel 122b of the second contact module 110b at the inlet interfacing end thereof. In turn, such feed of heat exchange fluid may be delivered to heat exchange channels 124b as otherwise described in relation to other embodiments above.

In addition, an additional flow channel 415b of the second flow control member 410b may be provided with a tapered member 432 at the inlet interfacing end of the second intermediate flow control member 410b, and an aligned, complementary, tapered female member may be provided at an outlet port of a first portion of a first portion of a first heat exchange collection channel 116a of the first contact module 110a at the outlet interfacing end thereof, wherein such tapered male member 432 and tapered female member 472 may be configured to engage and permit the flow of effluent of the heat exchange fluid therethrough (e.g. effluent collected from heat exchange channels 114a), wherein such effluent of heat exchange fluid may flow to and through the additional flow channel 415b, a female member 472 provided at an outlet port of the additional flow channel 415b at the outlet interfacing end of the second intermediate flow control member 410b, and an aligned, complementary male member 432 provided at an inlet port of a second portion of the first portion of the first heat exchange collection channel 116b of the second contact module 110b at the inlet interfacing end thereof. The second portion of the first heat exchange collection channel 116b of the second contact module 110b may be provided to collect effluent of heat exchange fluid from heat exchange channels 114b.

In conjunction with the noted physical and fluid interconnections between tapered male members 432 and complementary, tapered female members 472 of first contact module 110a, second intermediate flow control member 410b, and second contact module 110b, a compression-fit fluid seal may be provided therebetween. As illustrated in FIG. 8, additional physical engagement and fluid interconnections may be provided by additional pairs of the male members 432 and female members 472 at interfacing ends of the illustrated components. Where fluid interconnections are made, compression-fit fluid seals may be provided.

As may be appreciated, the male members 332, 432 in the configurations of FIGS. 7 and 8 are illustrated as either shaded or not to indicate whether the respective male members 332, 432 are configured as a fluid plug (shaded) to block fluid communication or are configured with a fluid port therethrough (not shaded) to permit fluid communication. In the configuration of the contactor unit 300 of FIG. 7, the male members 332, are configured so that a feed of heat exchange fluid is permitted to the first heat exchange feed channel 112a and is blocked to the second heat exchange feed channel 122a of first contact module 110a, and so that feed of heat exchange fluid is permitted to both the first and second heat change feed channels 112b and 122b of second contact module 110b. In the configuration of the contactor unit 400 shown in FIG. 8, the male members 432 are configured so that feed of heat exchange fluid is the same as provided in FIG. 7, but is provided through selective blocking of fluid flow paths by fluid blocking module members 432 of the first and second intermediate flow control members 410a,b rather than fluid blocking features provided as part of the first and second contact modules 110a,b for the contactor unit 300 of FIG. 7. Similar to the contactor unit 300 of FIG. 7, the contactor unit 400 of FIG. 8 provides heat exchange fluid flow to the first heat exchange feed channel 112a of the first contact module 110a and to the first and second heat exchange feed channels 112b and 122b of the second contact module 110b, and blocks flow of heat exchange fluid to the second heat exchange feed channel 112a of the first contact module 110a. The use of the intermediate flow control members 410a,b permits the first contact module 110a and the second contact module 110b to be of the same design, with all fluid ports open, and with selective flow control features to be provided through special configurations of the male members 432 provided in the intermediate flow control members 410a,b, simplifying manufacture of the contact modules 110. As may be appreciated, with such a uniform design for such contact modules 110, successive ones of such contact modules 110 provided in a contactor unit may be engaged directly to each other to permit flow of fluids through all connecting fluid ports between the contact modules 110, and a particularly configured intermediate flow control member (e.g., 410a, 410b or a different configuration) may be disposed between a pair of such contact modules 110 in succession only when it is desired to block one or more of the possible fluid connections between the adjacent contact modules 110. Also as may be appreciated, such an intermediate flow control member may be interposed between two contact modules 110 in succession in a contactor unit to provide a longitudinal space along the flow axis when active heat exchange is not desired, and the longitudinal length of the intermediate flow control member along the flow axis may be varied to provide a desired longitudinal spacing along the flow axis for a desired length of break in active heat exchange between the successive contact modules 110. Use of such intermediate flow control members may provide cost-efficient flexibility of design of a contactor unit with multiple contact modules having capability for active heat exchange in a contactor network. Such an intermediate flow control member may or may not include a contactor network with flow diversion barriers (but not including heat exchange channels) to promote mass transfer between fluid phases passing through the process fluid path through the intermediate flow control member. For example, such an intermediate flow control member may include a section filled with random packing material and/or a section of structured packing.

Figure 9A:
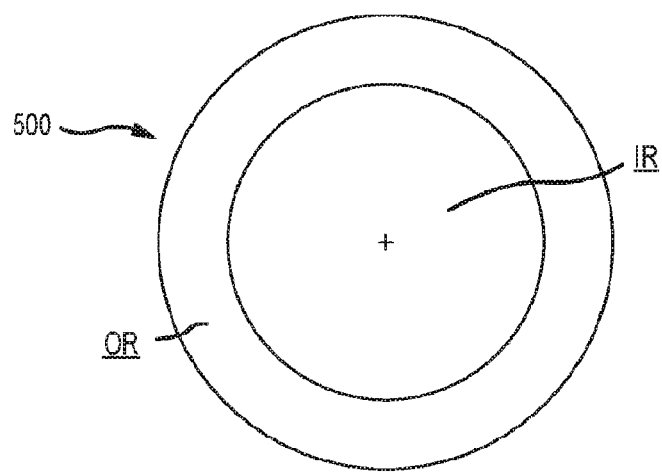
FIGS. 9A and 9B are schematic end and side views, respectively, of one or more of the contactor units illustrated in FIGS. 2, 3, 7 and/or 8.
Figure 9B:
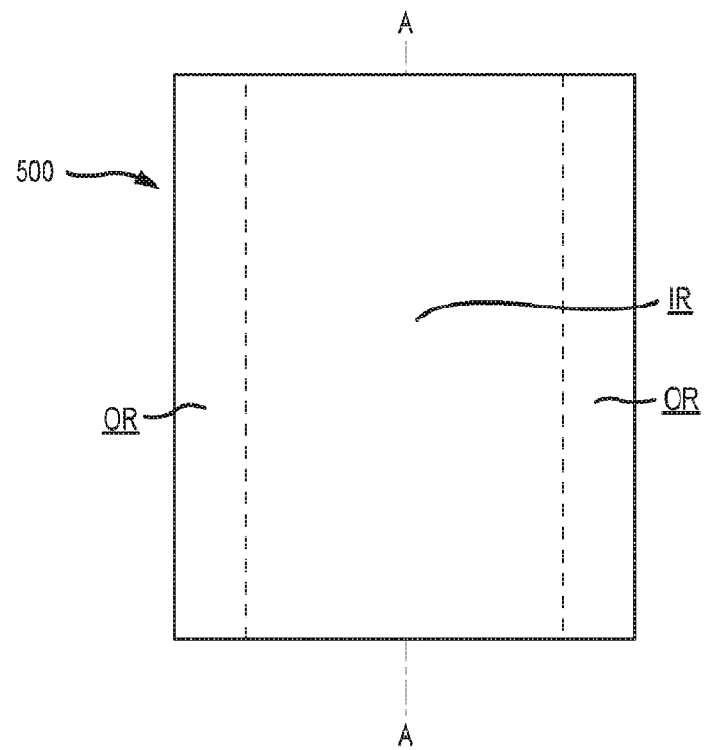

Reference is now made to FIGS. 9A and 9B which illustrate an end schematic view and side schematic view, respectively, of an envelope volume 500 for a contactor unit that may be applicable to any or all of the contactor unit 100 of FIG. 2, the contactor unit 200 of FIG. 3, the contactor unit 300 of FIG. 7, and/or the contactor unit 400 of FIG. 8. In each case, the contactor unit 100, 200, 300 and/or 400 may be configured to have an outer region OR and an inner region JR (e.g. an outer peripheral region extending about and along an inner region), wherein the corresponding at least one heat exchange feed channel (e.g., one or more of 112a, 112b, 112c, 122a, 122b, 122c) may be located in the outer region OR and the corresponding plurality of heat exchange channels (e.g., one or more of 114a, 114b, 114c, 124a, 124b, 124c) may be located in the inner region JR. Additionally, the at least one heat exchange collection channel (e.g., one or more of 116a, 116b, 116c, 126a, 126b, 126c), and/or the at least one heat exchange bypass channel (e.g., one or more of 118a, 118b, 118c, 128a, 128b, 128c) may be located in the outer region OR.

In some implementations, the at least one heat exchange feed channel may extend about and along at least a portion of the inner region IR of the contactor unit (e.g. the at least one heat exchange feed channel may spiral about (e.g. 300°-390° around) and along at least a portion of the inner region IR), thereby facilitating the delivery of feed of the heat exchange fluid at multiple feed locations radially offset about and longitudinally offset along the inner region IR. Further, the at least one heat exchange collection channel may be provided to extend about and along at least a portion of the inner region IR (e.g., the at least one heat exchange collection channel may spiral about (e.g. 300°-390° around) and along at least a portion of the inner region IR), thereby facilitating the collection of effluent of heat exchange fluid at multiple collection locations radially offset about and longitudinally offset along the inner region IR. Further, in some implementations, all or at least a portion of the at least one heat exchange bypass channel may be configured to extend linearly along the inner region IR within the outer region OR of the contactor unit.

In some implementations, such a contactor unit may be provided with the outer region OR occupying no more than 50 percent, no more than 40 percent, no more than 30 percent, no more than 20 percent, no more than 10 percent or no more than 5 percent of the total volume of the envelope volume 500. Likewise, the envelope volume 500 may have a cross-sectioned area in a plane perpendicular to the flow axis AA within the perimeter of the envelope volume 500 in which the portion of the cross-sectional area occupied by the outer region OR is no more than 50 percent, no more than 40 percent, no more than 30 percent, no more than 20 percent, no more than 10 percent or no more than 5 percent of the cross-sectional area.

By the term "envelope volume" of a contactor unit, it is meant a minimum volume geometry of constant cross-section in a plane perpendicular to the flow axis at all points over the length of the contactor unit along the flow axis that fully envelopes, or contains, the contactor unit.

Some other contemplated embodiments of implementation combinations, with or without additional features as disclosed above or elsewhere herein, are summarized as follows:

1. A fluid treating system for mass transfer between fluid phases in process fluids, the system comprising a fluid process vessel including:
- a fluid inlet to receive a feed stream of a first process fluid to the vessel, the feed stream of the first process fluid including at least a first fluid phase with material to be transferred to a second fluid phase in an internal volume of the vessel;
- a fluid outlet to output a process effluent stream including the second fluid phase having transferred material from the first process fluid;
- a flow axis extending in a longitudinal direction along the vessel away from a location corresponding with the fluid inlet;
- a fluid mass transfer contactor unit disposed in the internal volume along the flow axis to contact the process fluids moving through the internal volume to facilitate mass transfer of the material from the first fluid phase to the second fluid phase, the contactor unit including a contactor network of flow diversion barriers with flow voids for movement of the process fluids between the flow diversion barriers, the contactor unit further comprising:
- a plurality of heat exchange channels in the flow diversion barriers to transport heat exchange fluid through the contactor network to heat or cool the process fluids moving through the flow voids during a fluid treating operation;
- at least one heat exchange feed channel to deliver feed of the heat exchange fluid to the heat exchange channels, wherein the heat exchange feed channel extends in a direction of the flow axis and is fluidly connected with the heat exchange channels at multiple feed locations spaced along the flow axis to input the feed of the heat exchange fluid into multiple different locations in the contactor network along the flow axis.

2. A fluid treating system as recited in example combination 1, wherein a said heat exchange feed channel feeds a corresponding said multiple feed locations including at least 2, at least 3, at least 5, at least 10, at least 15, at least 20 at least 25, at least 30, at least 40, at least 70, least 80 or at least 100 of said feed locations. In some contemplated implementations, this number of said feed locations of the said multiple feed locations is in a range with an upper limit of 10,000, 1000, 500, 100, 75, 60, 50, 40 or 30, provided that the upper limit is selected to be larger than the lower limit.

3. A fluid treating system as recited in example combination 2, wherein:
- the said heat exchange feed channel has a first minimum cross-sectional area for flow located upstream of a first said feed location along the flow axis of the corresponding said multiple feed locations fed by the corresponding said heat exchange feed channel;
- each said heat exchange channel fed by the said heat exchange feed channel through the corresponding said multiple feed locations has a second minimum cross-sectional area for flow; and
- a ratio of the first minimum cross-sectional area for flow to the second minimum cross-sectional area for flow is at least 2:1, at least 3:1, at least 5:1, at least 10:1, at least 15:1, at least 20:1 at least 25:1, at least 30:1, at least 40:1, at least 70:1; least 80:1 or at least 100:1. In some contemplated implementations, this ratio may be in a range with an upper limit of 10,000:1, 1000:1, 500:1, 100:1, 75:1, 60:1, 50:1, 40:1, 30:1, 20:1 or 10:1 provided that the upper limit is selected to be larger than the lower limit of the range.

4. A fluid treating system as recited in example combination 3, wherein the first said feed location is spaced apart by at least 1 centimeter, at least 2 centimeters, at least 3 centimeters, at least 5 centimeters, at least 10 centimeters, at least 15 centimeters, at least 20 centimeters, at least 25 centimeters, at least 30 centimeters, at least 40 centimeters, at least 50 centimeters, at least 75 centimeters or at least 1 meter along the flow axis from a last said feed location along the flow axis of the corresponding said multiple feed locations fed by the corresponding said heat exchange feed channel. In some contemplated implementations, this spacing distance along the flow axis may be in a range with an upper limit of 10 meters, 8 meters, 6 meters, 5 meters, 4 meters, 3 meters, 2 meters, 1 meter, 80 centimeters, 70 centimeters, 60 centimeters or 50 centimeters, provided that the upper limit is selected to be larger than the lower limit.

5. A fluid treating system as recited in example combination 4, wherein the corresponding said multiple feed locations comprises a density of the said feed locations per decimeter of length of the flow axis between the first said feed location and the last said feed location of at least 2, at least 4, at least 6, at least 8, at least 10, at least 15, at least 20 or at least 25 of the said feed locations per decimeter of length of the flow axis between the first said feed location and the last said feed location. In some contemplated implementations, this density may be in a range with an upper limit of 200, 100, 50, 40, 30, 25, 20 or 10 of the said feed locations per decimeter of length of the flow axis between the first said feed location and the last said feed location, provided that the upper limit is selected to be larger than the lower limit.

6. A fluid treating system as recited in any one of example combinations 3-5, wherein a ratio of the first minimum cross-sectional area for flow to a sum of the second minimum cross-sectional areas for flow of all of said heat exchange channels fed by the said heat exchange feed channel through the corresponding said multiple feed locations is at least 0.2:1, at least 0.3:1, at least 0.5:1 at least 0.6:1, at least 0.7:1, at least 0.8:1, at least 0.9:1, at least 1:1, at least 1.1:1 or at least 1.25:1. In some contemplated implementations this ratio may be in a range having an upper limit of 10:1, 6:1, 4:1, 3:1, 2:1, 1.5:1, 1.25:1 or 1:1, provided that the upper limit is selected to be larger than the lower limit.

7. A fluid treating system as recited in any one of example combinations 3-6, wherein the second minimum cross-sectional area for flow is in a range of from a lower limit of 2, 3, 5, 8, 12, 18, 25, 50, 75 or 100 square millimeters to an upper limit of 2500, 2000, 1500, 1000, 700, 400, 300, 200, 100, 80, 60, 40, 30 or 20 square millimeters, provided that the upper limit is larger than the lower limit.

8. A fluid treating system as recited in any one of example combinations 2-7, wherein for at least 2, at least 4, or at least 6 of said feed locations of the corresponding said multiple feed locations, the flow axis is perpendicular to a plane passing through the said feed location, the said heat exchange feed channel and a said heat exchange channel fed by the said heat exchange feed channel. In some contemplated implementations, for at least a majority of, or even for substantially all or all of, said feed locations of the corresponding said multiple feed locations, the flow axis is perpendicular to such plane passing through the said feed location, the said heat exchange feed channel and a said heat exchange channel fed by the said heat exchange feed channel 9. A fluid treating system as recited in example combination 8, wherein the flow axis is a vertical axis and each said plane is a horizontal plane.

10. A fluid treating system as recited in any one of example combinations 2-9, wherein a plurality of said feed locations of the corresponding said multiple feed locations are located at different radial positions about the flow axis.

11. A fluid treating system as recited in example combination 10, comprising at least 2, at least 3, at least 4, at least 6, at least 8, at least 10, at least 20 or at least 30 of the different radial positions. In some contemplated implementations, the number of the different radial positions is not larger than 1000, not larger than 500, not larger than 300, not larger than 200, not larger than 100, not larger than 75, not larger than 50, not larger than 25 or not larger than 15.

12. A fluid treating system as recited in any one of example combinations 1-11, wherein:
the at least one heat exchange feed channel is located in an outer region of the contactor unit that extends along the direction of the flow axis; and,
the plurality of heat exchange channels are located in an inner region of the contactor unit that extends along the direction of the flow axis.

13. A fluid treating system as recited in example combination 12, wherein:
the at least one heat exchange feed channel extends about and along at least a portion of the inner region of the contactor unit.

14. A fluid treating system as recited in either one of example combination 12 or example combination 13, wherein:
the at least one heat exchange feed channel spirals about and along at least a portion of the inner region of the contactor unit.

15. A fluid treating system as recited in any one of example combinations 1-14, wherein:
the contactor unit comprises at least one heat exchange collection channel to collect effluent of the heat exchange fluid from the heat exchange channels; and
the heat exchange collection channel extends in a direction of the flow axis and is fluidly connected with the heat exchange channels at multiple collection locations spaced along the flow axis to receive the effluent of the heat exchange fluid from multiple different locations in the contactor network along the flow axis.

16. A fluid treating system as recited in example combination 15, comprising:
a said heat exchange feed channel to feed the corresponding said multiple feed locations as recited in any of example combinations 3-11; and
a said heat exchange collection channel to collect a said effluent of the heat exchange fluid from a corresponding said multiple collection locations that correspond to the corresponding said multiple feed locations, and wherein:
the corresponding said multiple collection locations include at least 2, at least 3, at least 5, at least 10, at least 15, at least 20, at least 25, at least 30 at least 40, at least 70, least 80 or at least 100 of said collection locations. In some contemplated implementations, this number of said collection locations of the said multiple collection locations is in a range with an upper limit of 10,000, 1000, 500, 100, 75, 60, 50, 40 or 30, provided that the upper limit is selected to be larger than the lower limit.

17. A fluid treating system as recited in example combination 16, wherein:
the said heat exchange collection channel has a third minimum cross-sectional area for flow downstream of a last said collection location of the corresponding multiple said collection locations; and
a ratio of the third minimum cross-sectional area for flow to the second minimum cross-sectional area for flow is at least 2:1, at least 3:1, at least 5:1, at least 10:1, at least 15:1, at least 20:1 at least 25:1, at least 30:1, at least 40:1, at least 70:1; least 80:1 or at least 100:1. In some contemplated implementations, this ratio may be in a range with an upper limit of 10,000:1, 1000:1, 500:1, 100:1, 75:1, 60:1, 50:1, 40:1, 30:1, 20:1 or 10:1, provided that the upper limit is selected to be larger than the lower limit of the range.

18. A fluid treating system as recited in example combination 17, wherein the last said collection location is spaced apart by at least 1 centimeter, at least 2 centimeters, at least 3 centimeters, at least 5 centimeters, at least 10 centimeters, at least 15 centimeters, at least 20 centimeters, at least 25 centimeters, at least 30 centimeters, at least 40 centimeters, at least 50 centimeters, at least 75 centimeters or at least 1 meter along the flow axis from a first said collection location along the flow axis of the corresponding said multiple collection locations that correspond to the corresponding said multiple feed locations. In some contemplated implementations, this spacing distance along the flow axis may be in a range with an upper limit of 10 meters, 8 meters, 6 meters, 5 meters, 4 meters, 3 meters, 2 meters, 1 meter, 80 centimeters, 70 centimeters, 60 centimeters or 50 centimeters, provided that the upper limit is selected to be larger than the lower limit.

19. A fluid treating system as recited in example combination 18, wherein the corresponding said multiple collection locations comprises a density of the said collection locations per decimeter of length of the flow axis between the first said collection location and the last said collection location of at least 2, at least 4, at least 6, at least 8, at least 10, at least 15, at least 20 or at least 25 of the said collection locations per decimeter of length of the flow axis between the first said collection location and the last said collection location. In some contemplated implementations, this density may be in a range with an upper limit of 200, 100, 50, 40, 30, 25, 20 or 10 of the said collection locations per decimeter of length of the flow axis between the first said collection location and the last said collection location, provided the upper limit is selected to be larger than the lower limit.

20. A fluid treating system as recited in any one of example combinations 17-19, wherein a ratio of a number of said collection locations of the corresponding said multiple collection locations to a number of said feed locations of the corresponding said multiple feed locations is at least 0.5:1, 0.75:1, 0.9:1, 1:1, 1.1:1, 1.25:1 or 1.5:1. In some contemplated implementations, this ratio is not larger than 2, not larger than 1.75, not larger than 1.5, not larger than 1.25 or not larger than 1.1. In some contemplated implementations, this ratio is about 1.

21. A fluid treating system as recited in any one of example combinations 17-20, wherein a ratio of the third minimum cross-sectional area for flow to a sum of the second minimum cross-sectional areas for flow of all of said heat exchange channels with collection therefrom by the said heat exchange collection channel through the corresponding said multiple collection locations is at least 0.2:1, at least 0.3:1, at least 0.5:1 at least 0.6:1, at least 0.7:1, at least 0.8:1, at least 0.9:1, at least 1:1, at least 1.1:1 or at least 1.25:1. In some contemplated implementations this ratio may be in a range having an upper limit of 10:1, 6:1, 4:1, 3:1, 2:1, 1.5:1, 1.25:1 or 1:1, provided that the upper limit is selected to be larger than the lower limit.

22. A fluid treating system as recited in any one of example combinations 17-21, wherein a ratio of the third minimum cross-sectional area for flow to the first minimum cross-sectional area for flow is at least 0.5:1, at least 0.75:1, at least 0.9:1, at least 1:1, at least 1.1:1 at least 1.25:1 or at least 1.5:1. In some contemplated implementations this ratio is not larger than 6:1, not larger than 4:1, not larger than 3:1, not larger than 2:1, not larger than 1.5:1, or not larger than 1.25:1.

23. A fluid treating system as recited in any one of example combinations 17-22, wherein for at least 2, at least 4, or at least 6 of said collection locations of the corresponding said multiple collection locations, the flow axis is perpendicular to a plane passing through the said collection location, the said heat exchange collection channel and a said heat exchange channel from which a said effluent of the heat exchange fluid is collected by the said heat exchange collection channel. In some contemplated implementations, for at least a majority of, or even for substantially all or all of, said collection locations of the corresponding said multiple collection locations, the flow axis is perpendicular to such plane passing through the said collection location, the said heat exchange collection channel and a said heat exchange channel from which a said effluent of the heat exchange fluid is collected by the said heat exchange collection channel.

24. A fluid treating system as recited in example combination 23, wherein the flow axis is a vertical axis and each said plane is a horizontal plane.

25. A fluid treating system as recited in any one of example combinations 17-24, wherein a plurality of said collection locations of the corresponding said multiple collection locations are located at different radial positions about the flow axis.

26. A fluid treating system as recited in example combination 25, comprising at least 2, at least 3, at least 4, at least 6, at least 8, at least 10, at least 20 or at least 30 of the different radial positions. In some contemplated implementations, the number of the different radial positions is not larger than 1000, not larger than 500, not larger than 300, not larger than 200, not larger than 100, not larger than 75, not larger than 50, not larger than 25 or not larger than 15.

27. A fluid treating system as recited in any one of example combinations 15-26, comprising the outer region of the contactor unit and the inner region of the contactor unit as recited in example combination 12, and wherein:
the at least one heat exchange collection channel is located in the outer region of the contactor unit that extends along the direction of the flow axis.

28. A fluid treating system as recited in example combination 27, wherein:
the at least one heat exchange collection channel extends about and along at least a portion of the inner region of the contactor unit.

29. A fluid treating system as recited in either one of example combination 27 or example combination 28, wherein:
the at least one heat exchange collection channel spirals about and along at least a portion of the inner region of the contactor unit.

30. A fluid treating system as recited in any one of example combinations 1-29, wherein:
the contactor unit optionally comprises at least one heat exchange bypass channel to bypass a portion of the contactor network and the heat exchange channels therein to a downstream location in a heat exchange fluid flow direction along the flow axis;
the feed of the heat exchange fluid is a first feed of the heat exchange fluid and the multiple feed locations are first feed locations located to input the first feed of the heat exchange fluid in the heat exchange channels in a first portion of contactor network in a first longitudinal portion of the contactor unit located along a first longitudinal portion of the flow axis;
the contactor unit comprises a second portion of the contactor network in a second longitudinal portion of the contactor unit located along a second longitudinal portion of the flow axis downstream of the first longitudinal portion of the flow axis in the heat exchange fluid flow direction along the flow axis;
the contactor unit comprises multiple second feed locations spaced along the second longitudinal portion of the flow axis to input second feed of the heat exchange fluid into multiple different locations in the second portion of the contactor network along the second longitudinal portion of the flow axis; and
the contactor unit is configured to transmit at least the second feed from the first longitudinal portion of the contactor unit to the second longitudinal portion of the contactor unit outside of the contactor network to provide the second feed of the heat exchange fluid to the second feed locations in the second portion of the contactor unit.

31. A fluid treating system as recited in example combination 30, wherein:
at least a portion of the heat exchange channels having corresponding said first feed locations to the first portion of the contactor network are fluidly cross-connected within the first portion of the contactor network downstream of their corresponding said first feed locations; and
at least a portion of the heat exchange channels having corresponding said second feed locations to the second portion of the contactor network are fluidly cross-connected within the second portion of the contactor network downstream of their corresponding said first feed locations.

32. A fluid treating system as recited in either one of example combination 30 or example combination 31, wherein:
the heat exchange channels having corresponding said first feed locations to the first portion of the contactor network are not fluidly cross-connected within the contactor network with the heat exchange channels having corresponding said second feed locations to the second portion of the contactor network.

33. A fluid treating system as recited in any one of example combinations 30-32, wherein:
the heat exchange channels having corresponding said first feed locations to the first portion of the contactor network and the heat exchange channels having corresponding said second feed locations to the second portion of the contactor network provide two separate heat exchange fluid flow paths through the contactor network that are not fluidly cross-connected in the contactor network.

34. A fluid treating system as recited in any one of example combinations 30-33, wherein:
a said heat exchange feed channel includes a first portion of the said heat exchange feed channel in the first longitudinal portion of the contactor unit to input the first feed of the heat exchange fluid through the first feed locations;

the said heat exchange feed channel extends from the first portion of the heat exchange feed channel to a second portion of the said heat exchange feed channel in the second longitudinal portion of the contactor unit downstream of the first portion of the heat exchange feed channel to deliver the second feed to the second feed locations.

35. A fluid treating system as recited in any one of example combinations 30-33, wherein:

the contactor unit comprises a said heat exchange bypass channel extending in the heat exchange fluid flow direction along the flow axis past the first portion of the contactor network to provide the second feed of the heat exchange fluid to the second feed locations to feed the heat exchange channels in the second portion of the contactor network in the second longitudinal portion of the contactor unit; and the contactor unit comprises a second said heat exchange feed channel to deliver said second feed of the heat exchange fluid from a first portion of said heat exchange bypass channel to the second feed locations for input to the heat exchange channels in the second portion of the contactor network, wherein the second said heat exchange feed channel extends in a direction of the flow axis and is fluidly interconnected with the heat exchange channels in the second portion of the contactor network.

36. A fluid treating system as recited in example combination 35, wherein:

the first portion of the heat exchange bypass channel includes an inlet port to receive the second feed of the heat exchange fluid, a first outlet port to deliver the second feed of the heat exchange fluid to an inlet port of said second said heat exchange feed channel, and a second outlet port to deliver the additional feed of the heat exchange fluid to an inlet port of a second portion of the heat exchange bypass channel to deliver outside of the contactor network the additional feed of the heat exchange fluid further downstream in the contactor unit in the heat exchange fluid flow direction along the flow axis.

37. A fluid treating system as recited in any one of example combinations 30-36, comprising a said heat exchange collection channel and the corresponding said multiple collection locations as recited in any of example combinations 15-29, and wherein:

the corresponding said multiple collection locations are first collection locations in the first longitudinal portion of the contactor unit and the effluent of the heat exchange fluid is a first effluent of the heat exchange fluid received from multiple different locations in the first portion of the contactor network into a first portion of the said heat exchange collection channel; and a second portion of the heat exchange collection channel is located in the second longitudinal portion of the contactor unit downstream in the heat exchange fluid flow direction along the flow axis from the first portion of the said heat exchange collection channel and is fluidly connected with the heat exchange channels having corresponding second feed locations for the second portion of the contactor network at multiple second collection locations spaced along the second longitudinal portion of the flow axis in the second longitudinal portion of the contactor unit to receive a second effluent of the heat exchange fluid from multiple different locations in the second portion of the contactor network along the second longitudinal portion of the flow axis, wherein the first and second effluents of the heat exchange fluid combine in the second portion of the said heat exchange collection channel.

38. A fluid treating system as recited in example combination 37, wherein:

the first portion of the heat exchange collection channel includes an outlet port to deliver the first effluent to an inlet port of the second portion of the heat exchange collection channel.

39. A fluid treating system as recited in either one of example combination 37 or example combination 38, wherein:

the heat exchange channels having corresponding said first feed locations and the corresponding said first collection locations for the first portion of the contactor network and the heat exchange channels having corresponding said second feed locations and the corresponding second collection locations for the second portion of the contactor network provide two separate heat exchange fluid flow paths through the contactor network to the heat exchange collection channel that are not fluidly cross-connected between their respective said feed locations and said collection locations.

40. A fluid treating system as recited in any one of example combinations 30-39, wherein:

the contactor unit comprises a third portion of the contactor network in a third longitudinal portion of the contactor unit located along a third longitudinal portion of the flow axis downstream of the second longitudinal portion of the flow axis relative to the heat exchange fluid flow direction along the flow axis;

the third longitudinal portion of the contactor unit comprises multiple third feed locations spaced along the third longitudinal portion of the flow axis to input third feed of the heat exchange fluid into multiple different locations in the third portion of the contactor network along the third longitudinal portion of the flow axis; and the contactor unit is configured to transmit the third feed from the second longitudinal portion of the contactor unit to the third longitudinal portion of the contactor unit outside of the contactor network to feed the third feed locations in the third portion of the contactor unit.

41. A fluid treating system as recited in example combination 40, wherein:

at least a portion of the heat exchange channels having corresponding said third feed locations to the third portion of the contactor network are fluidly cross-connected within the third portion of the contactor network downstream of their corresponding said third feed locations.

42. A fluid treating system as recited in either one of example combination 40 or example combination 41, wherein:

the heat exchange channels having corresponding said second feed locations for the second portion of the contactor network are not fluidly cross-connected within the contactor network with the heat exchange channels having corresponding said third feed locations for the third portion of the contactor network or with the heat exchange channels having corresponding said first feed locations for the first portion of the contactor network.

43. A fluid treating system as recited in any one of example combinations 40-42, wherein:
the heat exchange channels having corresponding said first feed locations for the first portion of the contactor network, the heat exchange channels having corresponding said second feed locations for the second portion of the contactor network and the heat exchange channels having corresponding said third feed locations for the third portion of the contactor network provide three separate heat exchange fluid flow paths through the contactor network that are not fluidly cross-connected in the contactor network.

44. A fluid treating system as recited in any one of example combinations 40-43, comprising the said second portion of the heat exchange feed channel as recited in example combination 34, and wherein:
the said heat exchange feed channel extends from the second longitudinal portion of the contactor unit into the third longitudinal portion of the contactor unit and includes a third portion of the said heat exchange feed channel in the third longitudinal portion of the contactor unit downstream of the second portion of the heat exchange feed channel to deliver the third feed of the heat exchange fluid to the third feed locations.

45. A fluid treating system as recited in any one of example combinations 40-43, wherein:
the contactor unit comprises a said heat exchange bypass channel extending in the heat exchange fluid flow direction along the flow axis past the second portion of the contactor network to provide the third feed of the heat exchange fluid to the third feed locations to feed the heat exchange channels in the third portion of the contactor network in the third longitudinal portion of the contactor unit; and
the contactor unit comprises a third said heat exchange feed channel in fluid communication with the bypass channel to deliver said third feed of the heat exchange fluid from a portion of said heat exchange bypass channel to the third feed locations for input to the heat exchange channels in the third portion of the contactor network, wherein the third said heat exchange feed channel extends in a direction of the flow axis and is fluidly interconnected with the heat exchange channels in the third portion of the contactor network.

46. A fluid treating system as recited in any one of example combinations 40-45, comprising a said heat exchange collection channel as recited in any one of example combinations 37-39, and wherein:
a third portion of said heat exchange collection channel is located in the third longitudinal portion of the contactor unit downstream in the heat exchange fluid flow direction along the flow axis from the second portion of the heat exchange collection channel and is fluidly connected with the heat exchange channels having corresponding said third feed locations for the third portion of the contactor network at multiple third collection locations spaced along the third longitudinal portion of the flow axis in the third longitudinal portion of the contactor unit to receive a third effluent of the heat exchange fluid from multiple different locations in the third portion of the contactor network along the third longitudinal portion of the flow axis.

47. A fluid treating system as recited in any one of example combinations 30-46, wherein:
the contactor unit comprises a heat exchange input manifold fluidly interconnected with the first longitudinal portion of the contactor unit with the input manifold located along the flow axis upstream of the first said longitudinal portion of the contactor unit in the heat exchange fluid flow direction along the flow axis; and
the contactor unit is configured for input to the contactor unit each said feed of the heat exchange fluid to each said longitudinal portion of the contactor unit through the input manifold.

48. A fluid treating system as recited in example combination 47, wherein the input manifold is configured for input of each said feed of the heat exchange fluid in a combined input stream of the heat exchange fluid to the input manifold to be divided in the contactor unit into the different said feeds of the heat exchange fluid for different said portions of the contactor network in different said longitudinal portions of the contactor unit.

49. A fluid treating system as recited in either one of example combination 47 or example combination 48, wherein:
the input manifold comprises an input annular member around a process fluid flow path through the input manifold and in fluid communication with the flow voids in each said longitudinal portion of the contactor unit;
the process fluid flow path through the input manifold includes flow openings through opposing ends of the input annular member aligned along the flow axis with each said portion of the contactor network of each said longitudinal portion of the contactor unit with the flow axis extending through the flow openings of the output annular member and through each said portion of the contactor network in each said longitudinal portion of the contactor unit.

50. A fluid treating system as recited in example combination 49, wherein:
the input manifold includes a manifold input port in fluid communication with a heat exchange input manifold void in the input annular member, the input manifold void being in fluid communication with each said heat exchange feed channel and optionally with each said heat exchange bypass channel to provide each said feed of the heat exchange fluid provided through the manifold input port from the input manifold void to the corresponding said feed locations.

51. A fluid treating system as recited in any one of example combinations 30-50, comprising a said heat exchange collection channel as recited in any of example combinations 15-29, 37-39 and 46, wherein:
the contactor unit comprises a heat exchange output manifold fluidly interconnected with a final said longitudinal portion of the contactor unit with the output manifold disposed along the flow axis downstream of the final said longitudinal portion of the contactor unit in the heat exchange fluid flow direction along the flow axis; and
the contactor unit is configured for output from the contactor unit of each said effluent of the heat exchange fluid from each said longitudinal portion of the contactor unit through the output manifold.

52. A fluid treating system as recited in example combination 51, wherein the output manifold is configured for output of each said effluent of the heat exchange fluid in a combined output stream of the heat exchange fluid from the output manifold.

53. A fluid treating system as recited in either one of example combination 51 or example combination 52, wherein:

the output manifold comprises an output annular member around a fluid flow path through the output manifold and in fluid communication with the flow voids in each said longitudinal portion of the contactor unit;

the process fluid flow path through the output manifold includes flow openings through opposing ends of the output annular member aligned along the flow axis with each said portion of the contactor network of each said longitudinal portion of the contactor unit with the flow axis extending through the flow openings of the output annular member and through each said portion of the contactor network in each said longitudinal portion of the contactor unit.

54. A fluid treating system as recited in example combination 53, wherein:

the output manifold includes a manifold output port from a heat exchange output manifold void in the output annular member, the output manifold void being in fluid communication with each said heat exchange collection channel to output each said effluent of the heat exchange fluid from the output manifold void through the manifold output port.

55. A fluid treating system as recited in any one of example combinations 30-54, wherein each said longitudinal portion of the contactor unit is provided in a different contact module of a plurality of the contact modules arranged in series along the flow axis for series flow of the heat exchange fluid through the contact modules in the heat exchange fluid flow direction along the flow axis, with each adjacent pair of the contact modules in the series being fluidly interconnectable and disconnectable through corresponding interfacing ends thereof.

56. A fluid treating system as recited in example combination 55, wherein the contactor unit comprises at least one intermediate flow control member, and wherein at least one said adjacent pair of the contact modules are fluidly interconnected through their said corresponding interfacing ends with a said flow control member being interposed between their said corresponding interfacing ends.

57. A fluid treating system as recited in example combination 56, wherein the contactor unit comprises a plurality of the intermediate flow control members, with each said intermediate flow control member of the plurality of the intermediate flow control members being interposed between the said corresponding interfacing ends of a different said adjacent pair of the contact modules fluidly interconnected through their said corresponding interfacing ends.

58. A fluid treating system as recited in any one of example combinations 55-57, comprising at least one said adjacent pair of the contact modules being fluidly interconnected through direct engagement of their said corresponding interfacing ends.

59. A fluid treating system as recited in any one of example combinations 55-58, comprising the heat exchange input manifold as recited in any one of example combinations 47-50, and wherein:

the first longitudinal portion of the contactor unit is in a first said contact module in the series; and the input manifold is provided in an input manifold module and the first said contact module and the input manifold module are fluidly interconnectable and disconnectable through corresponding interfacing ends thereof.

60. A fluid treating system as recited in any one of example combinations 55-59, comprising the heat exchange output manifold as recited in any one of example combinations 51-54, and wherein:

the final said longitudinal portion of the contactor unit is provided in a final said contact module; and the output manifold is provided in an output manifold module and the final said contact module and output manifold module are fluidly interconnectable and disconnectable through corresponding interfacing ends thereof.

61. A fluid treating system as recited in any one of example combinations 1-29, wherein:

the contactor unit comprises:

multiple contact modules arranged in series along the flow axis for series flow of the heat exchange fluid through the contact modules in a heat exchange fluid flow direction along the flow axis, with adjacent contact modules in the series being fluidly interconnectable and disconnectable through interfacing ends thereof;

optionally, at least one intermediate flow control member interposed between the interfacing ends of adjacent ones of the contact modules; and optionally, at least one heat exchange bypass channel to bypass a portion of the contactor network and the heat exchange channels therein to a downstream location in the heat exchange fluid flow direction along the flow axis;

the feed of the heat exchange fluid is a first feed of the heat exchange fluid and the multiple feed locations are first feed locations located to input the first feed of the heat exchange fluid in the heat exchange channels in a first portion of contactor network disposed along a first longitudinal portion of the flow axis;

the first feed locations and the first portion of the contactor network are in a first said contact module;

the contactor unit comprises a second said contact module comprising a second portion of the contactor network located along a second longitudinal portion of the flow axis downstream of the first longitudinal portion of the flow axis in the heat exchange fluid flow direction along the flow axis;

the second contact module comprises multiple second feed locations spaced along the second longitudinal portion of the flow axis to input second feed of the heat exchange fluid into multiple different locations in the second portion of the contactor network along the second longitudinal portion of the flow axis; and the first contact module and the second contact module are fluidly interconnectable and disconnectable through the interfacing ends thereof, and with the first contact module and the second contact module fluidly interconnected the contactor unit is configured to transmit the second feed from the first contact module to the second contact module outside of the contactor network to feed the second feed locations in the second contact module.

62. A fluid treating system as recited in example combination 61, wherein:

at least a portion of the heat exchange channels having corresponding said first feed locations in the first portion of the contactor network are fluidly cross-connected within the first portion of the contactor network downstream of their corresponding said first feed locations; and at least a portion of the heat exchange channels having corresponding said second feed locations in the second portion of the contactor network are fluidly cross-connected within the second portion of the contactor network downstream of their corresponding said first feed locations.

63. A fluid treating system as recited in example combination 62, wherein:
the heat exchange channels having corresponding said first feed locations in the first portion of the contactor network are not fluidly cross-connected within the contactor network with the heat exchange channels having corresponding said second feed locations in the second portion of the contactor network.

64. A fluid treating system as recited in any one of example combinations 61-63, wherein the interfacing ends of the first contact module and the second contact module are adapted to, or a said intermediate flow control member interposed between the interfacing ends of the first contact module and the second contact module is configured to:
permit the flow of the second feed of the heat exchange fluid from the first contact module to the second contact module to feed the second feed locations.

65. A fluid treating system as recited in any one of example combinations 61-64, wherein:
one of an outlet interfacing end of the first contact module and an inlet interfacing end of the second contact module comprises a plurality of male members and the other comprises a complementary plurality of female members for receiving the plurality of male members.

66. A fluid treating system as recited in example combination 65, wherein:
each engaged pair of a said male member received in a said female member is configured to permit or block the flow of the heat exchange fluid between the first module and the second module.

67. A fluid treating system as recited in any one of example combinations 61-66, wherein:
a said heat exchange feed channel includes a first portion of the said heat exchange feed channel in the first contact module to input the first feed of the heat exchange fluid through the first feed locations;
the said heat exchange feed channel extends from the first contact module into the second contact module and includes a second portion of the said heat exchange feed channel in the second contact module downstream of the first portion of the heat exchange feed channel to deliver the second feed to the second feed locations.

68. A fluid treating system as recited in any one of example combination 61-66, wherein:
the contactor unit comprises a said heat exchange bypass channel extending in the heat exchange fluid flow direction along the flow axis past the first longitudinal portion of the flow axis in the first portion of the contactor network to provide the second feed of the heat exchange fluid to the second feed locations to feed the heat exchange channels in the second portion of the contactor network in the second contact module; and
the contactor unit comprises a second said heat exchange feed channel to deliver said second feed of the heat exchange fluid from a first portion of said heat exchange bypass channel to the second feed locations for input to the heat exchange channels in the second portion of the contactor network, wherein the second said heat exchange feed channel extends in a direction of the flow axis and is fluidly interconnected with the heat exchange channels in the second portion of the contactor network.

69. A fluid treating system as recited in example combination 68, wherein:
the first portion of the heat exchange bypass channel includes an inlet port to receive the second feed of the heat exchange fluid, a first outlet port to deliver the second feed of the heat exchange fluid to an inlet port of said second said heat exchange feed channel, and a second outlet port to deliver the third feed of the heat exchange fluid to an inlet port of the second portion of the heat exchange bypass channel.

70. A fluid treating system as recited in example combination 69, wherein:
the first outlet port of the first portion of the heat exchange bypass channel and the second outlet port of the first portion of the heat exchange bypass channel are each located at an outlet interfacing end of the first contact module; and,
the inlet port of the second portion of the heat exchange bypass channel and the inlet port of said second said heat exchange feed channel are each located at an inlet interfacing end of the second contact module.

71. A fluid treating system as recited in any one of example combinations 61-70, comprising a said heat exchange collection channel and the multiple collection locations as recited in any of example combinations 15-29, and wherein:
the multiple collection locations are first collection locations in the first contact module and the effluent of the heat exchange fluid is a first effluent of the heat exchange fluid received from multiple different locations in the first portion of the contactor network into a first portion of said heat exchange collection channel in the first contact module; and
a second portion of the said heat exchange collection channel is located in the second contact module downstream in the heat exchange fluid flow direction along the flow axis from the first portion of the said heat exchange collection channel and is fluidly connected with the heat exchange channels having corresponding feed locations in the second portion of the contactor network at multiple second collection locations spaced along the second longitudinal portion of the flow axis in the second contact module to receive a second effluent of the heat exchange fluid from multiple different locations in the second portion of the contactor network along the second longitudinal portion of the flow axis.

72. A fluid treating system as recited in example combination 71, wherein:
the first portion of the said heat exchange collection channel includes an outlet port to deliver the first effluent to an inlet port of the second portion of the said heat exchange collection channel.

73. A fluid treating system as recited in example combination 72, wherein:
the outlet port of the first portion of the said heat exchange collection channel is located at an outlet interfacing end of the first contact module; and,
the inlet port of the second portion of the said heat exchange collection channel is located at an inlet interfacing end of the second contact module.

74. A fluid treating system as recited in example combination 73, wherein:
the interfacing ends of the first contact module and second contact module are adapted to, or the contactor unit comprises a said intermediate flow control member interposed between the interfacing ends of the first contact module and the second contact module and is configured to:

permit the flow of the first effluent from the first portion of the said heat exchange collection channel to the second portion of the said heat exchange collection channel.

75. A fluid treating system as recited in any one of example combinations 61-74, wherein:
the contactor unit comprises a third contact module comprising a third portion of the contactor network located along a third longitudinal portion of the flow axis downstream of the second longitudinal portion of the flow axis relative to the heat exchange fluid flow direction;
the third contact module comprises multiple third feed locations spaced along the third longitudinal portions of the flow axis to input third feed of the heat exchange fluid into multiple different locations in the third portion of the contactor network along the third longitudinal portion of the flow axis; and
the second contact module and the third contact module are fluidly interconnectable and disconnectable through the interfacing ends thereof, and with the second contact module and the third contact module fluidly interconnected the contactor unit is configured to transmit the third feed from the second contact module to the third contact module outside of the contactor network to feed the third feed locations in the third contact module 76. A fluid treating system as recited in example combination 75, wherein:
the heat exchange channels having corresponding said second feed locations in the second portion of the contactor network are not fluidly cross-connected within the contactor network with the heat exchange channels having corresponding said third feed locations in the third portion of the contactor network.

77. A fluid treating system as recited in either one of example combination 74 or example combination 75, comprising the said second portion of the heat exchange feed channel as recited in example combination 67, and wherein:
the said heat exchange feed channel extends from the second contact module into the third contact module and includes a third portion of the said heat exchange feed channel in the third contact module downstream of the second portion of the heat exchange feed channel to deliver the third feed to the third feed locations.

78. A fluid treating system as recited in either one of example combination 75 or example combination 76, wherein:
the contactor unit comprises a said heat exchange bypass channel extending in the heat exchange fluid flow direction along the flow axis past the second longitudinal portion of the flow axis in the second portion of the contactor network to provide the third feed of the heat exchange fluid to the third feed locations to feed the heat exchange channels in the third portion of the contactor network in the third contact module; and
the contactor unit comprises a third said heat exchange feed channel in fluid communication with the bypass channel to deliver said third feed of the heat exchange fluid from the said heat exchange bypass channel to the third feed locations for input to the heat exchange channels in the third portion of the contactor network, wherein the third said heat exchange feed channel extends in a direction of the flow axis and is fluidly interconnected with the heat exchange channels in the third portion of the contactor network.

79. A fluid treating system as recited in any one of example combinations 75-78, wherein the interfacing ends of the second contact module and the third second contact module are adapted to, or a said intermediate flow control member interposed between the interfacing ends of the second contact module and the third contact module and is configured to:
permit or block the flow of the third feed of the heat exchange fluid from the second contact module to the third contact module to feed the third feed locations.

80. A fluid treating system as recited in any one of example combinations 75-79, comprising a said collection channel as recited in any one of example combinations 71-74, and wherein:
a third portion of the said heat exchange collection channel is located in the third contact module downstream in the heat exchange fluid flow direction along the flow axis from the second portion of the heat exchange collection channel and is fluidly connected with the heat exchange channels having corresponding said third feed locations in the third portion of the contactor network at multiple third collection locations spaced along the third longitudinal portion of the flow axis in the third contact module to receive a third effluent of the heat exchange fluid from multiple different locations in the third portion of the contactor network along the third longitudinal portion of the flow axis.

81. A fluid treating system as recited in example combination 80, wherein the interfacing ends of the second contact module and the third second contact module are adapted to, or a said intermediate flow control member interposed between the interfacing ends of the second contact module and the third contact module and is configured to:
permit the flow of the second effluent from the second portion of the heat exchange collection channel to the third portion of the heat exchange collection channel;

82. A fluid treating system as recited in any one of example combinations 1-81, wherein walls of at least a portion of the heat exchange channels in the flow diversion barriers are constructed of a material of construction.

83. A fluid treating system as recited in example combination 82, wherein the material of construction is a metallic material.

84. A fluid treating system as recited in example combination 83, wherein the metallic material is selected from the group consisting of a stainless steel and a titanium alloy.

85. A fluid treating system as recited in example combination 82, wherein the material of construction comprises a polymeric material.

86. A fluid treating system as recited in example combination 85, wherein the polymeric material comprises a cured photopolymer.

87. A fluid treating system as recited in either one of example combination 85 and example combination 86, where in the material of construction is a filled polymeric material comprising a polymeric matrix and particles of filler dispersed by the polymeric matrix, wherein the filler as a higher thermal conductivity than the polymeric matrix.

88. A fluid treatment system as recited in example combination 87, wherein the particles of the filler comprise a metallic material.

89. A fluid treating system as recited in example combination 88, wherein the metallic material is selected from the group consisting of a stainless steel, a titanium alloy, aluminum, copper and nickel.

91. A fluid treatment system as recited in example combination 87, wherein the particles of the filler comprise carbon.

92. A fluid treatment system as recited in any one of example combinations 87-91, wherein the particles of the filler having an aspect ratio of at least 2, at least 4, at least 6 or at least 10. The aspect ratio may be a ratio of the length dimension to width dimension of the particles. The aspect ratio for a batch of particles may be an average value on any basis, for example based on a mass average basis, volume average basis or number average basis, and preferably based on a mass average basis. As will be appreciated, for particles of uniform composition, mass average basis and volume average basis will be the same.

93. A fluid treatment system as recited in example combination 92, wherein the particles of the filler having the aspect ratio are aligned with length dimensions extending in a direction across a thickness of a said wall between a said heat exchange channel and an adjacent said flow void. In one contemplated implementation, the particles of the filler having the aspect ratio are configured as Z-direction thermal conductors in a said wall.

94. A fluid treatment system as recited in either one of example combination 92 or example combination 93, wherein the particles of the filler having the aspect ratio comprise carbon fibers.

95. A fluid treatment system as recited in any one of example combinations 87-91, wherein the particles of the filler are granular. Such granular materials may have an aspect ratio of smaller than 2, smaller than 1.5 or smaller than 1.25. Such granular materials may be comprised of spheroidal particles.

96. A fluid treating system as recited in any one of example combinations 82-95, wherein the material of construction changes in composition in the contactor network along the flow axis over at least one longitudinal portion of the flow axis.

97. A fluid treating system as recited in example combination 96, wherein the material of construction is a filled polymeric material as recited in any one of example combinations 87-95 and a loading of the particles of the filler in the filled polymeric composition changes along the at least one longitudinal portion of the flow axis.

98. A fluid treating system as recited in example combination 97, wherein the loading of the particles of the filler increases over the at least one longitudinal portion of the flow axis in a heat exchange fluid flow direction along the flow axis.

99. A fluid treating system as recited in any one of example combinations 1-98, wherein the flow diversion barriers of the contactor network including the heat exchange channels have at least one property that changes along the flow axis over at least one longitudinal portion of the flow axis that changes a heat transfer coefficient for heat conduction across material of the flow diversion barriers separating the heat exchange channels from adjacent said flow voids.

100. A fluid treating system as recited in example combination 99, wherein the at least one property includes composition of a material of construction of the material of the flow diversion barriers.

101. A fluid treating system as recited in either one of example combination 99 or example combination 100, wherein the at least one property includes wall thickness between the heat exchange channels and the adjacent said flow voids.

102. A fluid treating system as recited in any one of example combinations 1-101, wherein the vessel extends longitudinally in a vertical direction and the flow axis is vertical through the vessel.

103. A fluid treating system as recited in example combination 102, wherein a heat exchange fluid flow direction through the contactor unit along the axis is vertically upward.

104. A fluid treating system as recited in example combination 102, wherein a heat exchange fluid flow direction through the contactor unit along the flow axis is vertically downward.

105. A fluid treating system as recited in any one of example combinations 1-101, wherein the vessel extends longitudinally in a horizontal direction and the flow axis is horizontal through the vessel.

106. A fluid treating system as recited in any one of example combinations 1-105, wherein the heat exchange fluid is a heat exchange cooling fluid to cool the process fluids moving through the flow voids.

107. A fluid treating system as recited in any one of example combinations 1-105, wherein the heat exchange fluid is a heat exchange heating fluid to heat the process fluids moving through the flow voids.

108. A fluid treating system as recited in any one of example combinations 1-107, wherein the heat exchange fluid as fed to the heat exchange channels is a liquid, optionally an aqueous liquid, and optionally water or consisting essentially of water.

109. A fluid treating system as recited in any one of example combinations 1-107, wherein the heat exchange fluid as fed to the heat exchange channels is a gas, optionally steam.

110. A fluid treating system as recited in any one of example combinations 1-109, comprising a source of the heat exchange fluid fluidly interconnected with at least a portion of the heat exchange channels.

111. A fluid treating system as recited in example combination 110, comprising the heat exchange fluid flowing through at least a portion of the heat exchange channels.

112. A fluid treating system as recited in any one of example combinations 1-111, comprising a source of the first process fluid fluidly interconnected with the fluid inlet.

113. A fluid treating system as recited in any one of example combinations 1-112, wherein the first fluid phase is one of a gas phase and a liquid phase and the second fluid phase is the other of the gas phase and the liquid phase.

114. A fluid treating system as recited in any one of example combinations 1-112, wherein the first fluid phase is a first liquid phase and the second fluid phase is a second liquid phase.

115. A fluid treating system as recited in claim 114, wherein the first liquid phase and the second liquid phase are immiscible.

116. A fluid treating system as recited in any one of example combinations 1-115, wherein:
the fluid inlet is a first fluid inlet and the feed stream is a first feed stream and the vessel comprises a second fluid inlet to receive a second feed stream including a feed for the second fluid phase to be contacted with the first fluid phase in the internal volume of the vessel. Optionally, the fluid treating system comprises a source for the second feed stream fluidly interconnected with the second fluid inlet.

117. A fluid treating system as recited in example combination 116, wherein:

the fluid outlet is a first fluid outlet and the process effluent stream is a first process effluent stream, and the vessel comprises a second fluid outlet to output a second process effluent stream including an effluent of the first fluid phase depleted in the material to be transferred.

118. A fluid treating system as recited in example 117, wherein the first fluid phase is a gas phase and the second fluid phase is a liquid phase.

119. A fluid treating system as recited in Claim 118, wherein the fluid treating system is a carbon dioxide capture system for capturing carbon dioxide from the a carbon dioxide-containing gas mixture involving contact of the gas mixture with an amine-based scrubbing solution; and further wherein:
the vessel is a packed scrubbing vessel;
the first fluid inlet is a gas inlet and the first feed stream is a feed stream of the gas mixture to the scrubbing vessel with carbon dioxide for removal in an internal volume of the scrubbing vessel;
a the second fluid outlet is a gas outlet and the second process effluent stream is a treated stream of the gas mixture from the internal volume of the scrubbing vessel having a lower carbon dioxide concentration than the feed stream of the gas mixture to the scrubbing vessel;
the second fluid inlet is a liquid inlet and the second feed stream is a feed stream of said scrubbing solution for processing in the internal volume of the scrubbing vessel to contact the gas mixture to remove carbon dioxide from the gas mixture for capture in the scrubbing solution;
the second fluid outlet is a liquid outlet and the second process effluent stream is an effluent stream of rich said scrubbing solution from the internal volume of the scrubbing vessel, the rich said scrubbing solution having captured carbon dioxide removed from the gas mixture;
the flow axis extends in a direction along the scrubbing vessel from a location corresponding with the gas inlet to a distant location corresponding with the gas outlet; and
the contactor unit is a gas-liquid contactor unit disposed along the flow axis between the gas inlet and the gas outlet and between the liquid inlet and the liquid outlet.

120. A fluid treating system as recited in example combination 119, wherein the amine-based scrubbing solution comprises at least one amine compound.

121. A fluid treating system as recited in example combination 120, wherein the feed stream of the scrubbing solution comprises the at least one amine compound at a concentration in a range having a lower limit of 10 weight percent, 15, weight percent, 20 weight percent, 25 weight percent and 30 weight percent and an upper limit of 70 weight percent, 60 weight percent, 50 weight percent, 45 weight percent, 45 weight percent, 40 weight percent or 35 weight percent; with one preferred range being from 15 weight percent to 40 weight percent.

122. A fluid treating system as recited in either one of example combination 120 or example combination 121, wherein the at least one amine compound comprises at least one compound selected from the group consisting of monoethanolamine, diethanolamine, N-methylethanolamine, diisopropanolamine, aminoethoxyethanol (diglycolamine), 2-amino-2-methylpropanol, methyl diethanolamine, benzylamine, a substituted benzylamine and piperazine.

123. A fluid treating system as recited in example combination 122, wherein the at least one amine compound comprises at least two compounds selected from the group consisting of monoethanolamine, diethanolamine, N-methylethanolamine, diisopropanolamine, aminoethoxyethanol (diglycolamine), 2-amino-2-methylpropanol, methyl diethanolamine, benzylamine, a substituted benzylamine and piperazine.

124. A fluid treating system as recited in any one of example combinations 119-123, wherein the amine-based scrubbing solution is an aqueous solution, with water present in the largest molar concentration.

125. A fluid treating system as recited in any one of example combinations 119-124, comprising the amine-based scrubbing solution flowing through the flow voids in the internal volume of the scrubbing vessel.

126. A fluid treating system as recited in any one of example combinations 119-125, comprising a feed stream of the heat exchange fluid being fed to the contactor unit, an effluent stream of the heat exchange fluid being removed from the contactor unit and the heat exchange fluid flowing through at least a portion of the heat exchange channels.

127. A fluid treating system as recited in example combination 126, wherein:
the heat exchange fluid is a heat exchange cooling fluid with the feed stream of the heat exchange fluid supplied to the contactor unit being at a lower temperature than a heat exchange fluid effluent stream removed from the contactor unit; and
the feed stream of the heat exchange fluid is at a temperature of at least 0° C., 5° C., 10° C. or 15° C. In some contemplated implementations, the temperature of the feed stream of the heat exchange fluid is not greater than 40° C., 35° C., 30° C., 25° C., 20° C. or 15° C., provided that the upper limit is selected to be larger than the lower limit.

128. A fluid treating system as recited in example combination 127, wherein the effluent stream of the heat exchange fluid is in a range having a lower limit of 30° C., 35° C., 40° C., 45° C. or 50° C. and an upper limit of 80° C., 70° C., 60° C., 55° C., 50° C. and 45° C.

129. A fluid treating system as recited in any one of example combinations 119-128, comprising a combustion flue gas source fluidly interconnected with the gas inlet and wherein the feed of the gas mixture comprises dehumidified combustion flue gas, optionally at a pressure of no larger than 5 bars or even lower, and optionally including a minimum and/or maximum concentration of oxygen gas as disclosed above.

130. A flue gas treating system as recited in any one of example combinations 1-113 wherein the fluid outlet is a first fluid outlet and the process effluent stream is a first process effluent stream, and the vessel comprises a second fluid outlet to output a second process effluent stream including an effluent stream including the first fluid phase depleted in the material to be transferred.

131. A fluid treating system as recited in Claim 130, wherein the fluid treating system is a regeneration system for regenerating amine-based scrubbing solution for carbon dioxide capture from a gas mixture; and further wherein:
the vessel is a stripping vessel;
the feed stream comprises rich said amine-based scrubbing solution as the first fluid phase having captured carbon dioxide for removal in the internal volume of the stripping vessel;
the first fluid outlet is a gas outlet and the first process effluent stream includes as the second fluid phase a purified carbon dioxide gas stream including carbon dioxide transferred from the first fluid phase in the internal volume;

the second fluid outlet is a liquid outlet and the second process effluent stream comprises an effluent stream of lean said scrubbing solution having a reduced carbon dioxide content than the rich said scrubbing solution of the feed stream;

the contactor unit is disposed along the flow axis between the first fluid outlet and the second fluid outlet.

132. A fluid treating system as recited in example combination 131, wherein the amine-based scrubbing solution of the feed stream comprises at least one amine compound.

133. A fluid treating system as recited in example combination 132, wherein the feed stream comprises the at least one amine compound at a concentration in a range having a lower limit of 10 weight percent, 15, weight percent, 20 weight percent, 25 weight percent and 30 weight percent and an upper limit of 70 weight percent, 60 weight percent, 50 weight percent, 45 weight percent, 45 weight percent, 40 weight percent or 35 weight percent; with one preferred range being from 15 weight percent to 40 weight percent.

134. A fluid treating system as recited in either one of example combination 132 or example combination 133, wherein the at least one amine compound comprises at least one compound selected from the group consisting of monoethanolamine, diethanolamine, N-methylethanolamine, diisopropanolamine, aminoethoxy ethanol (diglycolamine), 2-amino-2-methylpropanol, methyl diethanolamine, benzylamine, a substituted benzylamine and piperazine.

135. A fluid treating system as recited in example combination 134, wherein the at least one amine compound comprises at least two compounds selected from the group consisting of monoethanolamine, diethanolamine, N-methylethanolamine, diisopropanolamine, aminoethoxyethanol (diglycolamine), 2-amino-2-methylpropanol, methyl diethanolamine, benzylamine, a substituted benzylamine and piperazine.

136. A fluid treating system as recited in any one of example combinations 131-135, wherein the feed stream is an aqueous solution, with water present in the largest molar concentration.

137. A fluid treating system as recited in any one of example combinations 131-136, comprising the amine-based scrubbing solution and released carbon dioxide gas flowing through the flow voids in the internal volume of the stripping vessel.

138. A fluid treating system as recited in any one of example combinations 131-137, comprising a feed stream of the heat exchange fluid being fed to the contactor unit, an effluent stream of the heat exchange fluid being removed from the contactor unit and the heat exchange fluid flowing through at least a portion of the heat exchange channels.

139. A fluid treating system as recited in example combination 138, wherein:

the heat exchange fluid is a heat exchange heating fluid with the feed stream of the heat exchange fluid supplied to the contactor unit being at a higher temperature than a heat exchange fluid effluent stream removed from the contactor unit.

140. A fluid treating system as recited in example combination 139, wherein the feed stream of the heat exchange fluid is at a temperature of at least 100° C.

141. A fluid treating system as recited in any one of example combinations 131-140, comprising a carbon dioxide scrubbing vessel fluidly interconnected with the fluid inlet of the stripping vessel to provide the rich said scrubbing solution for the feed stream to the fluid inlet.

142. A fluid mass transfer contactor unit for disposition in an internal volume of a process vessel along a flow axis of the process vessel to contact the process fluids moving through the internal volume to facilitate mass transfer of the material from a first fluid phase to a second fluid phase, the contactor unit comprising:

a longitudinally-extending flow axis to align with a vessel flow axis of a process vessel when disposed in a process vessel for a fluid treating operation;

a contactor network of flow diversion barriers with flow voids for movement of the process fluids between the flow diversion barriers;

a plurality of heat exchange channels in the flow diversion barriers within the flow diversion barriers of the contactor network to transport heat exchange fluid through the contactor network to heat or cool the process fluids moving through the flow voids during a fluid treating operation;

at least one heat exchange feed channel to deliver feed of the heat exchange fluid to the heat exchange channels, wherein the heat exchange feed channel extends in a direction of the flow axis and is fluidly connected with the heat exchange channels at multiple feed locations spaced along the flow axis to input the feed of the heat exchange fluid into multiple different locations in the contactor network along the flow axis.

143. A fluid mass transfer contactor unit as recited in example combination 142, wherein the flow axis extends in a direction of flow of the process fluids through the contactor network from a process fluid inlet side to a process fluid outlet side of the contactor network.

144. A fluid mass transfer contactor unit as recited in either one of example combination 142 or example combination 143, comprising any features of any said contactor unit as recited in any of example combinations 1-101.

145. A method for treating a fluid for mass transfer between fluid phases in process fluids, the method comprising;

inputting a feed stream of a first process fluid into an interior volume of a process vessel, the first process fluid including at least a first fluid phase with material to be transferred to a second fluid phase in the internal volume, the vessel including a fluid mass transfer contactor unit disposed in the interior volume to facilitate mass transfer of the material from the first fluid phase to the second fluid phase, the contactor unit disposed along a flow axis of the vessel, wherein the flow axis extends in a longitudinal direction along the vessel away from a location where the feed stream of the first process fluid is inputted into the interior volume, and wherein the contactor unit comprises:

a contactor network of flow diversion barriers with flow voids for movement of the process fluids between the flow diversion barriers:

a plurality of heat exchange channels in the flow diversion barriers to transport heat exchange fluid through the contactor network to heat or cool the process fluids moving through the flow voids during a fluid treating operation; and at least one heat exchange feed channel to deliver feed of the heat exchange fluid to the heat exchange channels, wherein the heat exchange feed channel extends in a direction of the flow axis and is fluidly connected with the heat exchange channels at multiple feed locations spaced along the flow axis to input the feed of the heat exchange fluid into multiple different locations in the contactor network along the flow axis;

contacting process fluids including the first fluid phase moving through the flow voids with the flow diversion barriers and transferring at least a portion of the material to be transferred from the first fluid phase to the second fluid phase;

during the contacting, heating or cooling the process fluids flowing through at least a portion the flow voids, the heating or cooling the process fluids comprising:

providing a feed stream of the heat exchange fluid to the contactor unit;

delivering at least a portion of the heat exchange fluid from the feed stream of the heat exchange fluid as the feed of the heat exchange fluid to the at least one heat exchange feed channel and from the at least one heat exchange feed channel through the multiple feed locations into the heat exchange channels; and removing from the contactor unit an effluent stream of the heat exchange fluid including an effluent of the heat exchange fluid from the heat exchange channels; and outputting a process effluent stream from the interior volume of the vessel, the process effluent stream including the second fluid phase including transferred material from the first fluid phase.

146. A method as recited in example combination 145, wherein the contactor unit is as recited in, or the method is practiced using the features of the contactor unit as recited in, any of example combinations 1-101 and 142-143.

147. A method as recited in either one of example combination 145 or example combination 146, wherein the vessel is as recited in any of example combinations 1-141, or the method is practiced using the features of the vessel or the fluid treating system as recited in any of example combinations 1-141.

148. A method as recited in any one of Claims 145-147, wherein:

the fluid treating comprises removing carbon dioxide from the first fluid phase comprising a gas mixture and capturing in the second fluid phase carbon dioxide removed from the first fluid phase, the second fluid phase comprising an amine-based scrubbing solution;

the vessel is a scrubbing vessel and the contactor unit is a gas-liquid contactor unit;

the feed stream is a first feed stream and comprises feed of the gas mixture with carbon dioxide for removal from the gas mixture in the internal volume of the scrubbing vessel;

the process effluent stream is a first process effluent stream and comprises a rich said scrubbing solution having captured carbon dioxide removed from the gas mixture in the internal volume:

and the method comprises:

inputting a second feed stream into the interior volume, the second feed stream comprising a lean said scrubbing solution having a lower concentration of carbon dioxide than the rich said scrubbing solution; and outputting a second process effluent stream comprising a treated stream of the gas mixture from the internal volume having a lower carbon dioxide concentration than in the first feed steam.

149. A method as recited in example combination 148, wherein the amine-based scrubbing solution comprises at least one amine compound.

150. A method as recited in example combination 149, wherein the second feed stream comprises the at least one amine compound at a concentration in a range having a lower limit of 10 weight percent, 15, weight percent, 20 weight percent, 25 weight percent and 30 weight percent and an upper limit of 70 weight percent, 60 weight percent, 50 weight percent, 45 weight percent, 45 weight percent, 40 weight percent or 35 weight percent; with one preferred range being from 15 weight percent to 40 weight percent.

151. A method as recited in either one of example combination 149 or example combination 150, wherein the at least one amine compound comprises at least one compound selected from the group consisting of monoethanolamine, diethanolamine, N-methylethanolamine, diisopropanolamine, aminoethoxy ethanol (diglycolamine), 2-amino-2-methylpropanol, methyl diethanolamine, benzylamine, a substituted benzylamine and piperazine.

152. A method as recited in example combination 151, wherein the at least one amine compound comprises at least two compounds selected from the group consisting of monoethanolamine, diethanolamine, N-methylethanolamine, diisopropanolamine, aminoethoxyethanol (diglycolamine), 2-amino-2-methylpropanol, methyl diethanolamine, benzylamine, a substituted benzylamine and piperazine.

153. A method as recited in any one of example combinations 148-152, wherein the second feed stream is an aqueous solution, with water present in the largest molar concentration.

154. A method as recited in any one of example combinations 148-153, wherein:

the heat exchange fluid is a heat exchange cooling fluid with the feed stream of the heat exchange fluid supplied to the contactor unit is at a lower temperature than a heat exchange fluid effluent stream removed from the contactor unit.

155. A method as recited in any one of example combinations 148-154, wherein the feed stream of the heat exchange fluid is at a temperature of at least 0° C., 5° C., 10° C. or 15° C. In some contemplated implementations, the temperature of the feed stream of the heat exchange fluid is not greater than 40° C., 35° C., 30° C., 25° C., 20° C. or 15° C., provided that the upper limit is selected to be larger than the lower limit.

156. A method as recited in any one of example combinations 148-155 wherein the effluent stream of the heat exchange fluid is in a range having a lower limit of 30° C., 35° C., 40° C., 45° C. or 50° C. and an upper limit of 80° C., 70° C., 60° C., 55° C., 50° C. and 45° C.

157. A method as recited in any one of example combinations 148-156, wherein first feed stream comprises a combustion flue gas, optionally a dehumidified combustion flue gas, optionally at a pressure of no larger than 5 bars or even lower, and optionally including a minimum and/or maximum concentration of oxygen gas as disclosed above.

158. A method as recited in any one of example combinations 145-147, wherein:

the fluid treating comprises regenerating amine-based scrubbing solution for carbon dioxide capture from a gas mixture, with the first fluid phase comprising the scrubbing solution and with the second fluid phase comprising carbon dioxide released from the scrubbing solution in the internal volume:

the vessel is a stripping vessel;

the feed stream comprises rich said amine-based scrubbing solution having captured carbon dioxide for removal in the internal volume of the stripping vessel;

the process effluent stream is a first process effluent stream comprising a purified carbon dioxide gas stream including carbon dioxide transferred from the first fluid phase in the internal volume;

and the method comprises:

outputting a second process effluent stream comprising lean said scrubbing solution having a reduced carbon dioxide content than the rich said scrubbing solution.

159. A method as recited in example combination 158, wherein the feed stream comprises at least one amine compound.

160. A method as recited in example combination 159, wherein the feed stream comprises the at least one amine compound at a concentration in a range having a lower limit of 10 weight percent, 15, weight percent, 20 weight percent, 25 weight percent and 30 weight percent and an upper limit of 70 weight percent, 60 weight percent, 50 weight percent, 45 weight percent, 45 weight percent, 40 weight percent or 35 weight percent; with one preferred range being from 15 weight percent to 40 weight percent.

161. A method as recited in either one of example combination 159 or example combination 160, wherein the at least one amine compound comprises at least one compound selected from the group consisting of monoethanolamine, diethanolamine, N-methylethanolamine, diisopropanolamine, aminoethoxy ethanol (diglycolamine), 2-amino-2-methylpropanol, methyl diethanolamine, benzylamine, a substituted benzylamine and piperazine.

162. A method as recited in example combination 161, wherein the at least one amine compound comprises at least two compounds selected from the group consisting of monoethanolamine, diethanolamine, N-methylethanolamine, diisopropanolamine, aminoethoxyethanol (diglycolamine), 2-amino-2-methylpropanol, methyl diethanolamine, benzylamine, a substituted benzylamine and piperazine.

163. A method as recited in any one of example combinations 158-162, wherein the feed stream is an aqueous solution, with water present in the largest molar concentration.

164. A method as recited in example combination 163, wherein:

the heat exchange fluid is a heat exchange heating fluid with the feed stream of the heat exchange fluid supplied to the contactor unit being at a higher temperature than a heat exchange fluid effluent stream removed from the contactor unit.

165. A method as recited in example combination 164, wherein the feed stream of the heat exchange fluid is at a temperature of at least 100° C.

166. A carbon dioxide capture system for capturing carbon dioxide from a carbon dioxide-containing gas mixture involving contact of the gas mixture with an amine-based scrubbing solution, the system comprising a packed scrubbing vessel including:

a gas inlet to receive a feed stream of the gas mixture to the scrubbing vessel with carbon dioxide for removal in an internal volume of the scrubbing vessel;

a gas outlet to output a treated stream of the gas mixture from the internal volume of the scrubbing vessel having a lower carbon dioxide concentration than the feed stream of the gas mixture to the scrubbing unit;

a liquid inlet to receive a feed stream of said scrubbing solution for processing in the internal volume of the scrubbing vessel to contact the gas mixture to remove carbon dioxide from the gas mixture for capture in the scrubbing solution;

a liquid outlet to output an effluent stream of rich said scrubbing solution from the internal volume of the scrubbing vessel, the rich said scrubbing solution having captured carbon dioxide removed from the gas mixture;

a flow axis extending in a direction along the scrubbing vessel from a location corresponding with the gas inlet to a distant location corresponding with the gas outlet;

a gas-liquid contactor unit disposed along the flow axis between the gas inlet and the gas outlet and between the liquid inlet and the liquid outlet and including a contactor network of flow diversion barriers with flow voids for movement of process fluids including the gas mixture and scrubbing solution between the flow diversion barriers, the contactor unit comprising:

a plurality of heat exchange channels in the flow diversion barriers to transport heat exchange cooling fluid through the contactor network to cool the process fluids moving through the flow voids during a carbon dioxide scrubbing operation;

at least one heat exchange feed channel to deliver feed of the heat exchange cooling fluid to the heat exchange channels, wherein the heat exchange feed channel extends in a direction of the flow axis and is fluidly connected with the heat exchange channels at multiple feed locations spaced along the flow axis to input the feed of the heat exchange cooling fluid into multiple different locations in the contactor network along the flow axis.

167. A carbon dioxide capture system as recited in example combination 166, wherein:

the contactor unit comprises at least one heat exchange collection channel to collect effluent of the heat exchange cooling fluid from the heat exchange channels; and the heat exchange collection channel extends in a direction of the flow axis and is fluidly connected with the heat exchange channels at multiple collection locations spaced along the flow axis to receive the effluent of the heat exchange cooling fluid from multiple different locations in the contactor network along the flow axis.

168. A carbon dioxide capture system as recited in example combination 167, wherein:

the feed of the heat exchange cooling fluid is a first feed of the heat exchange fluid and the multiple feed locations of a first said heat exchange feed channel are first feed locations located to input the first feed of the heat exchange cooling fluid in the heat exchange channels in a first portion of contactor the network disposed along a first longitudinal portion of the flow axis; and the contactor unit comprises at least one heat exchange bypass channel extending in a heat exchange fluid flow direction along the flow axis past the first longitudinal portion of the flow axis in the first portion of the contactor network to provide at least a second feed of the heat exchange fluid to the heat exchange channels in a second portion of the network located along a second longitudinal portion of the flow axis downstream of the first longitudinal portion of the flow axis relative to the heat exchange fluid flow direction.

169. A carbon dioxide capture system as recited in example combination 168, wherein at least a portion of the heat exchange channels having corresponding said first feed locations in the first portion of the contactor network are fluidly cross-connected downstream of their corresponding said first feed locations.

170. A carbon dioxide capture system as recited in example combination 168 or example combination 169, wherein:
the contactor unit comprises a second said heat exchange feed channel to deliver said second feed of the heat exchange fluid from a first portion of said heat exchange bypass channel to the heat exchange channels in the second portion of the contactor network, wherein the second said heat exchange feed channel extends in a direction of the flow axis and is fluidly interconnected with the heat exchange channels in the second portion of the contactor network at multiple second feed locations spaced along the flow axis to input the second feed of the heat exchange fluid from the first portion of the heat exchange bypass channel into multiple different locations in the second portion of the contact network along the flow axis.

171. A carbon dioxide capture system as recited in example combination 170, wherein at least a portion of the heat exchange channels having corresponding said second feed locations in the second portion of the contactor network are fluidly cross-connected downstream of their corresponding said second feed locations.

172. A carbon dioxide capture system as recited in example combination 170 or example combination 171, wherein the heat exchange channels having corresponding said first feed locations in the first portion of the contactor network and the heat exchange channels having corresponding said second feed locations in the second portion of the contactor network are not fluidly cross-connected in the contactor network.

173. A carbon dioxide capture system as recited in any one of example combinations 170-172, wherein:
the multiple collection locations are first collection locations and the effluent of the heat exchange cooling fluid is a first effluent of the heat exchange cooling fluid received from multiple different locations in the first portion of the contactor network into a first portion of said heat exchange collection channel; and
a second portion of said heat exchange collection channel is located downstream in the heat exchange cooling fluid flow direction along the flow axis from the first portion of the heat exchange collection channel and is fluidly connected with the heat exchange channels having corresponding feed locations in the second portion of the contactor network at multiple second collection locations spaced along the flow axis to receive a second effluent of the heat exchange cooling fluid from multiple different locations in the second portion of the contactor network along the flow axis.

174. A carbon dioxide capture system as recited in example combination 173, wherein:
the first said heat exchange feed channel, the first portion of the contactor network, said first feed locations, and said first portion of the heat exchange collection channel are provided in a first contact module of the contactor unit;
the second said heat exchange feed channel, the second portion of the contactor network, said second feed locations, and said second portion of the heat exchange collection channel are provided in a second contact module of the contactor unit; and
the first contact module and the second contact module are fluidly interconnectable and disconnectable through interfacing ends thereof.

175. A carbon dioxide capture system as recited in example combination 174, wherein:
the first portion of the heat exchange bypass channel is provided in the first contact module.

176. A carbon dioxide capture system as recited in example combination 175, wherein:
the interfacing ends of the first contact module and second contact module are adapted to, or the contactor unit comprises at least one intermediate flow control member interposed between the interfacing ends of the first contact module and the second contact module configured to:
permit or block the flow of the second feed of the heat exchange fluid from the first portion of the heat exchange bypass channel to the second said heat exchange feed channel; and,
permit the flow of the first effluent from the first portion of the heat exchange collection channel to the second portion of the heat exchange collection channel.

177. A carbon dioxide capture system as recited in example combination 176, wherein:
the contactor unit comprises a third said heat exchange feed channel to deliver a third feed of the heat exchange fluid from a second portion of said heat exchange bypass channel to the heat exchange channels in a third portion of the contactor network located along a third longitudinal portion of the flow axis downstream of the second longitudinal portion of the flow axis relative to the heat exchange fluid flow direction, wherein the third said heat exchange feed channel extends in a direction of the flow axis and is fluidly interconnected with the heat exchange channels in the third portion of the contactor network at multiple third feed locations spaced along the flow axis to input the third feed of the heat exchange fluid from the second portion of the heat exchange bypass channel into multiple different locations in the third portion of the contact network along the flow axis; and,
the second portion of the heat exchange bypass channel is provided in the second contact module.

178. A carbon dioxide capture system as recited in example combination 177, wherein the interfacing ends of the first contact module and second contact module are further adapted to, or a first said intermediate flow control member is configured to:
permit or block the flow of the third feed of the heat exchange fluid from the first portion of the heat exchange bypass channel to the second portion of the heat exchange bypass channel.

179. A carbon dioxide capture system as recited in example combination 178, wherein:
the first portion of the heat exchange bypass channel includes an inlet port to receive the second feed of the heat exchange fluid, a first outlet port to deliver the second feed of the heat exchange fluid to an inlet port of said second said heat exchange feed channel, and a second outlet port to deliver the third feed of the heat exchange fluid to an inlet port of the second portion of the heat exchange bypass channel; and,
the first portion of the heat exchange collection channel includes an outlet port to deliver the first effluent to an inlet port of the second portion of the heat exchange collection channel.

180. A carbon dioxide capture system as recited in example combination 179, wherein:
the first outlet port of the first portion of the heat exchange bypass channel, the second outlet port of the first portion of the heat exchange bypass channel, and the outlet port of the first portion of the heat exchange collection channel are each located at an outlet interfacing end of the first contact module; and, the inlet port of the second portion of the heat exchange bypass channel, the inlet port of said second said heat exchange feed channel, and the inlet port of the second portion of the heat exchange collection channel are each located at an inlet interfacing end of the second contact module.

181. A carbon dioxide capture system as recited in example combination 180, wherein:

one of the outlet interfacing end of the first contact module and inlet interfacing end of the second contact module comprises a plurality of male members and the other comprises a complementary plurality of female members for receiving the plurality of male members.

182. A carbon dioxide capture system as recited in example combination 181, wherein:

the plurality of male members and the complementary plurality of female members are configured to:

permit or block the flow of the second feed of the heat exchange fluid therethrough from the first outlet port of the first portion of the heat exchange bypass channel to the inlet port of said second said heat exchange feed channel;

permit or block the flow of the third feed of the heat exchange fluid therethrough from the second outlet port of the first portion of the heat exchange bypass portion to the inlet port of the second portion of the heat exchange bypass channel; and, permit the flow of the first effluent therethrough form the outlet port of the first portion of the heat exchange collection channel to the inlet port of the second portion of the heat exchange collection channel.

183. A carbon dioxide capture system as recited in example combination 180, comprising the first intermediate flow control member and wherein:

the first said intermediate flow control member is configured to fluidly interconnect and disconnect to and between the outlet interfacing end of the first contact module and inlet interfacing end of the second contact module.

184. A carbon dioxide capture system as recited in example combination 183, wherein:

the first said intermediate flow control member is configured to:

permit or block the flow of the second feed of the heat exchange fluid therethrough from the first outlet port of the first portion of the heat exchange bypass channel to the inlet port of said second said heat exchange feed channel;

permit or block the flow of the third feed of the heat exchange fluid therethrough from the second outlet port of the first portion of the heat exchange bypass portion to the inlet port of the second portion of the heat exchange bypass channel; and, permit the flow of the first effluent therethrough form the outlet port of the first portion of the heat exchange collection channel to the inlet port of the second portion of the heat exchange collection channel.

185. A carbon dioxide capture system as recited in any one of example combinations 178-184, wherein a third portion of said heat exchange collection channel is located downstream in the heat exchange cooling fluid flow direction along the flow axis from the second portion of the heat exchange collection channel and is fluidly connected with the heat exchange channels in the third portion of the contactor network at multiple third collection locations spaced along the flow axis to receive third effluent of the third feed of the heat exchange cooling fluid from multiple different locations in the third portion of the contactor network along the flow axis.

186. A carbon dioxide capture system as recited in any one of example combinations 178-185, comprising the third said heat exchange feed channel, the third portion of the contactor network and said third feed locations recited in example combination 177 and the third portion of said heat exchange collection channel recited in example combination 185, wherein:

the third said heat exchange feed channel, the third portion of the contactor network, said third feed locations, and said third portion of the heat exchange collection channel are provided in a third contact module; and, the second contact module and the third contact module are fluidly interconnectable and disconnectable through interfacing ends thereof.

187. A carbon dioxide capture system as recited in any one of example combinations 167-186, wherein:

the at least one heat exchange feed channel is located in an outer region of the contactor unit; and, the plurality of heat exchange channels are located in an inner region of the contactor unit.

188. A carbon dioxide capture system as recited in example combination 187, wherein:

the at least one heat exchange feed channel extends about and along at least a portion of the inner region of the contactor unit.

189. A carbon dioxide capture system as recited in example combination 188, wherein:

the at least one heat exchange feed channel spirals about and along at least a portion of the inner region of the contactor unit.

190. A carbon dioxide capture system as recited in any one of example combinations 187-189, wherein:

the at least one heat exchange collection channel is located in an outer region of the contactor unit.

191. A carbon dioxide capture system as recited in example combination 190, wherein:

the at least one heat exchange collection channel extends about and along at least a portion of the inner region of the contactor unit.

192. A carbon dioxide capture system as recited in example combination 190, wherein:

the at least one heat exchange collection channel spirals about and along at least a portion of the inner region of the contactor unit.

193. A carbon dioxide capture system as recited in any one of example combinations 187-192 comprising the at least one heat exchange bypass channel of Claim 168, and wherein:

the at least one heat exchange bypass channel is located in the outer region of the contactor unit.

194. A carbon dioxide capture system as recited in example combination 193, wherein:

the at least one heat exchange bypass channel extends linearly along the inner region of the contactor unit.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

The description of a feature or features in a particular combination do not exclude the inclusion of an additional feature or features in a variation of the particular combination. Processing steps and sequencing are for illustration only, and such illustrations do not exclude inclusion of other steps or other sequencing of steps. Additional steps may be included between any illustrated processing steps or before or after any illustrated processing step.

The terms "comprising", "containing", "including" and "having", and grammatical variations of those terms, are intended to be inclusive and nonlimiting in that the use of such terms indicates the presence of a stated condition or feature, but not to the exclusion of the presence also of any other condition or feature. The use of the terms "comprising", "containing", "including" and "having", and grammatical variations of those terms in referring to the presence of one or more components, subcomponents or materials, also include and is intended to disclose the more specific embodiments in which the term "comprising", "containing", "including" or "having" (or the variation of such term) as the case may be, is replaced by any of the narrower terms "consisting essentially of" or "consisting of" or "consisting of only" (or any appropriate grammatical variation of such narrower terms). For example, a statement that something "comprises" a stated element or elements is also intended to include and disclose the more specific narrower embodiments of the thing "consisting essentially of" the stated element or elements, and the thing "consisting of" the stated element or elements. Examples of various features have been provided for purposes of illustration, and the terms "example", "for example" and the like indicate illustrative examples that are not limiting and are not to be construed or interpreted as limiting a feature or features to any particular example. The term "at least" followed by a number (e.g., "at least one") means that number or more than that number. The term at "at least a portion" means all or a portion that is less than all. The term "at least a part" means all or a part that is less than all. Pressures as stated herein are absolute pressures (not gauge pressures), unless otherwise specifically stated.

What is claimed is:

1. A fluid contactor unit for mass transfer between fluid phases in process fluids, the fluid contactor unit comprising:
a contactor network of flow diversion barriers with flow voids for movement of the process fluids;
a plurality of heat exchange channels in the flow diversion barriers, the plurality of heat exchange channels configured to transport heat exchange fluid through the flow diversion barriers; and
at least one heat exchange feed channel configured to deliver a first feed of the heat exchange fluid to the plurality of heat exchange channels at first feed locations in the contactor network, wherein the at least one heat exchange feed channel extends in a direction of a flow axis of the process fluids,
wherein the at least one heat exchange feed channel is located in an outer region of the fluid contactor unit,
wherein the contactor network of flow diversion barriers and the plurality of heat exchange channels are located in an inner region of the fluid contactor unit, and
wherein the outer region of the fluid contactor unit extends about and along the inner region of the fluid contactor unit.

2. The fluid contactor unit of claim 1, wherein the at least one heat exchange feed channel is fluidly connected with at least 10 of the first feed locations and at most 10,000 of the first feed locations.

3. The fluid contactor unit of claim 1, wherein:
a first feed location of the first feed locations is spaced apart by at least 10 centimeters along the flow axis from a last feed location of the first feed locations;
the first feed location is spaced apart by at most 10 meters along the flow axis from the last feed location; and
the fluid contactor unit comprises at least 4 of the first feed locations per decimeter of length of the flow axis between the first feed location and the last feed location, and at most 200 of the first feed locations per decimeter of length of the flow axis between the first feed location and the last feed location.

4. The fluid contactor unit of claim 1, wherein a plurality of the first feed locations are located at different radial positions about the flow axis.

5. The fluid contactor unit of claim 1, wherein:
the at least one heat exchange feed channel has a first minimum cross-sectional area for flow located upstream of a first feed location of the first feed locations along the flow axis;
each of the plurality of heat exchange channels has a second minimum cross-sectional area for flow; and
a ratio of the first minimum cross-sectional area for flow to the second minimum cross-sectional area for flow is at least 5:1 and at most 10,000:1.

6. The fluid contactor unit of claim 5, wherein the second minimum cross-sectional area for flow is in a range of from 2 square millimeters to 2500 square millimeters.

7. The fluid contactor unit of claim 5, further comprising:
at least one heat exchange collection channel to collect a first effluent of the heat exchange fluid from the plurality of heat exchange channels,
wherein the at least one heat exchange collection channel extends in a direction of the flow axis and is fluidly connected with the plurality of heat exchange channels at first collection locations spaced along the flow axis.

8. The fluid contactor unit of claim 7, wherein:
a first heat exchange collection channel collects the first effluent of the heat exchange fluid from at least 10 of the first collection locations;
the first heat exchange collection channel has a third minimum cross-sectional area for flow downstream of a last collection location of the first collection locations; and
a ratio of the third minimum cross-sectional area for flow to the second minimum cross-sectional area for flow is at least 5:1.

9. The fluid contactor unit of claim 7, wherein the first feed locations are spaced along a first longitudinal portion of the fluid contactor unit corresponding to a first longitudinal portion of the contactor network located along a first longitudinal portion of the flow axis, and wherein the fluid contactor unit further comprises:
second feed locations spaced along a second longitudinal portion of the fluid contactor unit corresponding to a second longitudinal portion of the contactor network located along a second longitudinal portion of the flow axis downstream of the first longitudinal portion of the flow axis, the second feed locations configured to input a second feed of the heat exchange fluid into the second longitudinal portion of the contactor network, wherein the second feed of the heat exchange fluid is transmitted from the first longitudinal portion of the fluid contactor unit to the second longitudinal portion of the fluid contactor unit outside of the contactor network.

10. The fluid contactor unit of claim 9, wherein:

a first portion of the plurality of heat exchange channels, having corresponding first feed locations, are fluidly cross-connected within the first longitudinal portion of the contactor network downstream of their corresponding first feed locations;

a second portion of the plurality of heat exchange channels, having corresponding second feed locations, are fluidly cross-connected within the second longitudinal portion of the contactor network downstream of their corresponding second feed locations; and the first portion of the plurality of heat exchange channels and the second portion of the plurality of heat exchange channels provide two separate heat exchange fluid flow paths through the contactor network that are not fluidly cross-connected in the contactor network.

11. The fluid contactor unit of claim 9, wherein:

the first collection locations correspond to the first longitudinal portion of the fluid contactor unit and the first effluent of the heat exchange fluid is received from multiple different locations in the first longitudinal portion of the contactor network into a first portion of the at least one heat exchange collection channel;

a second portion of the at least one heat exchange collection channel is located in the second longitudinal portion of the fluid contactor unit, the second portion of the at least one heat exchange collection channel being fluidly connected with the second portion of the plurality of heat exchange channels, the second portion of the at least one heat exchange collection channel configured to receive a second effluent of the heat exchange fluid from multiple different locations in the second longitudinal portion of the contactor network, wherein the first effluent of the heat exchange fluid and the second effluent of the heat exchange fluid combine in the second portion of the at least one heat exchange collection channel; and the first portion of the at least one heat exchange collection channel and the second portion of the at least one heat exchange collection channel provide two separate heat exchange fluid flow paths through the contactor network to the at least one heat exchange collection channel that are not fluidly cross-connected between their respective feed locations and collection locations.

12. The fluid contactor unit of claim 11, further comprising:

a heat exchange input manifold fluidly interconnected with the first longitudinal portion of the fluid contactor unit along the flow axis upstream of the first longitudinal portion of the fluid contactor unit, wherein each feed of the heat exchange fluid is provided to a respective longitudinal portion of the fluid contactor unit through the heat exchange input manifold, wherein the heat exchange input manifold is configured to receive a combined input stream of the heat exchange fluid and to divide the combined input stream of the heat exchange fluid into different feeds of the heat exchange fluid for different respective portions of the contactor network.

13. The fluid contactor unit of claim 12, further comprising:

a heat exchange output manifold fluidly interconnected with a final longitudinal portion of the fluid contactor unit, the heat exchange output manifold being disposed along the flow axis downstream of the final longitudinal portion of the fluid contactor unit, wherein the fluid contactor unit is configured to output each effluent of the heat exchange fluid from each longitudinal portion of the fluid contactor unit through the heat exchange output manifold, wherein the heat exchange output manifold is configured to output a combined output stream comprising each effluent of the heat exchange fluid.

14. The fluid contactor unit of claim 9, further comprising:

a plurality of contact modules arranged in series along the flow axis, the plurality of contact modules configured for series flow of the heat exchange fluid through the plurality of contact modules, wherein adjacent contact modules in the plurality of contact modules are fluidly interconnectable and disconnectable through interfacing ends thereof; and at least one heat exchange bypass channel to bypass a portion of the contactor network and a portion of the plurality of heat exchange channels therein, wherein the first feed locations and the first longitudinal portion of the contactor network are in a first contact module of the plurality of contact modules, wherein the fluid contactor unit comprises a second contact module comprising a second longitudinal portion of the contactor network located along a second longitudinal portion of the flow axis downstream of the first longitudinal portion of the flow axis, wherein the second contact module comprises second feed locations spaced along the second longitudinal portion of the flow axis to input a second feed of the heat exchange fluid into different locations in the second longitudinal portion of the contactor network along the second longitudinal portion of the flow axis, wherein the first contact module and the second contact module are fluidly interconnectable and disconnectable through interfacing ends thereof, and with the first contact module and the second contact module fluidly interconnected the fluid contactor unit is configured to transmit the second feed from the first contact module to the second contact module outside of the contactor network.

15. The fluid contactor unit of claim 1, wherein walls of at least a portion of the plurality of heat exchange channels are constructed of a filled polymeric material.

16. The fluid contactor unit of claim 15, wherein the filled polymeric material comprises a polymeric matrix and particles of filler dispersed by the polymeric matrix, wherein the filler has a higher thermal conductivity than the polymeric matrix.

17. A fluid contactor unit for mass transfer between fluid phases in process fluids, the fluid contactor unit comprising:

a contactor network of flow diversion barriers with flow voids for movement of the process fluids;

a plurality of heat exchange channels within the flow diversion barriers, the plurality of heat exchange channels configured to transport heat exchange fluid through the flow diversion barriers; and at least one heat exchange feed channel configured to deliver a first feed of the heat exchange fluid to the plurality of heat exchange channels at first feed locations in the contactor network, wherein the at least one heat exchange feed channel extends in a direction of a flow axis of the process fluids, wherein a plurality of the first feed locations are located at different radial positions about the flow axis.

18. A fluid contactor unit for mass transfer between fluid phases in process fluids, the fluid contactor unit comprising:

a contactor network of flow diversion barriers with flow voids for movement of the process fluids;

a plurality of heat exchange channels within the flow diversion barriers, the plurality of heat exchange channels configured to transport heat exchange fluid through the flow diversion barriers; and at least one heat exchange feed channel configured to deliver a first feed of the heat exchange fluid to the plurality of heat exchange channels at first feed locations in the contactor network, wherein the at least one heat exchange feed channel extends in a direction of a flow axis of the process fluids, wherein the at least one heat exchange feed channel has a first minimum coss-sectional area for flow located upstream of a first feed location of the first feed locations along the flow axis, wherein each of the plurality of heat exchange channels has a second minimum cross-section area for flow, and wherein a ratio of the first minimum cross-sectional area for flow to the second minimum cross-section area for flow is at least 5:1 and at most 10,000:1.

* * * * *